(12) United States Patent
Kharkover

(10) Patent No.: US 9,701,475 B2
(45) Date of Patent: Jul. 11, 2017

(54) MODULAR STORAGE SYSTEM

(71) Applicant: PARKING KIT LTD., Haifa Bay Industrial Zone (IL)

(72) Inventor: Ilia Kharkover, Kiryat Yam (IL)

(73) Assignee: PARKING KIT LTD., Haifa Bay Industrial Zone (IL)

( * ) Notice: Subject to any disclaimer, the term of this patent is extended or adjusted under 35 U.S.C. 154(b) by 178 days.

(21) Appl. No.: 14/573,613

(22) Filed: Dec. 17, 2014

(65) Prior Publication Data
US 2015/0175354 A1   Jun. 25, 2015

Related U.S. Application Data

(60) Continuation-in-part of application No. 14/206,004, filed on Mar. 12, 2014, now Pat. No. 8,977,383, which is a division of application No. 13/255,208, filed as application No. PCT/IL2010/000208 on Mar. 11, 2010, now Pat. No. 8,812,148.

(60) Provisional application No. 61/159,098, filed on Mar. 11, 2009, provisional application No. 62/085,658, filed on Dec. 1, 2014.

(51) Int. Cl.
| | |
|---|---|
| *G06F 7/00* | (2006.01) |
| *B65G 1/06* | (2006.01) |
| *E04H 6/22* | (2006.01) |
| *E04H 6/42* | (2006.01) |
| *E04H 6/28* | (2006.01) |
| *B65G 1/04* | (2006.01) |

(52) U.S. Cl.
CPC .............. *B65G 1/06* (2013.01); *B65G 1/0478* (2013.01); *E04H 6/22* (2013.01); *E04H 6/225* (2013.01); *E04H 6/282* (2013.01); *E04H 6/422* (2013.01); *E04H 6/424* (2013.01)

(58) Field of Classification Search
USPC ........................................................ 700/218
See application file for complete search history.

(56) References Cited

U.S. PATENT DOCUMENTS

| | | | |
|---|---|---|---|
| 5,165,842 A | 11/1992 | Hammer | |
| 5,467,561 A | 11/1995 | Takoaka | |
| 5,556,246 A | 9/1996 | Broshi | |
| 5,573,364 A | 11/1996 | Schneider et al. | |
| 5,669,753 A | 9/1997 | Schween | |

(Continued)

OTHER PUBLICATIONS

U. S. Patent Office, "International Search Report and Written Opinion dated Jul. 6, 2010 in corresponding International Application No. PCT/IL2010/000208", USA.

*Primary Examiner* — Kyle Logan

(57) ABSTRACT

A modular system for storage of cargo units, comprises: a plurality of pallets; a plurality of interconnected active cell units; each cell unit comprises an cell transporting mechanism; at least one active shuttle unit movable between the plurality of cell units; each shuttle unit comprises a shuttle transporting mechanism adapted to transport at least one pallet of the plurality of pallets to and from one of the plurality of cell units and to and from the at least one shuttle unit; a central controller adapted to control the operation of the cell and the shuttle transporting mechanisms, the operation of which is performed in an independent manner via the central controller such that a construction of any arrangement of the cell units is performed to effectively exploit a designated space.

45 Claims, 122 Drawing Sheets

(56) References Cited

U.S. PATENT DOCUMENTS

| | | | | |
|---|---|---|---|---|
| 2002/0164234 A1* | 11/2002 | Haag | ............... | E04H 6/422 |
| | | | | 414/277 |
| 2008/0014059 A1* | 1/2008 | Jones | ............... | E04H 6/14 |
| | | | | 414/227 |
| 2009/0081011 A1 | 3/2009 | Kaufmann et al. | | |
| 2014/0219751 A1* | 8/2014 | Segal | ............... | B65G 1/04 |
| | | | | 414/235 |

\* cited by examiner

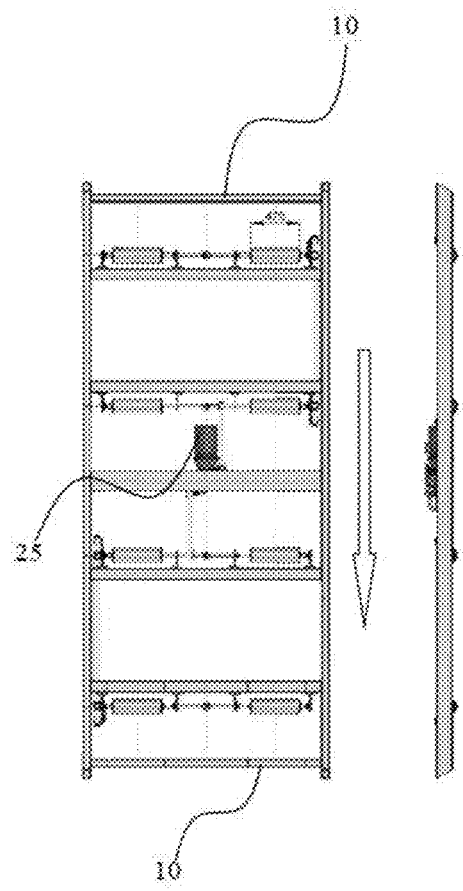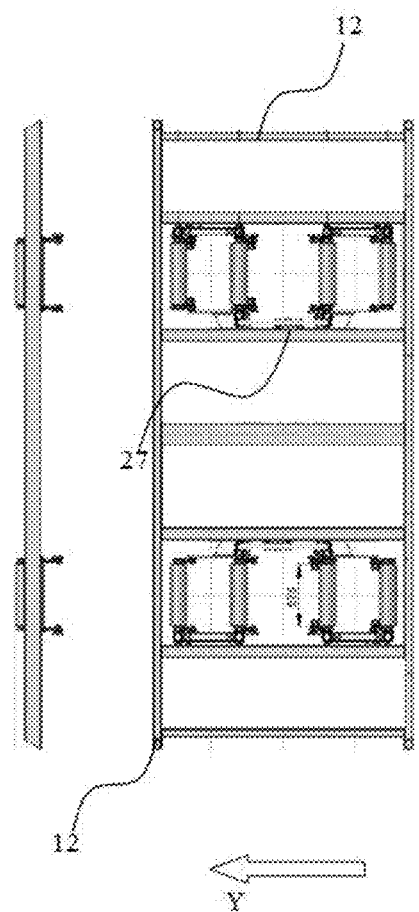
Fig. 2a
Fig. 2b

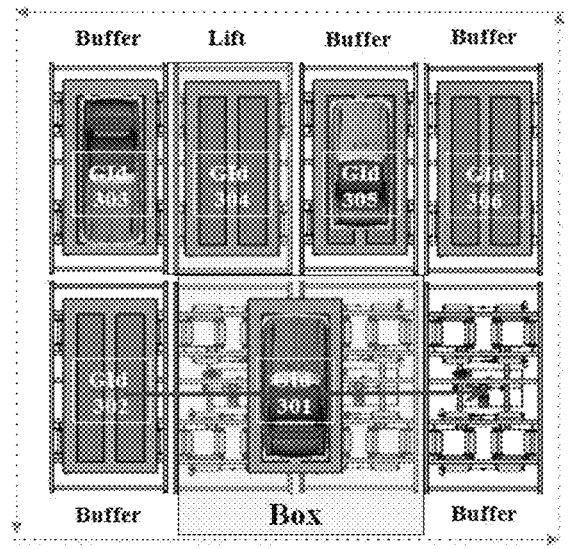
FIG 31(C)
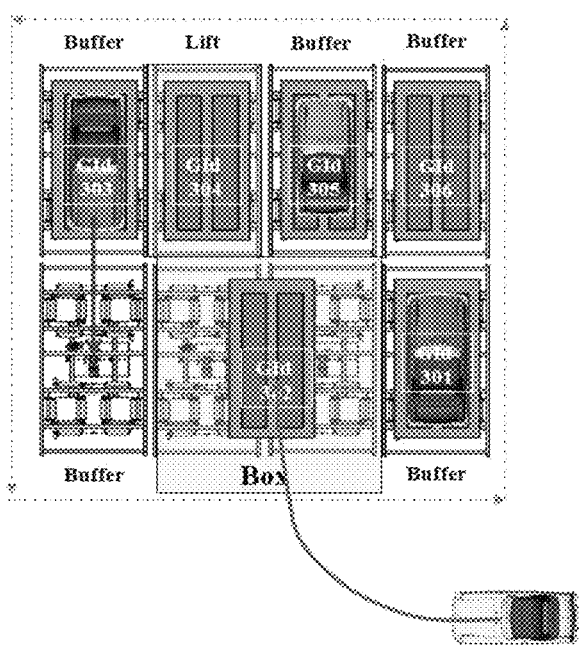
FIG 31(D)

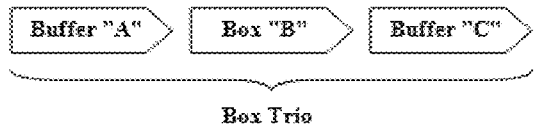
Fig.39A
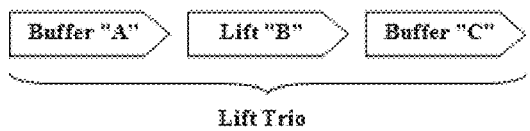
Fig.39B
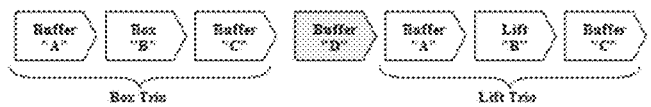
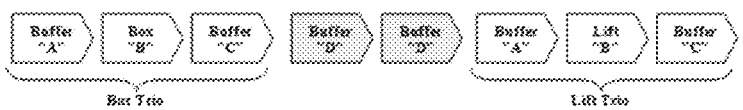
Fig.39C

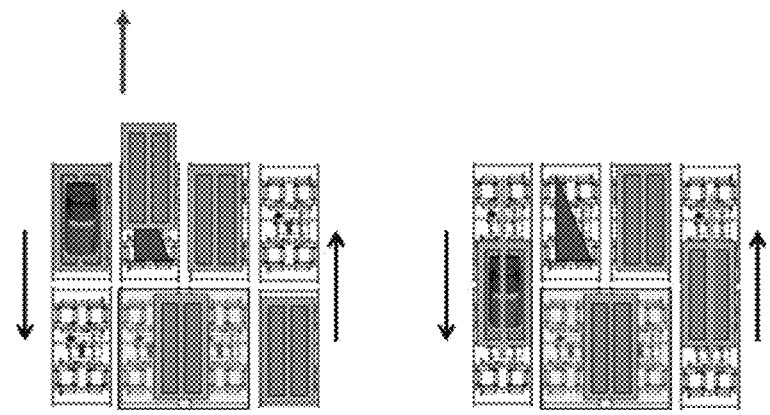
FIG 51(E)          FIG 51(F)
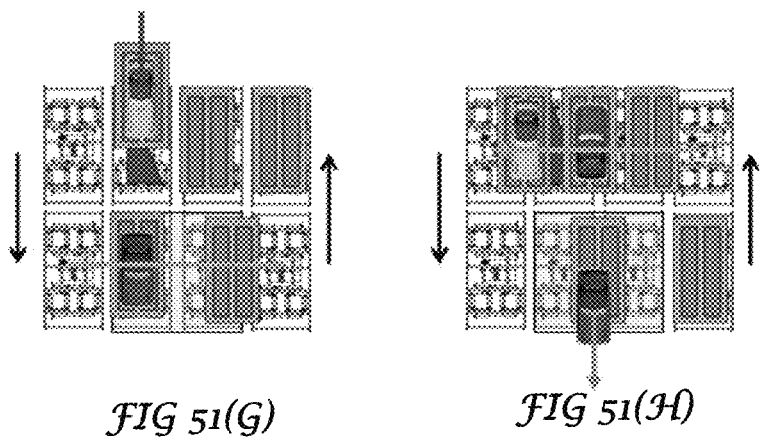
FIG 51(G)          FIG 51(H)

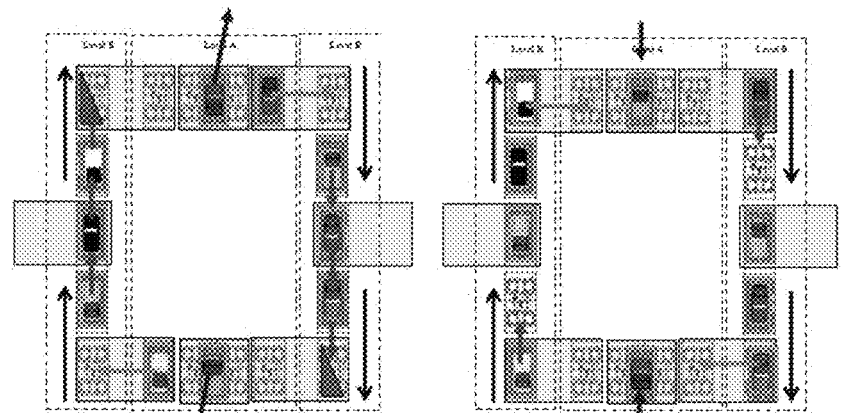
*FIG 65(A)*  *FIG 65(B)*
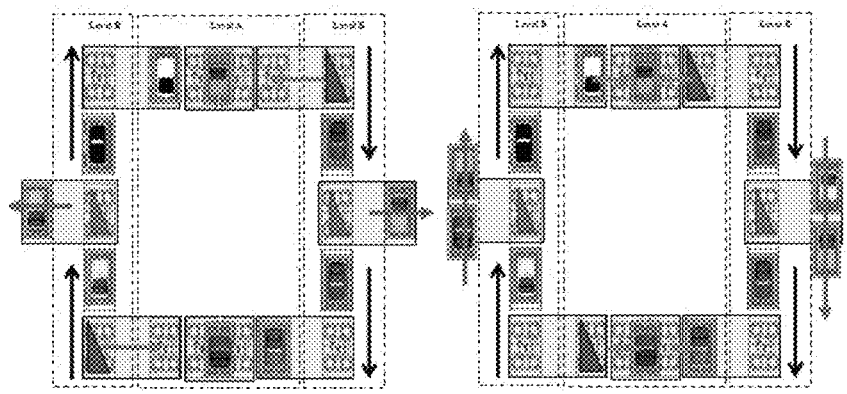
*FIG 65(C)*  *FIG 65(D)*
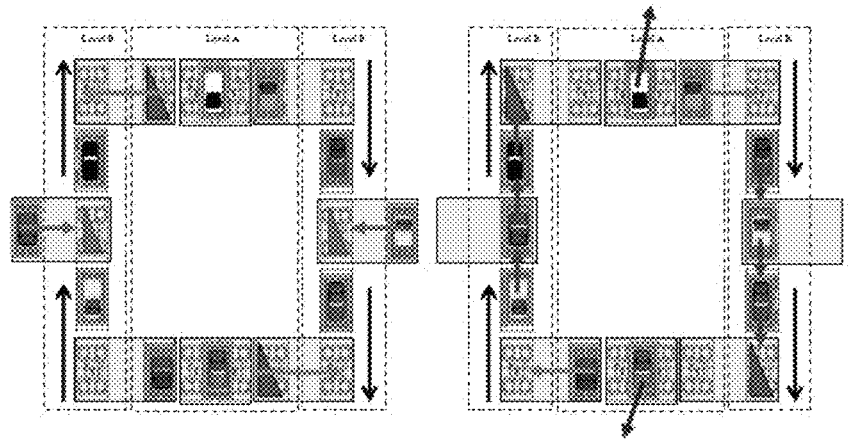
*FIG 65(E)*  *FIG 65(F)*

MODULAR STORAGE SYSTEM

FIELD OF THE INVENTION

The present invention generally relates to a modular storage system, and more specifically, to system an automatic multi-dimensional parking system which enables effective exploitation of any available plot of land, or any other location.

BACKGROUND OF THE INVENTION

The problem of providing storage spaces (e.g., parking) for cargo (e.g., vehicles) is becoming increasingly serious. For example, there is a growing demand for parking spaces which is accompanied with a decrease in supply of land available for such parking spaces, particularly in densely populated areas.

Automated parking garage systems have been employed since the late 1950's utilizing crane systems, conveyors, hydraulics and pneumatics to transport and store vehicle within a parking structure. Recently, more advanced garage systems have been developed which include computer-controlled, specialized equipment for carrying vehicles to assigned parking spaces in a way similar to the way that computerized assembly lines or warehouses store and retrieve miscellaneous goods. In such assembly line and warehouse systems, a computer assigns a location for each item as it is received from its manufacturer, and robotic equipment carries each item to its assigned location. The same equipment is dispatched to the location when the item requires retrieval. Often, the items stored in a warehouse are placed on pallets to facilitate transportation and storage of the items. The use of pallets as supporting elements for the transport and storing of vehicles is also typical of more advanced automated parking garage systems.

Examples of automated parking garage systems are described in U.S. Pat. No. 5,467,561 of Takaoka, U.S. Pat. No. 5,556,246 of Broshi, U.S. Pat. No. 5,573,364 of Schneider et al., and U.S. Pat. No. 5,669,753 of Schween.

U.S. Pat. No. 5,467,561 discloses an automated high-raised parking system. The system has a parking construction including a parking rack structure having a plurality of stories of parking racks for parking an automobile as mounted on a pallet, a lift passage for a lift-translator device, the passage being formed besides the parking racks. The lift-translator device includes a lift table and a translator device. An automobile entrance/exit section is provided for allowing entrance and exit of the automobile to and out of the construction. A holding unit is provided at a predetermined height of the entrance/exit section for holding the pallet so as to maintain a horizontal posture of this pallet mounting the automobile. The automobile as mounted on the lift table is vertically moved to a predetermined rack and then translated by the translator device onto this rack. A turntable device is provided at the entrance/exit section. This device includes a turntable which swivellably holds the pallet mounting the automobile thereon so that an orientation of the automobile on the pallet is changed by swiveling this turn table, and includes also an elevator mechanism for elevating the turntable so as to allow an upward movement of the pallet relative to the height of the entrance/exit section.

U.S. Pat. No. 5,556,246 discloses an automated system for storing, retrieval and transporting of goods of any shape and size in aisleless warehouses, ships, airplanes, trains and the like. The system also provides aisleless warehouses, parking lots and the like and enables a computerized fully automated handling of stored items such as loading and evacuating of containers. The system provides the moving of the goods by placing same on pallets which travel on a flat and smooth floor. The pallet is provided with elastic air cushions which enable its hovering over the flat surface and a drive to enable the movement to any required direction.

U.S. Pat. No. 5,573,364 a parking system for a motor vehicle formed as a high-level rack storehouse including at least one rack-operating device for transporting a car, which is loaded on a pallet at a parking station, to one of a parking spot and an unparking station, and an arrangement for handling empty pallets and including a pallet-receiving device and a displaceable pallet-stacking device.

U.S. Pat. No. 5,669,753 An automated parking garage simultaneously parks and retrieves multiple vehicles. Each vehicle entering the facility is videotaped to make a record of its physical condition prior to entry into the garage to protect the garage owner from baseless damage claims. Vehicles are simultaneously measured and entry into the garage is denied to oversized vehicles. Upon being granted entry, a customer parks the customer's vehicle on a pallet near the garage entrance and leaves the facility. In single floor designs, the pallet is carried by a self-propelled carrier to a parking space by a series of longitudinal and transverse movements on rails. A multiple story embodiment employs a lifting device that includes a pallet support member that shuttles back and forth between two contiguous floors. Each pallet is carried by a carrier to a lifting device and each lifting device has mechanical arms that support the carrier until the pallet support member deploys and independently supports the pallet to enable withdrawal of the carrier from the lifting device. Another carrier, stationed on an upper floor, retrieves the vehicle-supporting pallet from the lifting device and delivers it to its assigned parking space. Insertion and retrieval of multiple vehicles occurs simultaneously so that the formation of queues of vehicles entering the facility is minimized.

A main shortcoming of the existing systems for storage of cargo is their complexity and flexibility which result in a non-efficient exploitation of existing designated storage space. These systems are usually pre-fabricated, and therefore their flexibility is limited.

One of the most important directions towards solving the parking space problem is creating less expensive and easily realized various types of semi-automatic and automatic parking systems of small and medium capacity (e.g., 6-120 places) that could be installed in any predetermined site and/or location which is characterized by a regular or irregular form. This should be performed easily, without the need for special design and manufacturing of such systems.

Therefore, it is long felt need to develop a storage system which is: easy for constructions, cable of providing storage space for any specific number of cargo units, reliable, capable of exploiting any designated space, capable of providing any 2D and 3D structure, fast and cost-effective. The present invention is intended to comply with all these requirements.

SUMMARY OF THE INVENTION

It is one object of the present invention to provide a modular system for storage of cargo units in a designated space and for effective exploitation of the designated space. The system comprises:

a. A plurality of pallets. Each pallet of the plurality of pallets is adapted to carry at least one cargo unit.

b. A plurality of at least partially interconnected active cell units forming a multi-dimensional structure with at least one row and at least one column of storing locations for at least one of the cargo units; the at least one row of the multi-dimensional structure is parallel to the to an axis selected from axis X or axis Y, and the at least one column of the multi-dimensional structure is parallel to axis selected from axis X and axis Y, differently from the axis of the at least one row. Each cell unit having a lengthwise axis X, and a widthwise axis Y, parallel to the axis X and the axis Y of the multi-dimensional structure. Each cell unit comprises an cell transporting mechanism adapted to transport at least one pallet of the plurality of pallets to and from the cell unit in direction selected from the axis X or the axis Y. Each cell unit further adapted to contain at least one pallet of the plurality of pallets on the same.

c. At least one active shuttle unit movable between the plurality of cell units of the multi-dimensional structure and is having a lengthwise X axis, and a widthwise axis Y, parallel to the axis X and the axis Y of the multi-dimensional structure. Each shuttle unit comprises a shuttle transporting mechanism adapted to transport at least one pallet of the plurality of pallets to and from one of the plurality of cell units and to and from the at least one shuttle unit in direction selected from the axis X, and the axis Y. The shuttle unit is adapted to enable transportation of at least one pallet of the plurality of pallets from at least one of the cell units to another one of the cell units. Each shuttle unit further adapted to contain at least one pallet of the plurality of pallets on the same.

d. A central controller adapted to control the operation of the cell transporting mechanism and the shuttle transporting mechanism of each one of the cell units and each of the at least one shuttle unit in an independent manner for transporting the plurality of pallets from one predetermined location to another predetermined location within the system.

It is within the scope of the present invention that the operation of each of the cell transporting mechanism of each of the plurality of cell units and each of the shuttle transporting mechanism of each of the at least one shuttle unit is independently performed in the independent manner via the central controller such that a construction of any arrangement of the cell units forming the multi-dimensional structure is performed to effectively exploit the designated space by means of the number of cargo units capable of being inserted and stored within the system.

It is another object of the present invention to provide the modular system as defined above, wherein the shuttle unit comprising a lifting mechanism adapted to lift the at least one pallet of the plurality of pallets in the direction of axis Z of the multi-dimensional structure when the multi-dimensional structure of the cell units comprises more that more than one layer of cell units;

It is another object of the present invention to provide the modular system as defined above, wherein the central controller is adapted to insert and extract at least one of the cargo units to and from a specific cell unit within the system by an arrangement and movement of the plurality of pallets selected from a group consisting of: cyclic movement, linear movement, or any combination thereof; the arrangement and movement of the plurality of pallets is in a direction selected from a group consisting of: the axis X, axis Y, axis Z, or any combination thereof.

It is another object of the present invention to provide the modular system as defined above, wherein the system is a parking system, the cargo units are vehicles, and each cell unit of the plurality of cell units is adapted to contain one vehicle of the vehicles.

It is another object of the present invention to provide the modular system as defined above, wherein the dimensions of the multi-dimensional structure are selected from a group consisting of: 2D, 3D, or any combination thereof.

It is another object of the present invention to provide the modular system as defined above, wherein the system further comprises at least two substantially parallel rails on which the at least one shuttle unit is movable between the plurality of cell units.

It is another object of the present invention to provide the modular system as defined above, wherein the central controller comprises a set of predetermined algorithms for any possible structure of the multi-dimensional structures; the algorithms are responsible for transporting the plurality of pallets from one predetermined location to another predetermined location along a shortest possible route within the multi-dimensional structure.

It is another object of the present invention to provide the modular system as defined above, wherein the predetermined location is selected from one cell unit of the plurality of cell units or one shuttle unit of the at least one shuttle unit.

It is another object of the present invention to provide the modular system as defined above, wherein the system further comprises at least one entry and at least one exit points; the at least one entry and at least one exit points are selected from one cell unit of the plurality of cell units or one shuttle unit of the at least one shuttle unit.

It is another object of the present invention to provide the modular system as defined above, wherein the cell transporting mechanism and the shuttle transporting mechanism are adapted to transport at least one pallet of the plurality of pallets from one cell unit to its adjacent cell unit in a time interval of between about 7 to about 13 seconds.

It is another object of the present invention to provide the modular system as defined above, wherein the cell transporting mechanism and the shuttle transporting mechanism are adapted to transport at least one pallet of the plurality of pallets from one cell unit to its adjacent cell unit in a time interval of about 10 second.

It is another object of the present invention to provide the modular system as defined above, wherein the one cell unit of the plurality of cell units comprises a rotating mechanism adapted to rotate a pallet located on it in a rotation angle between about 1° to about 360°, clockwise and counter-clockwise.

It is another object of the present invention to provide the modular system as defined above, wherein the at least one shuttle unit comprises a rotating mechanism adapted to rotate a pallet located on it in a rotation angle between about 1° to about 360°, clockwise and counter-clockwise.

It is another object of the present invention to provide the modular system as defined above, wherein the plurality of cell units are at least partially interconnected by mechanically connected means selected from a group consisting of: shafts, rods, axles, bars, balks, staffs, levers, pales, or any combination thereof.

It is another object of the present invention to provide the modular system as defined above, wherein the system is characterized by a characteristic selected from a group consisting of: kit-like, LEGO-like, easy for construction, easy for assembly, easy for disassembly, or any combination thereof.

It is another object of the present invention to provide the modular system as defined above, wherein the cell transporting mechanism and the shuttle transporting mechanism comprise rotating wheels adapted to move the at least one pallet by their rotation, such that the at least one pallet of the plurality of pallets is transported to and from one of the plurality of cell units and to and from the at least one shuttle unit.

It is another object of the present invention to provide the modular system as defined above, wherein the operation of the rotating wheels is controlled by the central controller, such that the direction of the rotation of the rotating wheels and the rotation time interval are set.

It is another object of the present invention to provide the method for constructing and operating a modular system for storage of cargo units in a designated space and for effective exploitation of the designated space. The method comprising steps of:

a. Providing a modular system for storage of cargo units in a designated space and for effective exploitation of the designated space, the system comprising: (i) a plurality of pallets, each pallet of the plurality of pallets is adapted to carry at least one cargo unit; (ii) a plurality of active cell units adapted to form a multi-dimensional structure with at least one row and at least one column of storing locations for at least one of the cargo units; the at least one row of the multi-dimensional structure is parallel to the to an axis selected from axis X or axis Y, and the at least one column of the multi-dimensional structure is parallel to axis selected from axis X and axis Y, differently from the axis of the at least one row; each cell unit having a lengthwise axis X, and a widthwise axis Y, parallel to the axis X and the axis Y of the multi-dimensional structure; each cell unit comprising an cell transporting mechanism adapted to transport at least one pallet of the plurality of pallets to and from the cell unit in direction selected from the axis X or the axis Y; each cell unit further adapted to contain at least one pallet of the plurality of pallets on the same; (iii) at least one active shuttle unit movable between the plurality of cell units of the multi-dimensional structure and is having a lengthwise X axis, and a widthwise axis Y, parallel to the axis X and the axis Y of the multi-dimensional structure; each shuttle unit comprising a shuttle transporting mechanism adapted to transport at least one pallet of the plurality of pallets to and from one of the plurality of cell units and to and from the at least one shuttle unit in direction selected from the axis X, and the axis Y; the shuttle unit is adapted to enable transportation of at least one pallet of the plurality of pallets from at least one of the cell units to another one of the cell units; each shuttle unit further adapted to contain at least one pallet of the plurality of pallets on the same; and, (iv) a central controller adapted to control the operation of the cell transporting mechanism and the shuttle transporting mechanism of each one of the cell units and each of the at least one shuttle unit in an independent manner for transporting the plurality of pallets from one predetermined location to another predetermined location within the system;

b. At least partially interconnecting the active cell units, and thereby forming the multi-dimensional structure.

c. Installing the at least one active shuttle unit between the plurality of cell units of the multi-dimensional structure.

d. Providing at least one cargo unit.

e. Placing the at least one cargo unit one pallet of the plurality of pallets at one predetermined location within the system.

f. Controlling the operation of the cell transporting mechanism and the shuttle transporting mechanism of each one of the cell units and each of the at least one shuttle unit via the central controller in an independent manner.

g. Transporting the at least one pallet of the plurality of pallets to and from at least one of the plurality of cell units and the at least one active shuttle unit via the cell transporting mechanism and the shuttle transporting mechanism of the same.

h. Transporting the at least one cargo unit from the one predetermined location to another predetermined location within the system.

i. Storing the at least one cargo unit within the system.

It is within the scope of the present invention that step (f) of controlling the operation of the cell transporting mechanism and the shuttle transporting mechanism of each one of the cell units and each of the at least one shuttle unit is performed in the independent manner via the central controller, and thereby the system is efficiently exploiting the designated space by means of the number of cargo units capable of being inserted and stored within the system by allowing a construction of any arrangement of the cell units forming the multi-dimensional structure.

It is another object of the present invention to provide the method as defined above, which further comprises step of lifting the at least one pallet of the plurality of pallets via a lifting mechanism in the direction of axis Z of the multi-dimensional structure when the multi-dimensional structure of the cell units comprising more that more than one layer of cell units.

It is another object of the present invention to provide the method as defined above, which further comprises steps of inserting and extracting at least one of the cargo units to and from a specific cell unit within the system via the central controller by arranging and moving the plurality of pallets by an arrangement and movement selected from a group consisting of: cyclic movement, linear movement, or any combination thereof the arrangement and movement of the plurality of pallets is in a direction selected from a group consisting of: the axis X, axis Y, axis Z, or any combination thereof.

It is another object of the present invention to provide the method as defined above, wherein the system is a parking system, the cargo units are vehicles, and each cell unit of the plurality of cell units is adapted to contain one vehicle of the vehicles.

It is another object of the present invention to provide the method as defined above, wherein the dimensions of the multi-dimensional structure are selected from a group consisting of: 2D, 3D, or any combination thereof.

It is another object of the present invention to provide the method as defined above, wherein the system further comprises at least two substantially parallel rails on which the at least one shuttle unit is movable between the plurality of cell units.

It is another object of the present invention to provide the method as defined above, which further comprises step of providing the central controller with a set of predetermined algorithms for any possible structure of the multi-dimensional structures; the algorithms are responsible for transporting the plurality of pallets from one predetermined location to another predetermined location along a shortest possible route within the multi-dimensional structure.

It is another object of the present invention to provide the method as defined above, which further comprises step of selecting the predetermined location from one cell unit of the plurality of cell units or one shuttle unit of the at least one shuttle unit.

It is another object of the present invention to provide the method as defined above, which further comprises step of providing the system with at least one entry and at least one exit points; the at least one entry and at least one exit points are selected from one cell unit of the plurality of cell units or one shuttle unit of the at least one shuttle unit.

It is another object of the present invention to provide the method as defined above, wherein the cell transporting mechanism and the shuttle transporting mechanism are adapted to transport at least one pallet of the plurality of pallets in a time interval of between about 7 to about 13 seconds.

It is another object of the present invention to provide the method as defined above, wherein the cell transporting mechanism and the shuttle transporting mechanism are adapted to transport at least one pallet of the plurality of pallets in a time interval of about 10 second.

The method for constructing and operating a modular system for storage of cargo units of claim 18, wherein the one cell unit of the plurality of cell units comprises a rotating mechanism adapted to rotate a pallet located on it in a rotation angle between about 1° to about 360°, clockwise and counter-clockwise.

It is another object of the present invention to provide the method as defined above, wherein the plurality of cell units are at least partially interconnected by mechanically connected means selected from a group consisting of: shafts, rods, axles, bars, balks, staffs, levers, pales, or any combination thereof.

It is another object of the present invention to provide the method as defined above, wherein the system is characterized by a characteristic selected from a group consisting of: kit-like, LEGO-like, easy for construction, easy for assembly, easy for disassembly, or any combination thereof.

It is another object of the present invention to provide the method as defined above, wherein the cell transporting mechanism and the shuttle transporting mechanism comprise rotating wheels adapted to move the at least one pallet by their rotation, such that the at least one pallet of the plurality of pallets is transported to and from one of the plurality of cell units and to and from the at least one shuttle unit.

It is another object of the present invention to provide the method as defined above, wherein the operation of the rotating wheels is controlled by the central controller, such that the direction of the rotation of the rotating wheels and the rotation time interval are set

BRIEF DESCRIPTION OF THE FIGURES

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A illustrates two cell units are mechanically connected to each other. Each cell unit comprising legs which are adapted to support the cell unit. FIG. 1B illustrates a cargo unit is a vehicle carried by pallet;

FIGS. 2A-2B are schematic illustrations of an upper view of two interconnected cell units. FIG. 2A schematically illustrates an upper view of two interconnected cell units. FIG. 2B schematically illustrates an upper view of two interconnected cell units;

FIG. 5A illustrates a cell unit with a rotating mechanism or a shuttle unit with a rotating mechanism can be mechanically interconnected to another cell unit or shuttle unit, such that a pallet is transported to and from the cell unit with the rotating mechanism or the shuttle unit with the rotating mechanism. FIG. 5B illustrates another view of the rotating mechanism;

FIG. 8A schematically illustrates the modular system of the present invention with twenty five cell units. FIG. 8B schematically illustrates the modular system of the present invention with ten cell units;

FIG. 10A schematically illustrates the modular system of the present invention. FIG. 10B, illustrates a 2D multi-dimensional structure of cell units in which there are thirty five cell units for storage of vehicles;

FIG. 11B provides an upper view on the system from plane X-Y, and FIGS. 11A and 11C provides side views on the system from plane Z;

FIG. 12A illustrates the first stage of the transportation while FIG. 12B illustrates the second stage;

FIG. 13A illustrates a top view and FIG. 13B illustrates a side view;

FIG. 15A illustrates 2 boxes. FIG. 15B illustrates one box;

FIG. 16A illustrates two boxes 501; and FIG. 16B illustrates one box 501;

In FIG. 18A the block includes a transportation mechanism and in FIG. 18B the block constitutes a floor without mechanisms;

FIG. 19A illustrates a first manner by which a pallet may be transported in perpendicular directions. FIG. 19B illustrates a second manner by which a pallet may be transported in perpendicular directions;

FIG. 20A illustrates the minimal area of a service level built of blocks 201. FIG. 20B illustrates two different paths for transporting cargo from and to the service area;

FIG. 21A illustrates a scenario comprising 2 boxes and six adjacent blocks. FIG. 21B illustrates a scenario comprising one box and three adjacent blocks. FIG. 21C illustrates a scenario comprising three boxes and seven adjacent blocks;

FIG. 22A illustrates an embodiment in which the service level comprises a matrix of 2×2 blocks; FIG. 22B illustrates an embodiment in which the service level comprises a matrix of 3×3 blocks; and, FIG. 22C illustrates an embodiment in which the service level comprises a matrix of 6×3 blocks;

FIG. 23A illustrates the minimum configuration of the system which comprises 2 block 201, one elevator 601 and one box 501. FIG. 23B illustrates a system which comprises a configuration in which there are 4×2 blocks. FIG. 23C illustrates an embodiment in which two boxes are utilized;

FIG. 24A illustrates 3 step transmission from the top middle block to the bottom right corner block. FIG. 24B illustrates 3 step transmission from the bottom right corner block to the top left corner block;

FIG. 25A exemplifies a top service area, FIG. 25B exemplifies a middle service area, FIG. 25C exemplifies a bottom service area, FIG. 25D exemplifies a partial service area, FIG. 25E exemplifies an external service area and FIG. 25F exemplifies an external service area surrounded by the storage area, FIG. 25G exemplifies a storage area without a service area and FIG. 25H exemplifies a service area embedded into the service area in a plurality of locations;

FIG. 26A illustrates possible inputs and outputs of 4 cells, FIG. 26B illustrates possible inputs and outputs of 10 cells, FIG. 26C illustrates another possible inputs and outputs of 4 cells, FIG. 26D illustrates possible inputs and outputs of 7 cells;

FIG. 27A illustrates a possible arrangement of 4 cell types, FIG. 27B illustrates a possible arrangement of 8 cell types, FIG. 27C illustrates a possible arrangement of 7 cell types and FIG. 27D illustrates a possible arrangement of 10 cell types;

FIG. 28A illustrates a possible arrangement of the GIds in the chain, 28B illustrates a second possible arrangement of the GId in the chain, 28C illustrates a third possible arrangement of the GId in the chain and 28D illustrates a fourth possible arrangement of the GId in the chain;

FIG. 29A illustrates a possible arrangement of the GId in the service area and FIG. 29B illustrates a second possible arrangement of the GId in the service area;

FIG. 30A illustrates a possible movement in the chain and the cargo status, FIG. 30B illustrates a second possible movement in the chain and the cargo status, FIG. 30C illustrates a third possible movement in the chain and the cargo status, FIG. 30D illustrates a fourth possible movement in the chain and the cargo status, FIG. 30E illustrates a fifth possible movement in the chain and the cargo status and FIG. 30F illustrates a sixth possible movement in the chain and the cargo status;

FIGS. 31A-31E illustrate box cells located in the service area, GId=Id step-by-step movement in the chain and the change of cargo status in the box. FIG. 31A illustrates a possible movement in the chain and cargo of the boxes, FIG. 31B illustrates a second possible movement in the chain and cargo of the boxes, FIG. 31C illustrates a third possible movement in the chain and cargo of the boxes, FIG. 31D illustrates a fourth possible movement in the chain and cargo of the boxes and FIG. 31E illustrates a fifth possible movement in the chain and cargo of the boxes;

FIG. 32A illustrates a possible movement of the lifts and change in cargo, FIG. 32B illustrates a second possible movement of the lifts and change in cargo, FIG. 32C illustrates a third possible movement of the lifts and change in cargo, FIG. 32D illustrates a fourth possible movement of the lifts and change in cargo, FIG. 32E illustrates a fifth possible movement of the lifts and change in cargo and FIG. 32F illustrates a sixth possible movement of the lifts and change in cargo;

FIGS. 33A-38E illustrate organizing principles of various service area types designed for different purposes, constructed of boxes, lifts and buffers, and developed by the author of the present patent for Robotic Parking Systems (RPS) of matrix type within Israeli company Olimpus-Pltd;

FIGS. 33A-33D illustrate possible organizing principles and movements in an 8 cell configuration having two different cargo positions, FIG. 33A and FIG. 33B respectively, and in a 12 cell configuration having two different cargo positions, FIG. 33C and FIG. 33D respectively;

FIG. 34A is a top view and FIG. 34B is a 3D perspective view, and FIG. 34C illustrates a second position of the cargo in FIG. 34A while FIG. 34D illustrates movement in a double 12 cell configuration. FIG. 34E illustrates movement in the cell configuration illustrated by FIG. 34D;

FIG. 35A illustrates a 12 cell configuration organization, FIG. 35B illustrates a possible 18 cell configuration organization, FIG. 35C illustrates a possible 20 cell configuration organization;

FIG. 36A illustrates a possible 27 cell configuration; FIG. 36B illustrates a possible 39 cell configuration;

FIG. 37A illustrates a possible organization and movement of 3 cargoes in a possible 27 cell configuration, FIG. 37B illustrates a possible organization and movement of 3 cargoes in a possible 24 cell configuration and FIG. 37C illustrates a possible organization and movement of 4 cargoes in a possible 48 cell configuration;

FIGS. 38A-38E illustrates OsRPS (One-Sided) model and the organization of rotation cargoes. FIG. 38A illustrates a possible organization of the rotation cargo in an 8 cell configuration; FIG. 38B illustrates a possible organization of the rotation cargo in a 12 cell configuration, FIG. 38C illustrates a possible organization of the rotation cargo in a 17 cell configuration, FIG. 38D illustrates a possible organization of the rotation cargo in a 26 cell configuration, FIG. 38E illustrates a possible organization of the rotation cargo in a 35 cell configuration;

FIGS. 39A-39H illustrate organizing principles for service area in a way that a lift trio and a box trio enable establishing a constant GId movement in the chain by minimizing parasitic loss of time for lifts and boxes. FIG. 39A illustrates a first possible organizing principle, FIG. 39B illustrates a second possible organizing principle, FIG. 39C illustrates a third possible organizing principle, FIG. 39D illustrates a fourth possible organizing principle, FIG. 39E illustrates a fifth possible organizing principle, FIG. 39F illustrates a sixth possible organizing principle, FIG. 39G illustrates a seventh possible organizing principle, FIG. 39H illustrates a eighth possible organizing principle;

FIG. 40A illustrates a first movement version, FIG. 40B illustrates a second movement version, FIG. 40C illustrates a third movement version, FIG. 40D illustrates a fourth movement version, FIG. 40E illustrates a fifth movement version, FIG. 40F illustrates a sixth movement version, FIG. 40G illustrates a seventh movement version, FIG. 40H illustrates a eighth movement version;

FIG. 41A illustrates a first movement version, FIG. 41B illustrates a second movement version, FIG. 41C illustrates a third movement version;

FIG. 42A illustrates a first movement version, FIG. 42B illustrates a second movement version, FIG. 42C illustrates a third movement version;

FIG. 44A illustrates a first configuration and movement utilization, FIG. 44B illustrates a second configuration and movement utilization, FIG. 44C illustrates a third configuration and movement utilization, FIG. 44D illustrates a fourth configuration and movement utilization, FIG. 44E illustrates a fifth configuration and movement utilization, FIG. 44F illustrates a sixth configuration and movement utilization;

FIG. 45A illustrates a first configuration and movement utilization and FIG. 45B illustrates a second configuration and movement utilization;

FIG. 47A is a first configuration, FIG. 47B is a second configuration and FIG. 47C is a third configuration;

FIG. 48A is a first configuration, FIG. 48B is a second configuration and FIG. 48C is a third configuration;

FIG. 49A is a first configuration, FIG. 49B is a second configuration and FIG. 49C is a third configuration;

FIG. 50A-67 illustrate organizing principles for service areas in a way that they are able to perform mass operations of reception, delivery, exchange and treatment of cargo within the standard chain without the necessity of changing direction or its operating principles;

FIGS. 50A-50H illustrate examples of MRPS utilization in a mass Cargo receiving mode. FIG. 50A illustrates a first possible utilization, FIG. 50B illustrates a second possible utilization, FIG. 50C illustrates a third possible utilization, FIG. 50D illustrates a fourth possible utilization, FIG. 50E illustrates a fifth possible utilization, FIG. 50F illustrates a sixth possible utilization, FIG. 50G illustrates a seventh possible utilization and FIG. 50H illustrates a eighth possible utilization;

FIGS. 51A-51H illustrate examples of MRPS utilization in a mass Cargo delivery mode. FIG. 51A illustrates a first possible utilization, FIG. 51B illustrates a second possible utilization, FIG. 51C illustrates a third possible utilization, FIG. 51D illustrates a fourth possible utilization, FIG. 51E illustrates a fifth possible utilization, FIG. 51F illustrates a sixth possible utilization, FIG. 51G illustrates a seventh possible utilization and FIG. 51H illustrates a eighth possible utilization;

FIG. 52A illustrates a first possible utilization, FIG. 52B illustrates a second possible utilization, FIG. 52C illustrates a third possible utilization, FIG. 52D illustrates a fourth possible utilization, FIG. 52E illustrates a fifth possible utilization, FIG. 52F illustrates a sixth possible utilization, FIG. 52G illustrates a seventh possible utilization and FIG. 52H illustrates a eighth possible utilization;

FIG. 53A illustrates a first possible utilization, FIG. 53B illustrates a second possible utilization, FIG. 53C illustrates a third possible utilization, FIG. 53D illustrates a fourth possible utilization, FIG. 53E illustrates a fifth possible utilization, FIG. 53F illustrates a sixth possible utilization, FIG. 53G illustrates a seventh possible utilization and FIG. 53H illustrates a eighth possible utilization;

FIG. 54A illustrates a first possible utilization, FIG. 54B illustrates a second possible utilization, FIG. 54C illustrates a third possible utilization, FIG. 54D illustrates a fourth possible utilization, FIG. 54E illustrates a fifth possible utilization, FIG. 54F illustrates a sixth possible utilization, FIG. 54G illustrates a seventh possible utilization and FIG. 54H illustrates a eighth possible utilization;

FIG. 55A illustrates a first possible utilization, FIG. 55B illustrates a second possible utilization, FIG. 55C illustrates a third possible utilization, FIG. 55D illustrates a fourth possible utilization, FIG. 55E illustrates a fifth possible utilization, FIG. 55F illustrates a sixth possible utilization, FIG. 55G illustrates a seventh possible utilization and FIG. 55H illustrates a eighth possible utilization;

FIG. 56A illustrates a first possible utilization, FIG. 56B illustrates a second possible utilization, FIG. 56C illustrates a third possible utilization, FIG. 56D illustrates a fourth possible utilization, FIG. 56E illustrates a fifth possible utilization, FIG. 56F illustrates a sixth possible utilization, FIG. 56G illustrates a seventh possible utilization and FIG. 56H illustrates a eighth possible utilization;

FIG. 57A illustrates a first possible utilization, FIG. 57B illustrates a second possible utilization, FIG. 57C illustrates a third possible utilization, FIG. 57D illustrates a fourth possible utilization, FIG. 57E illustrates a fifth possible utilization, FIG. 57F illustrates a sixth possible utilization, FIG. 57G illustrates a seventh possible utilization and FIG. 57H illustrates a eighth possible utilization;

FIG. 58A illustrates a first possible utilization, FIG. 58B illustrates a second possible utilization, FIG. 58C illustrates a third possible utilization, FIG. 58D illustrates a fourth possible utilization, FIG. 58E illustrates a fifth possible utilization and FIG. 58F illustrates a sixth possible utilization;

FIG. 59A illustrates a first possible utilization, FIG. 59B illustrates a second possible utilization, FIG. 59C illustrates a third possible utilization, FIG. 59D illustrates a fourth possible utilization, FIG. 59E illustrates a fifth possible utilization and FIG. 59F illustrates a sixth possible utilization;

FIG. 60A illustrates a first possible utilization, FIG. 60B illustrates a second possible utilization, FIG. 60C illustrates a third possible utilization, FIG. 60D illustrates a fourth possible utilization, FIG. 60E illustrates a fifth possible utilization and FIG. 60F illustrates a sixth possible utilization;

FIG. 61A illustrates a first possible utilization, FIG. 61B illustrates a second possible utilization, FIG. 61C illustrates a third possible utilization, FIG. 61D illustrates a fourth possible utilization, FIG. 61E illustrates a fifth possible utilization and FIG. 61F illustrates a sixth possible utilization;

FIG. 62 illustrates an example of a combined (3D matrix) service area chain structure;

FIG. 63A illustrates a first possible utilization, FIG. 63B illustrates a second possible utilization, FIG. 63C illustrates a third possible utilization, FIG. 63D illustrates a fourth possible utilization, FIG. 63E illustrates a fifth possible utilization and FIG. 63F illustrates a sixth possible utilization;

FIG. 64A illustrates a first possible utilization, FIG. 64B illustrates a second possible utilization, FIG. 64C illustrates a third possible utilization, FIG. 64D illustrates a fourth possible utilization, FIG. 64E illustrates a fifth possible utilization and FIG. 64F illustrates a sixth possible utilization;

FIGS. 65A-65F illustrate examples of a combined (3D matrix) service area chain structure and its utilization in a mass cargo exchange mode. FIG. 65A illustrates a first possible utilization, FIG. 65B illustrates a second possible utilization, FIG. 65C illustrates a third possible utilization, FIG. 65D illustrates a fourth possible utilization, FIG. 65E illustrates a fifth possible utilization and FIG. 65F illustrates a sixth possible utilization;

FIG. 66A illustrates a first possible utilization, FIG. 66B illustrates a second possible utilization, FIG. 66C illustrates a third possible utilization, FIG. 66D illustrates a fourth possible utilization, FIG. 66E illustrates a fifth possible utilization and FIG. 66F illustrates a sixth possible utilization;

FIG. 67 illustrates an example of a combined (3D matrix) service area chain structure serving two storage areas simultaneously;

FIG. 68A illustrates a first possible construction and FIG. 68B illustrates a second possible construction;

FIG. 71A illustrates a first possible organization, FIG. 71B illustrates a second possible organization, FIG. 71C illustrates a third possible organization, FIG. 71D illustrates a fourth possible organization, FIG. 71E illustrates a fifth possible organization, FIG. 71F illustrates a sixth possible organization, FIG. 71G illustrates a seventh possible organization, FIG. 71H illustrates an eighth possible organization and FIG. 71I illustrates a ninth possible organization; FIG. 72A illustrates a first possible organization, FIG. 72B illustrates a second possible organization, FIG. 72C illustrates a third possible organization and FIG. 72D illustrates a fourth possible organization.

DETAILED DESCRIPTION OF THE PREFERRED EMBODIMENTS

Figure 1A:
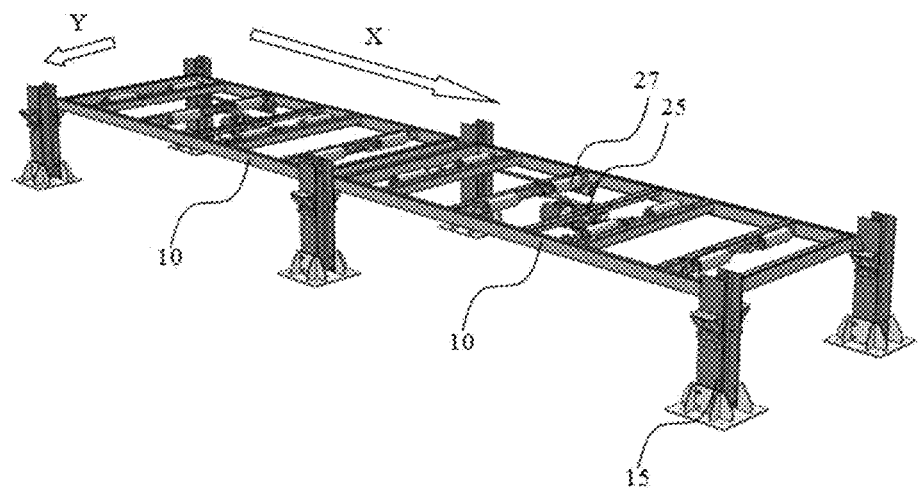
FIGS. 1A-1B are schematic illustrations of a specific embodiment of active cell units of the modular system of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a modular system for storage of cargo units in a designated space and for effective exploitation of the designated space. The system comprises:
a. A plurality of pallets. Each pallet of the plurality of pallets is adapted to carry at least one cargo unit.
b. A plurality of at least partially interconnected active cell units forming a multi-dimensional structure with at least one row and at least one column of storing locations for at least one of the cargo units; the at least one row of the multi-dimensional structure is parallel to the to an axis selected from axis X or axis Y, and the at least one column of the multi-dimensional structure is parallel to axis selected from axis X and axis Y, differently from the axis of the at least one row. Each cell unit having a lengthwise axis X, and a widthwise axis Y, parallel to the axis X and the axis Y of the multi-dimensional structure. Each cell unit comprises an cell transporting mechanism adapted to transport at least one pallet of the plurality of pallets to and from the cell unit in direction selected from the axis X or the axis Y. Each cell unit further adapted to contain at least one pallet of the plurality of pallets on the same.
c. At least one active shuttle unit movable between the plurality of cell units of the multi-dimensional structure and is having a lengthwise axis X, and a widthwise axis Y, parallel to the axis X and the axis Y of the multi-dimensional structure. Each shuttle unit comprises a shuttle transporting mechanism adapted to transport at least one pallet of the plurality of pallets to and from one of the plurality of cell units and to and from the at least one shuttle unit in direction selected from the axis X, and the axis Y. The shuttle unit is adapted to enable transportation of at least one pallet of the plurality of pallets from at least one of the cell units to another one of the cell units. Each shuttle unit further adapted to contain at least one pallet of the plurality of pallets on the same.
d. A central controller adapted to control the operation of the cell transporting mechanism and the shuttle transporting mechanism of each one of the cell units and each of the at least one shuttle unit in an independent manner for transporting the plurality of pallets from one predetermined location to another predetermined location within the system.

The operation of each of the cell transporting mechanism of each of the plurality of cell units and each of the shuttle transporting mechanism of each of the at least one shuttle unit is independently performed in the independent manner via the central controller such that a construction of any arrangement of the cell units forming the multi-dimensional structure is performed to effectively exploit the designated space by means of the number of cargo units capable of being inserted and stored within the system.

The term 'designated space' refers hereinafter to any above ground or underground location and/or structure in which a parking system might be installed (e.g., a parking lot, a carriage of an existing building, a yard, etc.).

The term 'cell units' refers hereinafter to a unit which is adapted to comprise a cargo unit by means of size and shape (see for example FIG. 1a, numerical reference 10).

The term 'pallets' refers hereinafter to a planar object onto which a cargo unit is placed (see for example FIG. 1b, numerical reference 20).

The term 'shuttle unit' refers hereinafter to a cell unit which is transportable (see for example FIG. 6, numerical reference 71).

The term 'cargo units' refers hereinafter to any units which are dimensionally fitter to the system. For example: vehicles, products, boxes, production components, etc.

The term 'lifting mechanism' refers hereinafter to any elevating mechanism known in the art.

The term 'active cell units' refers hereinafter to a cell in which the transporting mechanism is embedded within said cell.

The term 'passive cell units' refers hereinafter to a cell in which the transporting of a cargo is performed via an independent transporting mechanism.

The term 'plurality' refers hereinafter to any integer number equal or higher 1, e.g., 16-24, especially 16-18.

The term 'cargo' refers hereinafter to a object to be received, stored and retrieved. In a preferred embodiment the cargo is a vehicle. The terms "GId" or "Id" are used interchangeably with "cargo".

The term 'pallet' refers hereinafter to a platform adapted for holding a cargo. The pallet may be provided with transport means allowing it to move. A pallet is adapted to transport cargo placed upon said pallet from one location into the other location.

The term 'block' refers hereinafter to a modular unit from which the storage system is built, consisting of a space large enough to store a cargo either on or off a pallet, and from which a pallet, cargo, or pallet holding a cargo can be transferred to an adjacent block.

The term 'elevator refers hereinafter to a holding space adapted for movement between different levels or different areas within a level. Said movement can be vertical or horizontal movement between at least two levels.

The term 'buffer' refers hereinafter to an unoccupied block in the parking system, generally reserved for transport of cargo or empty pallets. It should be pointed out that in some cases the buffer may be used to temporally store cargo within.

The term 'box' refers hereinafter to a set of one or more blocks. In the case where more than one block comprises a box, the blocks are neighboring blocks. A box is adapted for receiving/retrieving cargo from outside the system.

The term 'service level' refers hereinafter to a floor of a storage or parking facility adapted for logistical operations of storing and extracting cargoes from the storage or parking facility.

The term 'storage level' refers hereinafter to a floor of a storage or parking facility adapted for storing cargo.

The term 'level' refers hereinafter to a physically separated floor of a building or distinct area.

The term 'different levels' refers hereinafter to a substantially two different levels physically separated or two distinct areas.

The present invention which is disclosed below is a novel and non-obvious set of standardized aggregates and blocks for the construction of semi-automatic and automatic storage systems (e.g., parking complexes) of various size, form, and designation. The system of the present invention is adapted to accommodate itself to the shape, dimensions, and topography of any available plot of land, and effectively exploits any designated space by means of number of cargo units which can be stored within the system. Moreover, the system is designed in such a way that allows it to increase the speed and space utilization ratio, when compared with other existing systems. For example, the system is able to retrieve at least 40 vehicles per hour stored within it.

The present invention is a kit of standardized and mechanically mutually connectable elements and components which are designed and manufactured in such a way that there is full compatibility of the components with one another. This compatibility is by means of ease of assembly, size, power requirements, management, control, etc.

The system of the present invention is an easy for construction modular system which is: kit-like, LEGO-like, easy for construction, easy for assembly, easy for disassembly, or any combination thereof. These characteristics of the present invention are achieved by an active and an independent manner according to which each main part of the system (e.g., a cell unit or a shuttle unit) is actuated.

The core of the present invention is the ability to use basic components such as: cell units, shuttle units and pallets in order to design, for example, small parking complexes of 4-20 places, medium parking complexes of 21-60 places, as well as large parking complexes of hundreds and thousands of places.

The existing parking systems, part of which is disclosed about suffer from a critical limitation of flexibility in their structure and adaptability to various locations and existing structures. To overcome these limitations, the present invention provides the ability exploit any existing designated space in order to construct a storage system within it.

Figure 1B:
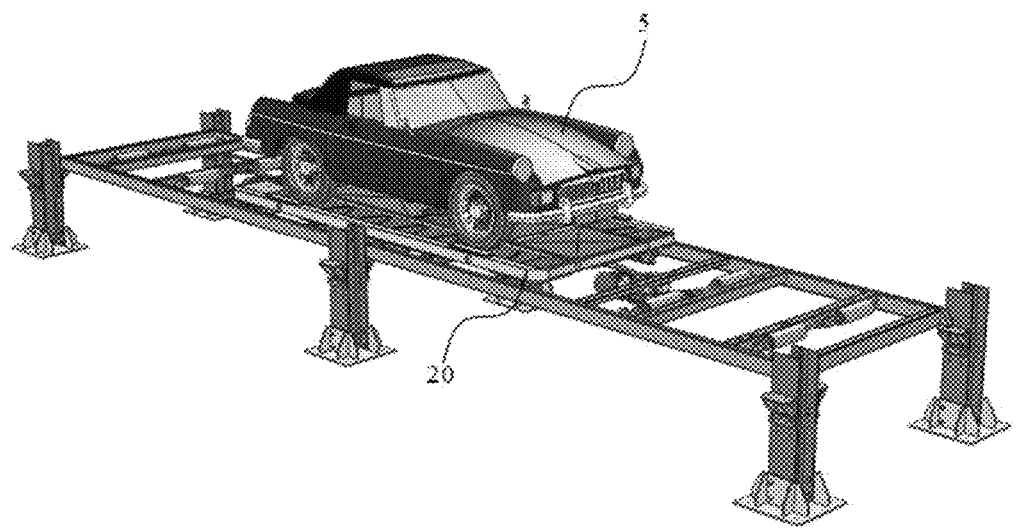

Reference is now made to FIGS. 1a-b, which schematically illustrate a specific embodiment of an active cell units 10 of a modular system 100 (not shown) for storage of cargo units in a designated space 90 (shown in FIG. 6) and for effective exploitation of designated space 90. The active cell units 10 which are connectable to other cell units are the main element of modular system 100. Each cell unit 10 is having a lengthwise axis X, and a widthwise axis Y. For example, as illustrated in FIG. 1a, two cell units 10 are mechanically connected to each other. Each cell unit 10 comprising legs 15 which are adapted to support the cell unit.

According to the preferred embodiment of the present invention, modular system 100 is a parking system, and the cargo units are vehicles. According to this embodiment, each cell unit 10 of the plurality of cell units is adapted to contain one vehicle in the same.

An additional element of system 100 (not shown) is a plurality of pallets. Each pallet 20 of the plurality of pallets is adapted to carry at least one cargo unit. According to the embodiment of FIG. 1b, a cargo unit is a vehicle 5 carried by pallet 20.

According to some embodiments of the present invention, a pallet is a special platform designed to store a vehicle. The vehicle is staying on the pallet until a request by owner or any other authorized person is performed. The pallet is configured to be moved into modular system with or without a vehicle on it. A vehicle is movable within the system only when it is placed on a pallet.

Each cell unit comprising a cell transporting mechanism 25 adapted to contain, carry and transport at least one pallet 20 of the plurality of pallets to and from cell unit 10 in direction selected from axis X or axis Y. As illustrated in FIG. 1b, cell transporting mechanism 25 transports pallet 20 in the direction of axis X.

According to the specific embodiment of the present invention illustrated in FIGS. 1a-b, cell transporting mechanism 25 comprises rotating wheels adapted to move said at least one pallet by their rotation, such that pallet 20 is transported to and from one of said plurality of cell units and to and from said at least one shuttle unit.

Reference is now made to FIG. 2a, which schematically illustrates an upper view of two interconnected cell units 10. According to this figure, cell transporting mechanism 25 transports pallet 20 in the direction of axis X. This transport may be in a forward or in a backward direction.

According to different embodiments of the present invention, the cell units are interconnected by mechanically connected means selected from a group consisting of: shafts, rods, axles, bars, balks, staffs, levers, pales, or any combination thereof.

Reference is now made to FIG. 2b, which schematically illustrates an upper view of two interconnected cell units 12. According to this figure, cell transporting mechanism 27 transports pallet 20 (not shown) in the direction of axis Y. This transport may be in a right or a left direction.

Figure 3:
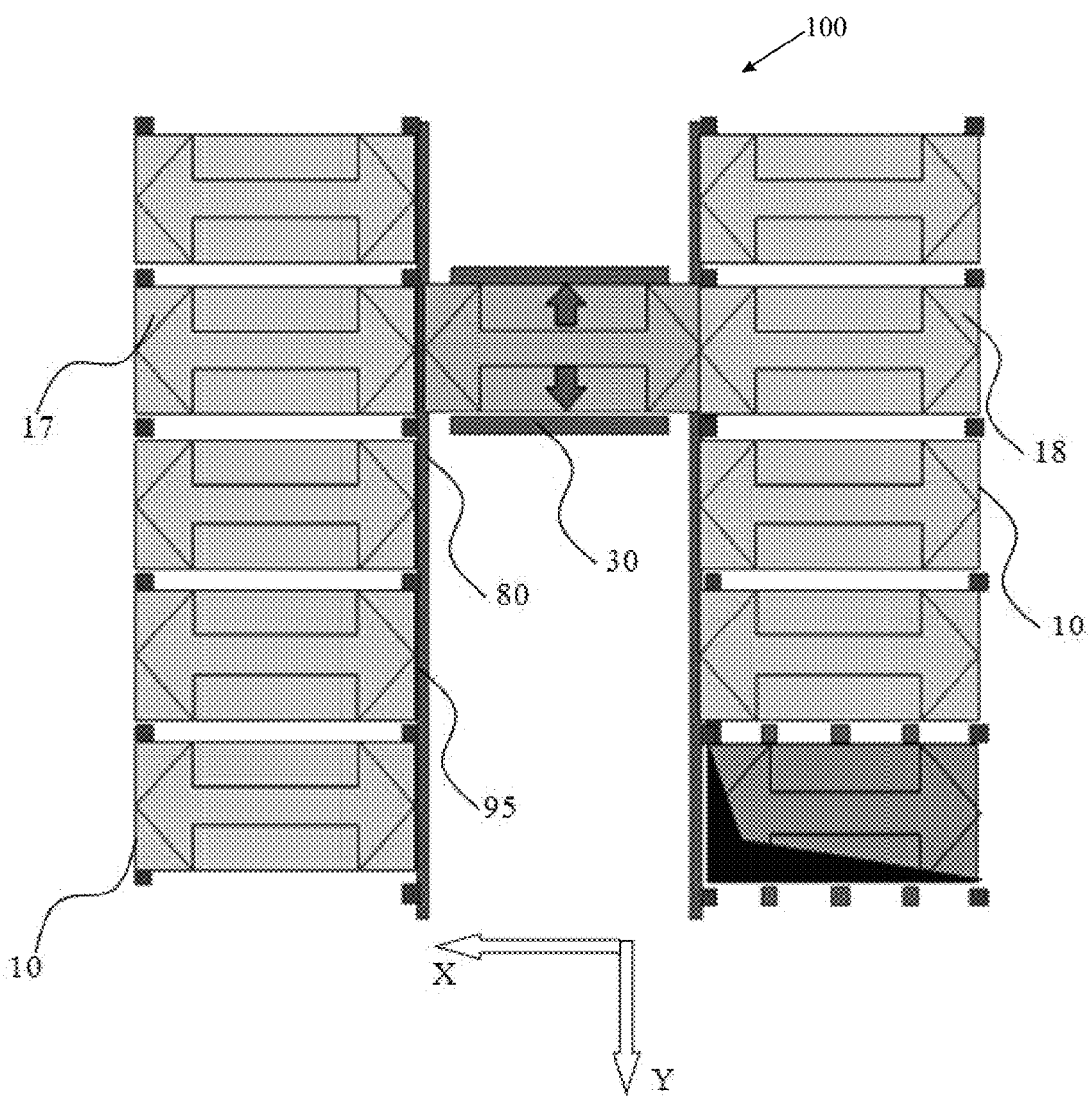
FIG. 3 is a schematic illustration of an example of the modular system of the present invention.

Reference is now made to FIG. 3, which schematically illustrates an example of the modular system 100 of the present invention. In this figure illustrated a plurality of at least partially interconnected active cell units 10 forming a multi-dimensional structure 95 with five rows and two columns of storing locations for at least one of the cargo units. The rows of multi-dimensional structure 95 are parallel to said to axis Y, and the columns of multi-dimensional structure 95 are parallel to axis X. Each one of cell units 10 is having a lengthwise axis X, and a widthwise axis Y, parallel to axis X and axis Y of multi-dimensional structure 95. According to this embodiment, each cell unit 10 is adapted to transport at least one pallet of the plurality of pallets to and from cell unit 10 in direction of axis X. The dimensions of multi-dimensional structure 95 are selected from a group consisting of: 2D, 3D, or any combination thereof.

According to different embodiments of the preset invention, multi-dimensional structure 95 might be: a tower structure, a carousel structure, one level parking system, one level puzzle parking system, multi-level shuttle parking system, multi-level puzzle parking system, multi-level big (shuttle or puzzle) parking system, According to FIG. 3, modular system 100 further comprises shuttle unit 30 which is movable between the rows of cell units 10, and is adapted to contain, carry and transport. Each shuttle unit 30 is having a lengthwise X axis, and a widthwise axis Y, parallel to axis X and axis Y of multi-dimensional structure 95. Each Shuttle unit comprises a shuttle transporting mechanism (not shown) which is according to a specific embodiment of the present invention is similar to the cell transporting mechanism. The shuttle transporting mechanism is adapted to transport at least one pallet of the plurality of pallets to and from one of the plurality of cell units and to and from shuttle unit in direction selected from axis X, and axis Y. Shuttle unit 30 is adapted to enable transportation of at least one pallet of the plurality of pallets from at least one of said cell units to another one of said cell units. For example, shuttle unit 30 is adapted to transport at least one pallet of the plurality of pallets from cell unit 17 to cell unit 18.

According to a specific embodiment of the present invention, system 100 further comprises two substantially parallel rails 80 on which said shuttle unit is movable between the cell units 10.

According to a specific embodiment, the shuttle transporting mechanism comprises rotating wheels adapted to move said at least one pallet by their rotation, such that pallet 20 is transported to and from one of said plurality of cell units and to and from said at least one shuttle unit.

The operation of modular system 100 is controlled by a central controller (not shown) which is adapted to control the operation of cell transporting mechanism 25 and shuttle transporting mechanism (not shown) of each one of cell units 10 and each shuttle unit 30 for transporting the plurality of pallets from one predetermined location to another predetermined location within the system. According to different embodiments of the present invention, the predetermined location might be a specific cell unit or a shuttle unit.

An important advantage of the system of the present invention is the ability of the central controller to control the operation of cell transporting mechanism 25 and shuttle transporting mechanism in an independent manner. In other words, and according to a specific embodiment, the central controller is adapted to give each cell transporting mechanism and each shuttle transporting mechanism an order to rotate the rotating wheel for a predetermined period of time, such that the pallet is moved to or from the cell unit or the shuttle unit. The independent manner in which the cell transporting mechanism 25 and shuttle transporting mechanism are controlled, allow a construction of any arrangement of cell units 10 to form multi-dimensional structure 95. The result of this ability provides a modular system which is able to effectively exploit the designated space by means of the number of cargo units capable of being inserted and stored within the system.

Each cell unit or shuttle unit of the present invention is able to connect to any other cell unit or shuttle unit of the system, and for each one of them it does not matter to when the pallets are delivered. What is important for each cell unit or shuttle unit is that the pallets are moved to an adjacent cell unit or shuttle unit if they exist. If there is no adjacent cell unit or shuttle unit, the pallets will not be transported from the cell unit or the shuttle unit.

The operation of rotating wheels is controlled by the central controller, such that the direction of the rotation of the rotating wheels and the rotation time interval are set. According to the preferred embodiment of the present invention, the rotation time interval of at least most of the cell units and the shuttle units is substantially the same (due to their similar length).

According to different embodiments, the cell transporting mechanism and the shuttle transporting mechanism comprise a motor adapted to actuate the mechanism by rotating a chain which is connected to the rotating wheels.

According to some embodiments, the cell transporting mechanism and the shuttle transporting mechanism are adapted to transport at least one pallet from one cell unit to its adjacent cell unit in a time interval of between about 7 to about 13 seconds. According to a specific embodiment, this time interval is about 10 second. Due to the active transporting mechanism of each one of the cell units and the shuttle units, this time interval is much shorter that a time interval which could be achieved by a passive transporting mechanism (which takes each pallet and transports it by moving means such as a crane, or a transporting arm).

The central controller of modular system 100 is adapted to insert and extract at least one of said cargo units to and from a specific cell unit within said system by an arrangement and movement of said plurality of pallets selected from a group consisting of: cyclic movement, linear movement, or any combination thereof. The arrangement and the movement of the plurality of pallets is performed in a direction selected from a group consisting of: axis X, axis Y, axis Z, or any combination thereof. For example, shuttle unit 30 of FIG. 3 is adapted to move in a linear movement in the direction of axis Y.

The central controller of the present invention comprises a set of predetermined algorithms for any possible structure of multi-dimensional structure 95. The algorithms are responsible for transporting the plurality of pallets from one predetermined location to another predetermined location along a shortest possible route within multi-dimensional structure 95. This shortest possible route might be the minimal number of transports of the pallets located within the system in order to bring a specific pallet with a specific vehicle on it to a specific location.

According to some embodiments, modular system 100 might further comprise an entry point and an exit point. The entry and the exit points are selected from a cell unit 10 or a shuttle unit 30.

Figure 4:
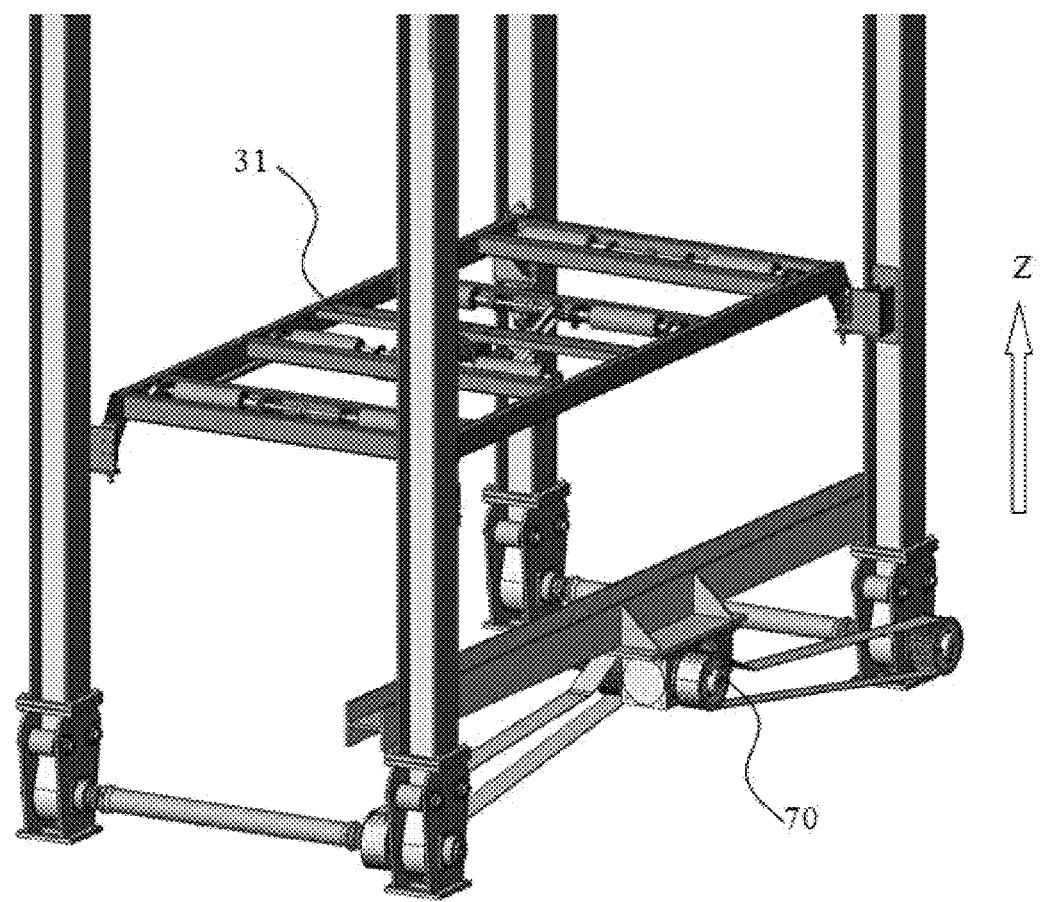
FIG. 4 is a schematic illustration of a specific embodiment of the shuttle unit of present invention.

Reference is now made to FIG. 4 of the present invention which schematically illustrates a specific embodiment of the shuttle unit of present invention. According to this embodiment, shuttle unit 31 comprises a lifting mechanism 70 adapted to lift at least one pallet in the direction of axis Z when multi-dimensional structure 95 of said cell units 10 comprises more than one layer of cell units. The lifting mechanism 70 might by any lifting or elevating mechanism known in the art. The lifting mechanism is preprogrammed to lift a pallet which is located on it (not shown) to a predetermined height, or bring the pallet down to a predetermined height.

It should be mentioned, that according to different embodiment of the present invention, when a cell unit and a shuttle unit are joint (one adjacent to the other), the shuttle unit might be used as a cell unit. Following their separation, the shuttle unit is used again a shuttle and not as a cell.

Figure 5A:
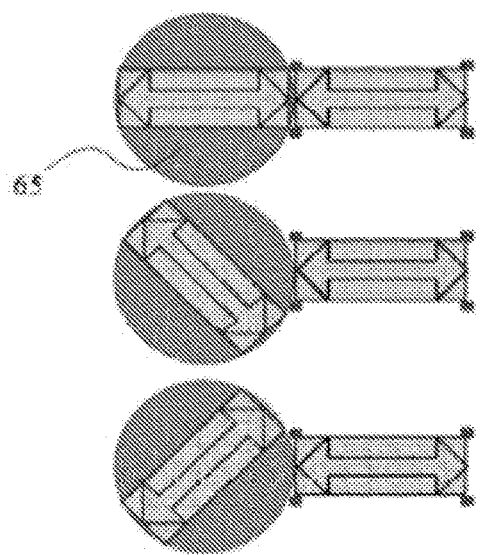
FIGS. 5A-5B are schematic illustrations of a specific embodiment of a cell unit with a rotating mechanism.
Figure 5B:
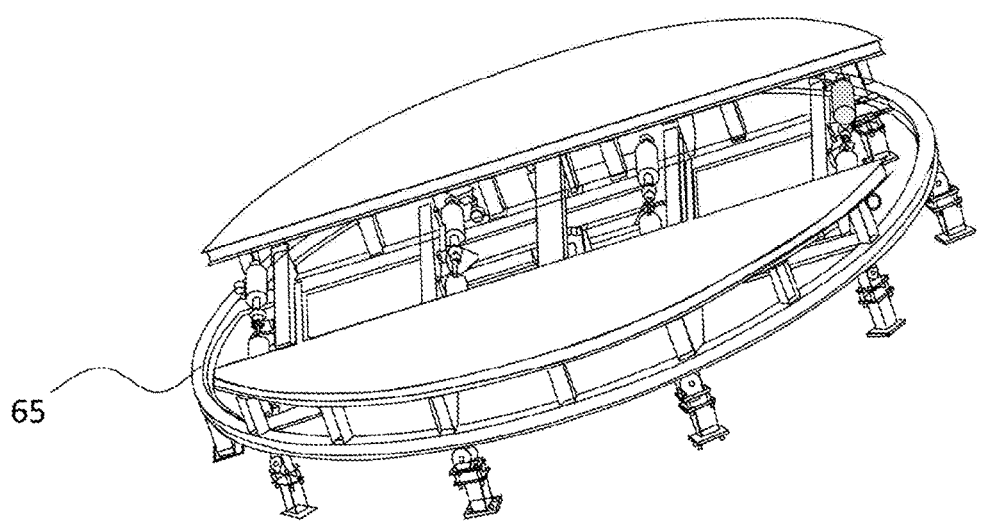

Reference is now made to FIG. 5a-b which schematically illustrates a specific embodiment of a cell unit with a rotating mechanism 65. The rotating mechanism is adapted to rotate a pallet located on it in a rotation angle between about 1° to about 360°, clockwise and counter-clockwise. According to other embodiments, a shuttle unit might be provided with a rotating mechanism adapted to rotate a pallet located on it in a rotation angle between about 1° to about 360°, clockwise and counter-clockwise. As presented in FIG. 5a, a cell unit with a rotating mechanism or a shuttle unit with a rotating mechanism can be mechanically interconnected to another cell unit or shuttle unit, such that a pallet is transported to and from the cell unit with the rotating mechanism or the shuttle unit with the rotating mechanism.

Reference is now made to FIGS. 6-10, in which the cell units and the shuttle units are adapted to transport the pallets in the direction of axis X.

Figure 6:
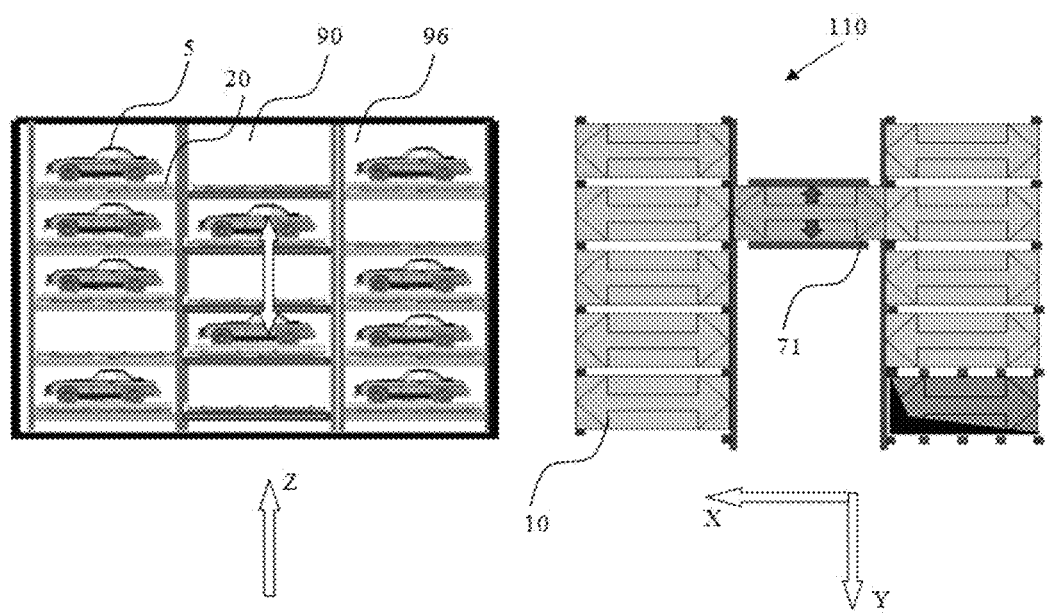
FIG. 6 schematically illustrates a 3D multi-dimensional structure of a specific embodiment of active cell units of the modular system of the present invention.

In FIG. 6, which schematically illustrates a 3D multi-dimensional structure 96 illustrated a specific embodiment of active cell units 10 of a modular system 110 for storage of cargo units in a designated space 90 and for effective exploitation of designated space 90. The multi-dimensional structure 96 comprises 50 cell units and one shuttle unit with lifting mechanism.

According to FIG. 6, multi-dimensional structure 96 comprises five rows and two columns of storing locations for at least one of the cargo units. The rows of multi-dimensional structure 95 are parallel to said to axis Y, and the columns of multi-dimensional structure 96 are parallel to axis X. Each one of cell units 10 is having a lengthwise axis X, and a widthwise axis Y, parallel to axis X and axis Y of multi-dimensional structure 95. According to this embodiment, each cell unit 10 and the shuttle unit are adapted to transport at least one pallet of the plurality of pallets to and from cell unit 10 in direction of axis X. Moreover, multi-dimensional structure 96 comprises five layers in the direction of axis Z, so that shuttle unit 71 is movable not only in the direction of axis Y, but also in the direction of axis Z. According to this figure, vehicle 5 which is placed on pallet 20 is transportable to each one of the cell units 10 within multi-dimensional structure 96.

Figure 7:
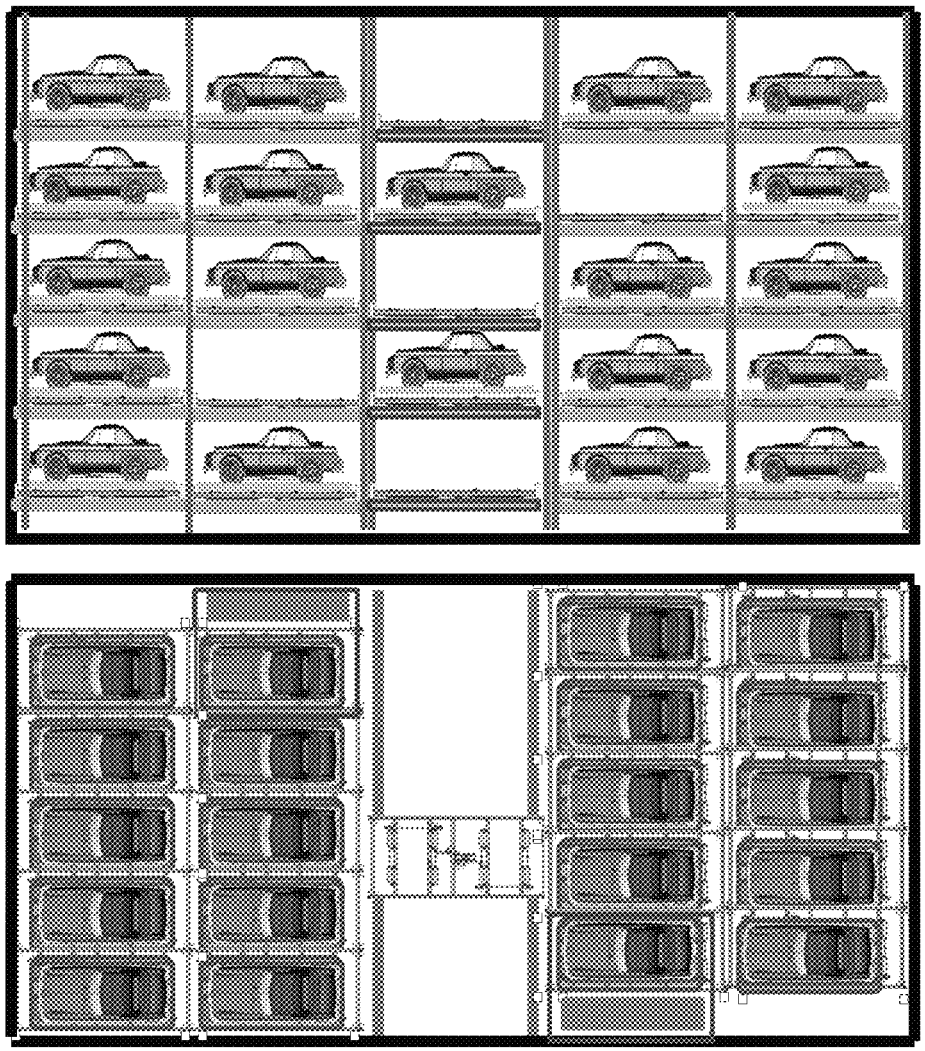
FIG. 7 is a schematic illustration of the modular system of the present invention with one hundred cell units.

Reference is now made to FIG. 7, which schematically illustrates the modular system of the present invention with one hundred cell units. According to this specific embodiment, the multi-dimensional structure is a 3D structure of cell units, fifty cell units in each side of the structure, with a shuttle unit with lifting mechanism therebetween. According to this embodiment, the insertion and the extraction of pallets with vehicles on them is performed by a linear movement and arrangement of the vehicles.

Figure 8A:
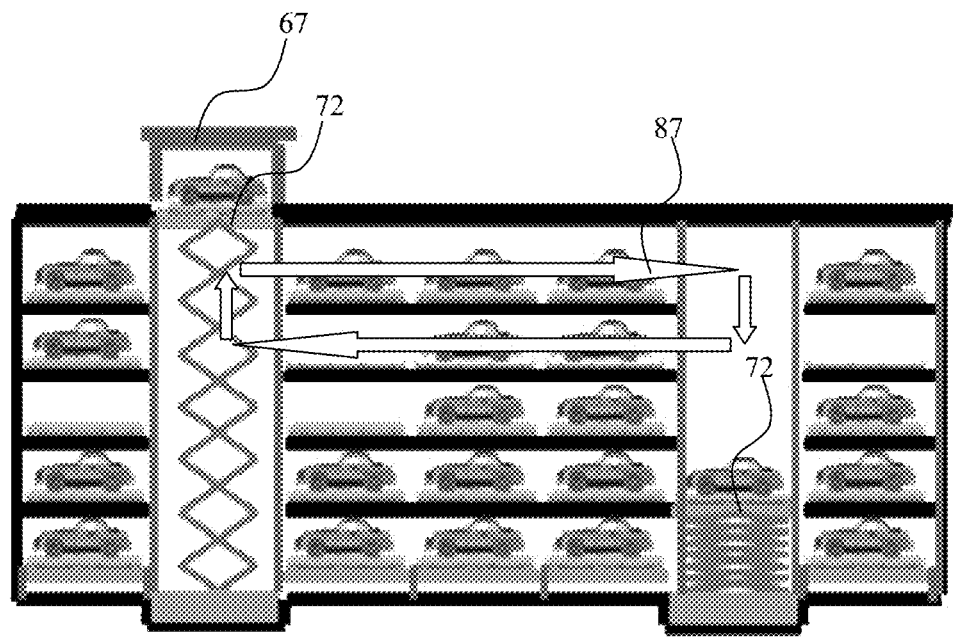
FIGS. 8A-8B are schematic illustrations of the modular system of the present invention with different numbers of cell units.

Reference is now made to FIG. 8a, which schematically illustrates the modular system of the present invention with twenty five cell units. According to this specific embodiment, there is one row of cell units in the direction of axis Y, there are five columns of cell units in the direction of axis X, and there are five layers of cell units in the direction of axis Z. According to this specific embodiment, there are two shuttle units 72 which are movable between the cell units. The arrangement and movement of the pallets is performed via a combination of linear and circular movements of the pallets as illustrated in arrows 87. This arrangement and movement can also be called as "horizontal carousel". The system illustrated in this figure also comprises box 67 to which a vehicle can enter, and which can protect a vehicle.

According to the specific embodiment illustrated in this figure, box 67 is a part of the system which is adapted to receive a vehicle for storage or for delivering the vehicle to user. When a box is part of the system, the pallet is arriving even into a cell unit (or a shuttle unit) within box 67, and the driver can park the vehicle within the box on the pallet. After this the driver can leave the vehicle, and the system will transport the vehicle to a predetermined cell unit.

Figure 8B:
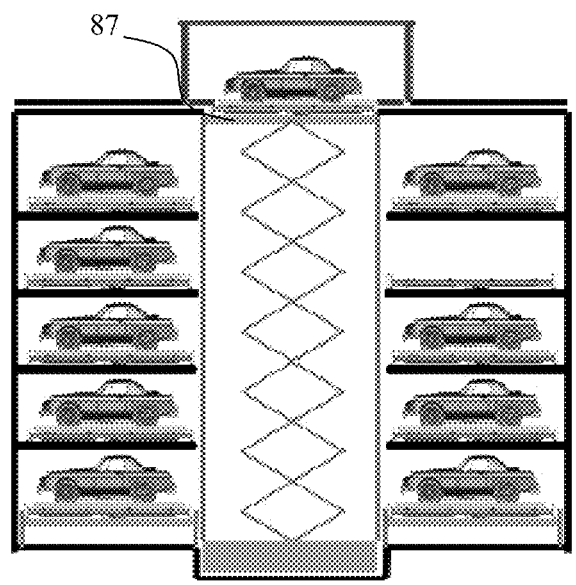

Reference is now made to FIG. 8b, which schematically illustrates the modular system of the present invention with ten cell units. According to this specific embodiment, there is one row of cell units in the direction of axis Y, there are two separated columns of cell units in the direction of axis X, and there are five layers of cell units in the direction of axis Z. According to this specific embodiment, there is one shuttle unit 72 with lifting mechanism which is movable between the layers of the multidimensional structure.

Reference is now made to FIG. 8b, which schematically illustrates the modular system of the present invention with ten cell units. According to this specific embodiment, there is one row of cell units in the direction of axis Y, there are two separated columns of cell units in the direction of axis X, and there are five layers of cell units in the direction of axis Z. According to this specific embodiment, there is one shuttle unit 72 with lifting mechanism which is movable between the layers of the multidimensional structure.

Figure 9A:
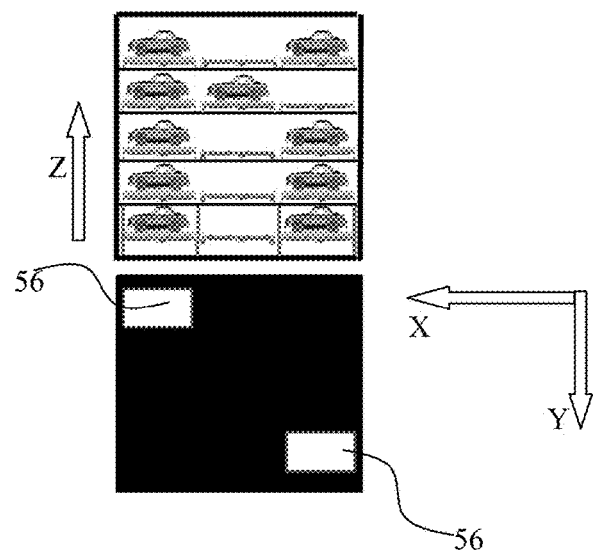
FIGS. 9A-9B are schematic illustrations of the modular system of the present invention with forty five cell units.
Figure 9B:
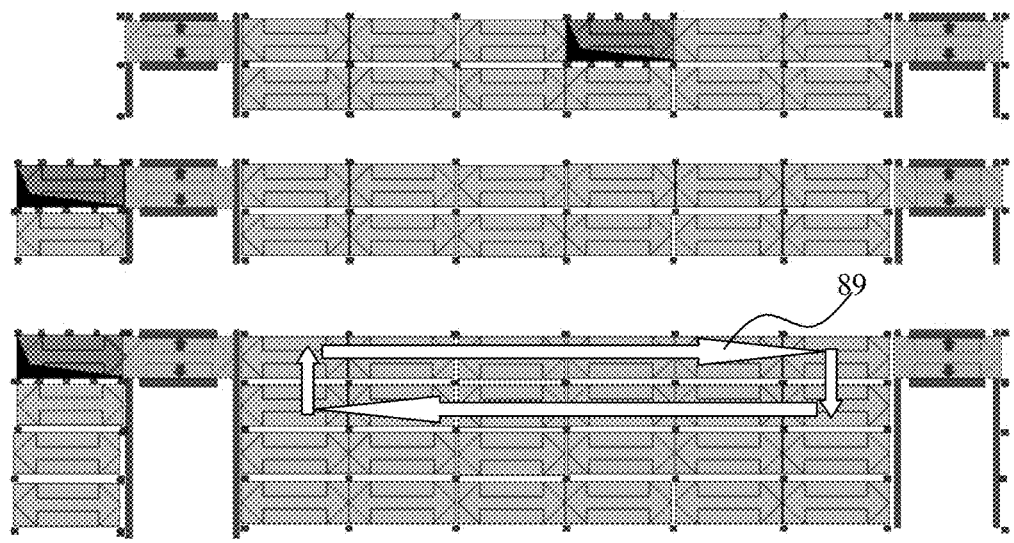

Reference is now made to FIG. 9, which schematically illustrates the modular system of the present invention with forty five cell units. According to this specific embodiment, there are three rows of cell units in the direction of axis Y, there are three columns of cell units in the direction of axis X, and there are five layers of cell units in the direction of axis Z. According to this specific embodiment, there are the shuttle unit with lifting mechanism which is movable between the layers and the rows of the multidimensional structure and there are two entry and exit points 56.

Figure 10A:
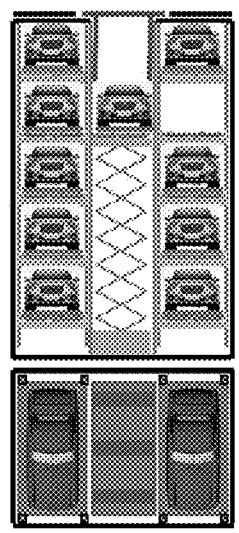
FIGS. 10A-10B are schematic illustrations of the modular system of the present invention.

Reference is now made to FIG. 10a, which schematically illustrates the modular system of the present invention. According to this figure, the multi-dimensional structure is a 2D structure with different number of interconnected cell units. According to this figure, a vertical (in the X-Y plane) arrangement and movement of vehicles might be performed by two shuttle units as illustrated by arrows 89.

Figure 11A:
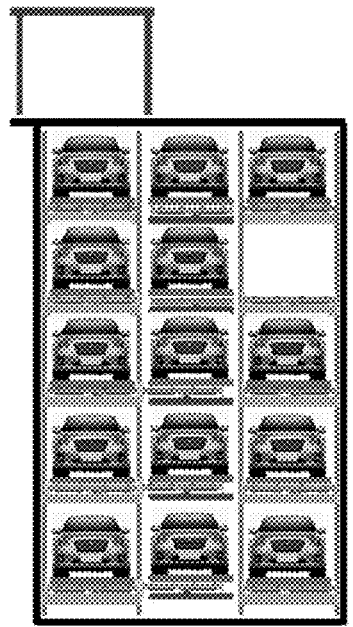
FIGS. 11A-11C illustrate different embodiments of the present invention in which the cell units and the shuttle units are adapted to transport the pallets in the direction of axis Y.
Figure 11B:
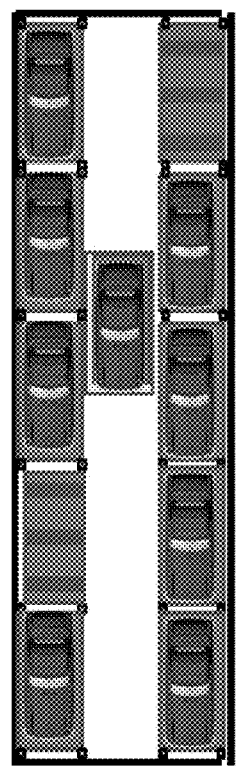
Figure 11C:
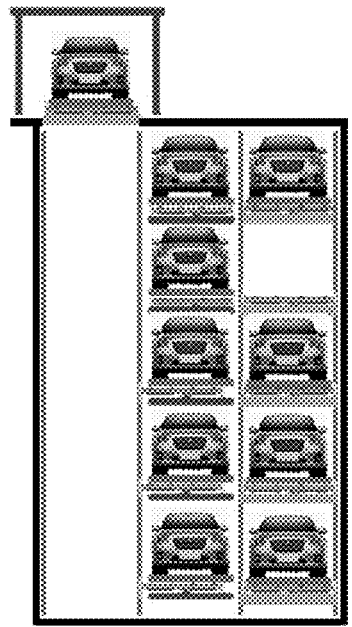
Figure 12A:
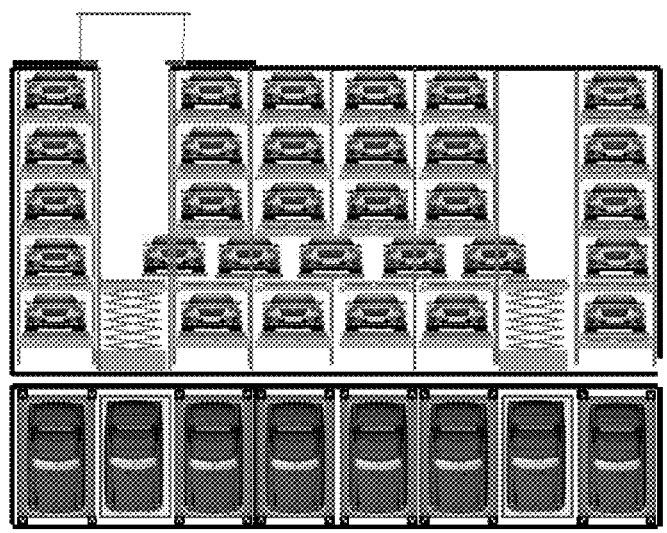
FIGS. 12A-12B illustrate different embodiments of the present invention in which the cell units and the shuttle units are adapted to transport the pallets in the direction of axis Y.
Figure 12B:
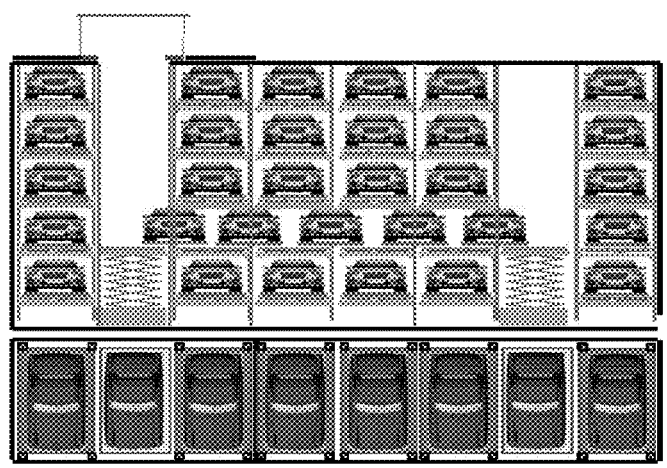

In FIGS. 10-12, illustrated different embodiments of the present invention in which the cell units and the shuttle units are adapted to transport the pallets in the direction of axis Y. In this figures presented 2D and 3D multi-dimensional structures in various embodiments which can be easily understood by a person skilled in the art.

Figure 10B:
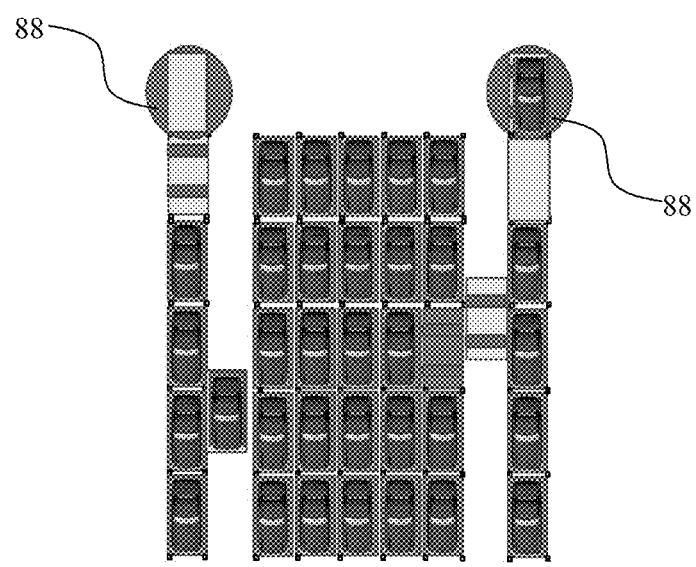

For example, in FIG. 10b, illustrated a 2D multi-dimensional structure of cell units in which there are thirty five cell units for storage of vehicles. The system also comprises two entry/exit cell units with rotating mechanism 88. The embodiment of the present invention also comprises two shuttle units which are movable between the rows of the multi-dimensional structure.

For another example, in FIGS. 11a-c, illustrated a 3D multi-dimensional structure of cell units in which there are fifty cell units for storage of vehicles with shuttle unit with lifting mechanism. FIG. 11b is an upper view on the system from plane X-Y, and FIGS. 11a and 11c are side views on the system from plane Z.

Figure 13A:
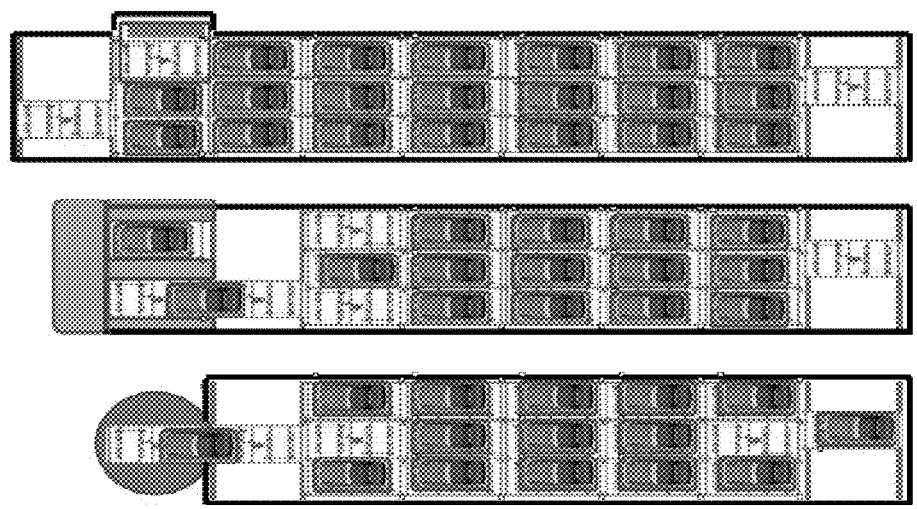
FIGS. 13A-13B illustrate different embodiments of the present invention in which the cell units and the shuttle units are adapted to transport the pallets in the direction of axis X.
Figure 13B:
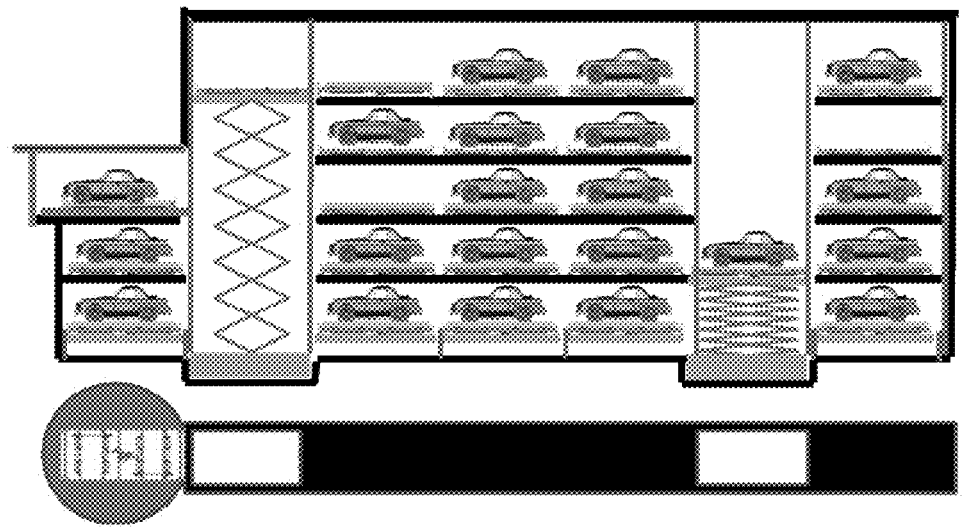
Figure 14A:
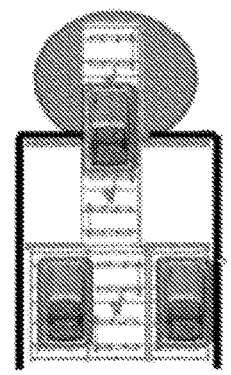
FIG. 14A illustrates a specific embodiment of the present invention in which the cell units and the shuttle units are adapted to transport the pallets in the direction of axis X.

In FIGS. 13-14a, illustrated different embodiments of the present invention in which the cell units and the shuttle units are adapted to transport the pallets in the direction of axis X. In this figures presented 2D and 3D multi-dimensional structures in various embodiments which can be easily understood by a person skilled in the art.

Figure 14B:
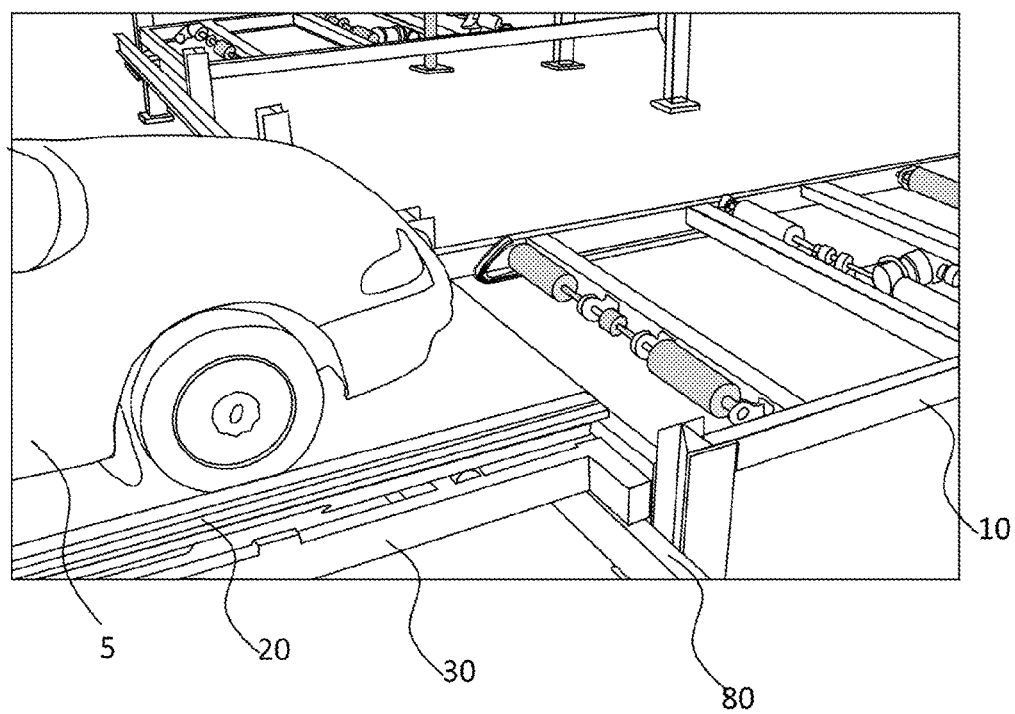
FIG. 14B exemplary illustrates a picture of the system of the present invention; The drawings together with the description make apparent to those skilled in the art how the invention may be embodied in practice.

Reference is now made to FIG. 14b which exemplary illustrates a picture of the system of the present invention.

According to this picture, shuttle 30 is movable on rails 80 with pallet 20 which has a vehicle 5 on it.

According to some embodiments, the system might comprise billing units adapted to manage the billing for the use of the storage locations.

According to some embodiments of the invention, the service level includes at least one box. The box is an area on the service level that allows the conditions for the loading or unloading of a pallet. For example when a user of the system wants to park his/her car, he drives onto a pallet located in the box, and exits the car. Then the pallet transports the car to its storage location.

According to some embodiments of the invention, the blocks forming a box are arranged such that one of the long sides of each of the blocks within the box is adjacent to the long sides of the other blocks that are part of the box (assuming each block is rectangular).

According to some embodiments of the invention, the system may include at least one active shuttle unit to enable access from and to the service level to an elevator.

A block called "elevator" (hereinafter: "elevator") is the location that is reserved for the elevator, active shuttle unit, or any other kind of a mechanism that connects two different levels (e.g., storage levels with a service level) or at least two areas in different level.

According to some embodiments of the invention, under certain circumstances as described for example below, the elevator is referred to as a block, and like any other block, allows transportation at least in two perpendicular (orthogonal) directions within a service level (see FIG. 22).

According to some embodiments of the invention, the system may include at least two buffer blocks (hereinafter: "buffer 1", "buffer 2"). One of which is used for the transportation of empty pallets and the other is used for the transportation of loaded pallets.

The buffers allow, like any other block, transportation at least in any one of two perpendicular directions within service level (see FIG. 23).

According to some embodiments of the invention, under certain circumstances the buffer blocks may be used to provide temporary, short-term storage for a pallet (or pallets) which are in transit from a box to an elevator or vice-versa. As will be described in further detail below, while the buffer blocks are used in this manner, it may be possible to lower the dependence and need for synchronization between the box and the elevator and thereby improve the efficiency and possibly also the simplicity of the system.

According to further embodiments of the invention, under other circumstances, the buffer blocks may be converted into storage blocks, as will be described in greater detail below. Some embodiments of the invention, relate to a system and logic for controlling various aspect of the operation of a service level and storage levels, that allow, while the storage levels are in service time mode, to operate in a service level reception mode that allows the reception of a large flow of cargo in a short period of time, in both service level boxes (assuming that there are two boxes, although according to some embodiments there may be any number of boxes at a service level starting from one and above), while using "buffer 1" and "buffer 2".

The purpose of the reception mode is to receive stocks of cargo one after another (in a batch like manner) to a box and from the box through an elevator to the storage level. There is an option to transfer received cargo to the storage level from a box to an elevator through at least one buffer, and to transfer empty pallets back from the same elevator to the same box through at least one buffer but via a different route. These two routes are substantially without any common buffers. Said different route enables simultaneously and efficient loading and unloading of cargo.

According to some embodiments of the invention, the pallet may be in any one of at least two states:
(a) Empty—the pallet does not hold a cargo (see FIGS. 17A, B, C and D));
(b) Loaded—the pallet holds a cargo (see FIGS. 17(E, F, G, and H)) or cargo (FIGS. 17(I, J, K and L)).

According to some embodiments of the invention, the system includes a service level dedicated to logistical operations including entry and exit of cargo, transport of cargo on their way to or from storage. One or more storage levels will generally be provided in conjunction with the service level to allow the storage of cargo.

Figure 15A:
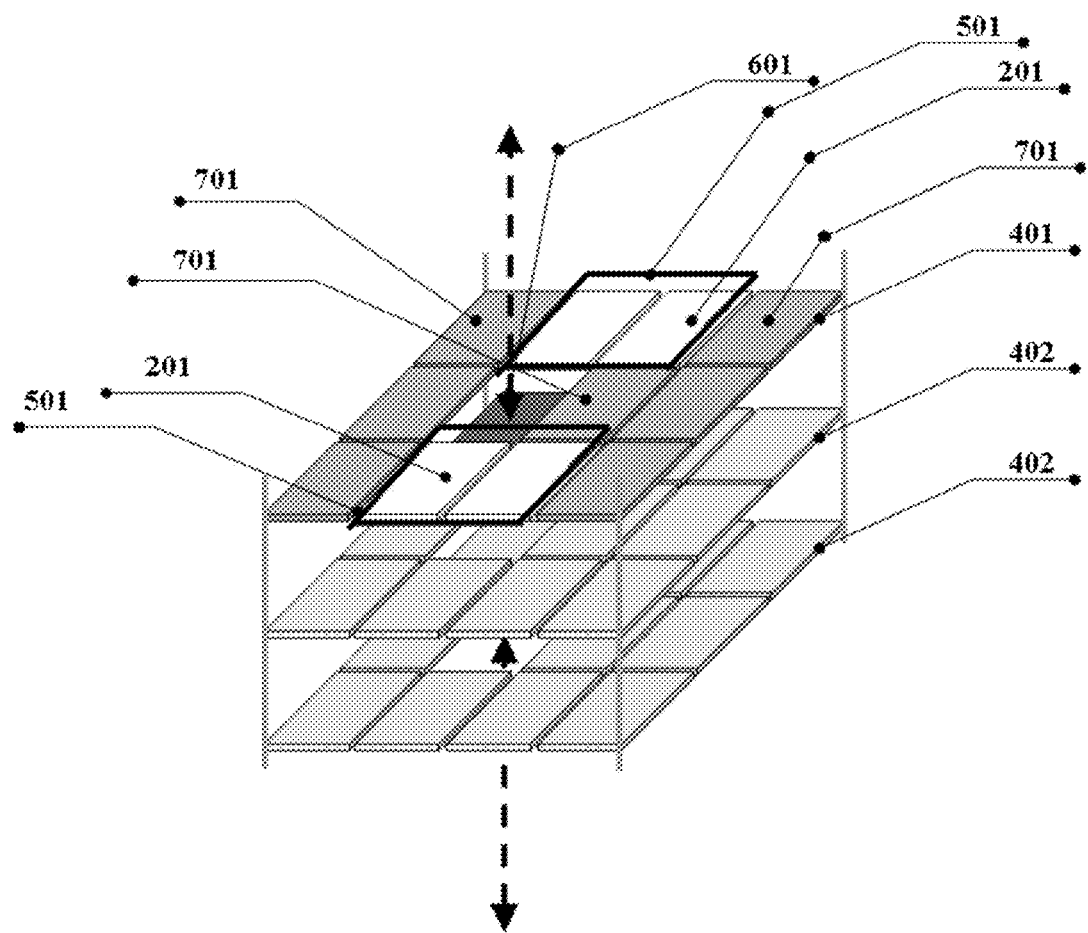
FIGS. 15A-15B are three-dimensional graphical illustrations of a service level ("Level X") and storage levels ("Levels S").
Figure 15B:
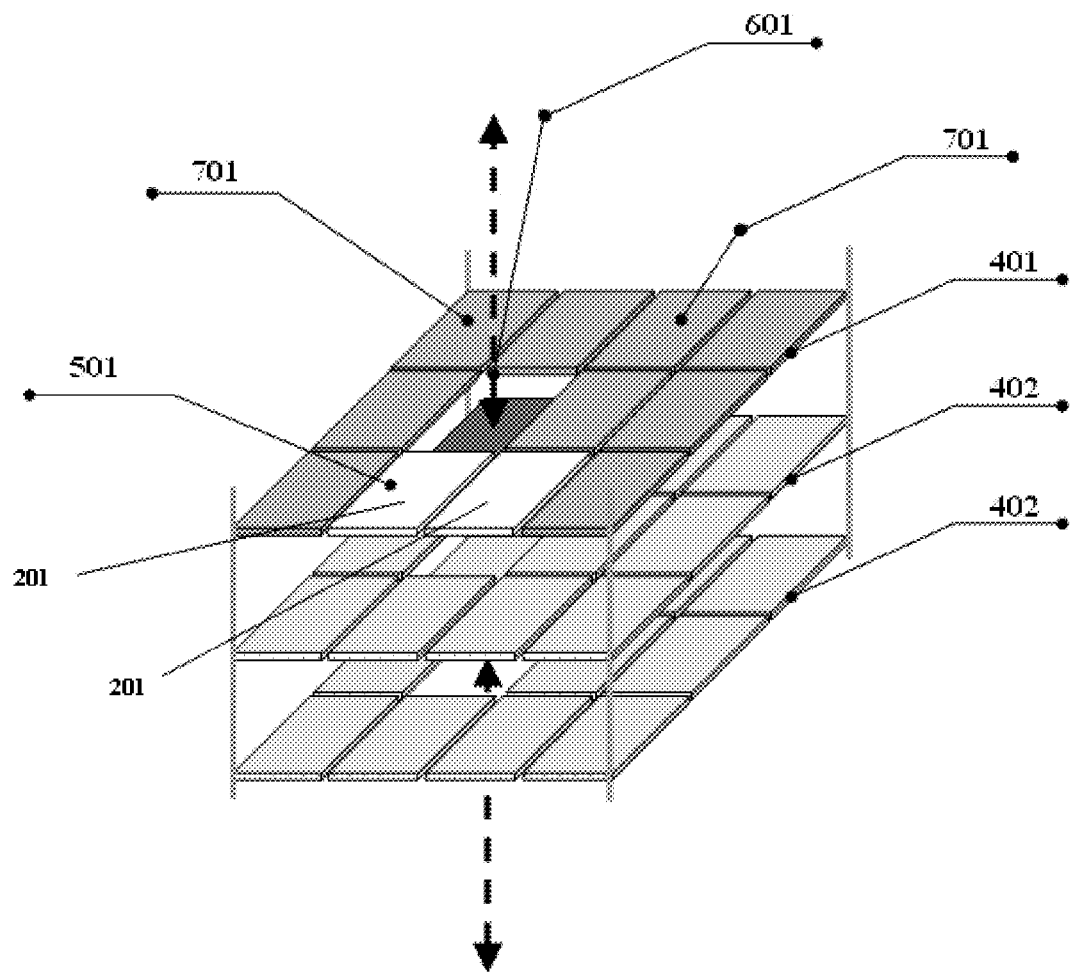

Reference is now made to FIGS. 15A-15B, presenting an illustration of a service level 401 and storage levels 402.

It should be emphasized that all figures are given as an example and the service level might be in any size (i.e., any matrix having regular dimensions of [ixj] or any irregular dimensions as illustrated in FIG. 9D) and shape.

Buffers 701, boxes 501 and elevators 601 are marked on the illustration in the service level. The elevator 601 connects the different levels of the storage/parking facility. In FIGS. 15A-15B the elevator 601 moves vertically from one level to the other, however it should be pointed out that it can also move horizontally from one area of a level to the other.

In this example, the 'boxes' are sets of two adjacent blocks (denotes as numerical references 201). Two blocks are grouped into a box as a functional unit. for example, since two adjacent blocks allow a vehicle occupant to exit the vehicle, unload it, etc. if one block is the expected average width of a vehicle.

FIGS. 15A-15B illustrates different embodiment of the system. In FIG. 15A there are 2 boxes and in FIG. 15B there is one box.

Figure 16A:
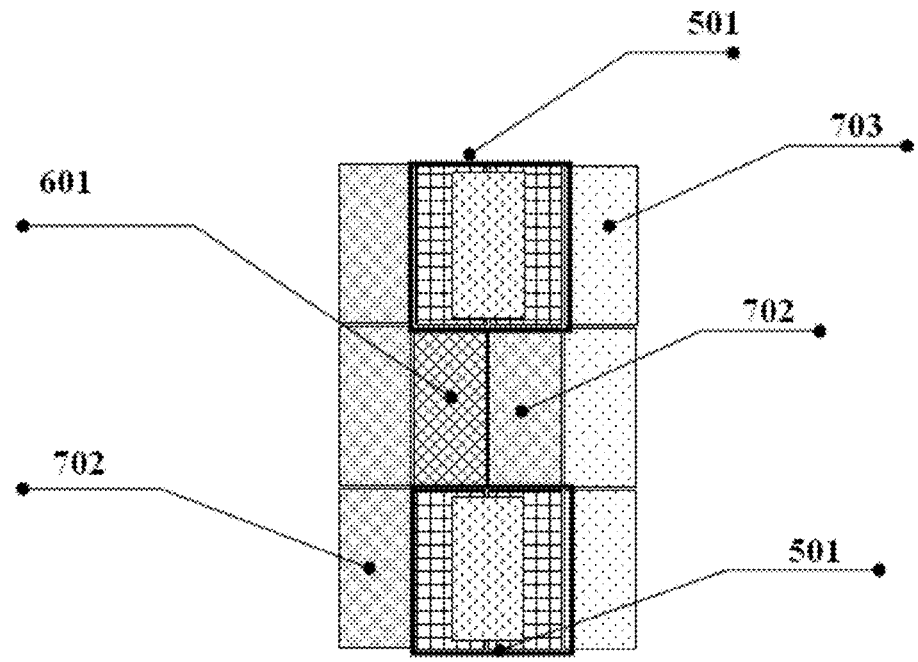
FIGS. 16A-16B are graphical illustrations of a service level ("Level X") according to some embodiments of the invention, with indications of boxes, elevators and buffers ("buffer 1", "buffer 2") areas.
Figure 16B:
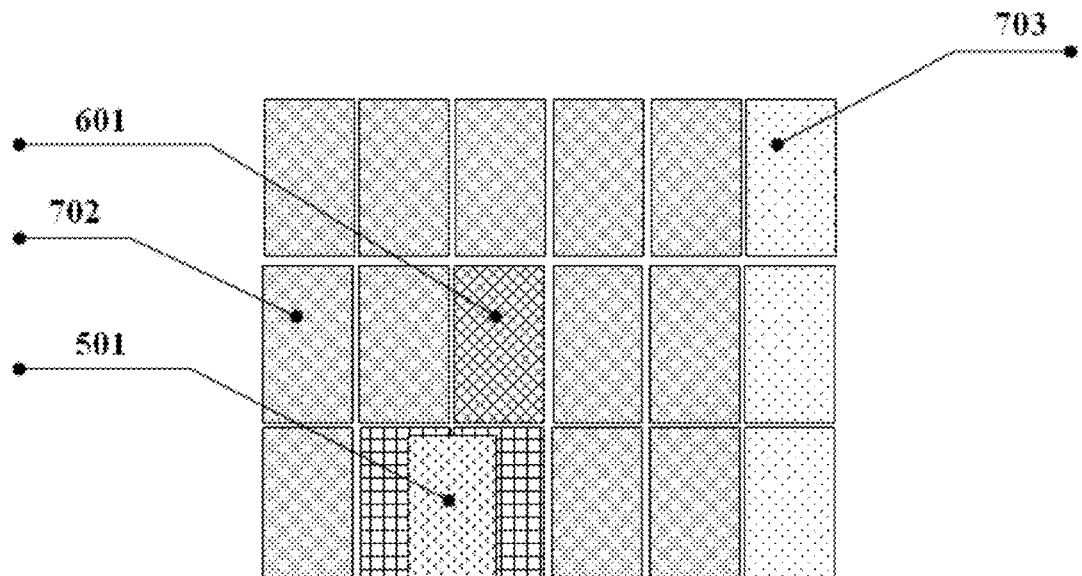

Reference is now made to FIGS. 16A-16B illustrating a service level showing boxes 501, elevators 601 and buffers ("buffer 1" 702, "buffer 2" 703) areas.

"Buffer 1" 702 is used for pallets with cargo. Here the surroundings of "buffer 2" 703 are designed so that "buffer 2" 703 is used as a buffer for empty pallets only. Movement of loaded pallets, with cargo on them, usually does not occur on the blocks of buffer 2 (it might happen in special circumstances as will be described hereinafter).

"Buffer 1", 702, thus constitutes a route for loaded pallets to reach the storage level(s), while "Buffer 2" constitutes a route for transporting empty pallets back from the storage level, and the boxes 501 serve as loading/unloading stations.

The system preferably uses a plurality of boxes, which are located in the area around the elevator on the service level for purposes of loading and unloading cargo from outside the system. For example there are two boxes 501, employed in FIG. 16A, and one box 501, employed in FIG. 16B. An advantage of using more than one box is that usage of elevators is made more efficient. Elevators are typically characterized by a work-cycle that is faster than the time that is typically necessary for a storage cycle (namely the time required to transport cargo on a pallet from the elevator to its storage location, unload the cargo from the pallet the storage location, and return the pallet to the elevator).

According to further embodiments of the invention, multiple boxes provide redundancy and thus increase reliability, improving the system's ability to handle failures. For example, the two-box configuration may enable continued operation of the system even if one box is disabled. As an example, while one of the boxes is down, all the cargo may be released through the other box (or boxes if more than two). This solution is provided by way of example only and should not be construed to limit the scope of the present invention.

Figures 17A, 17B:
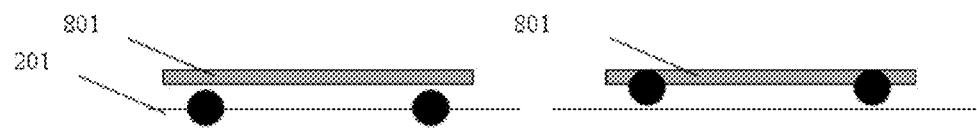
FIG. 17A is a graphical illustration of a pallet without transport mechanisms, while the floor has a transporting mechanism.
FIG. 17B is a graphical illustration of a pallet with an autonomic transport mechanism, and the floor is without mechanisms.

Reference is now made to FIG. 17(A), a graphical illustration of a pallet 801 without transport mechanisms. In this case the floor of each block 201 has a transporting mechanism. FIG. 17(B) is a graphical illustration of a pallet with an automatic transport mechanism while the floor is without mechanisms.

Figures 17C, 17D:
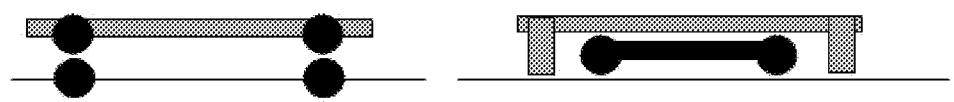
FIG. 17C is a graphical illustration of a pallet with an autonomic transport mechanism and the floor also carries a transport mechanism. These mechanisms work in synergy with each other.
FIG. 17D is a graphical illustration of a pallet without autonomic transport mechanism and the floor is without transport mechanism. A separate mechanism that arrives on the location when necessary exists. This mechanism is used for transporting the pallet from block to block.
Figures 17E, 17F:
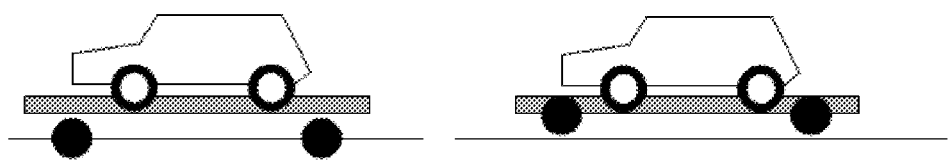
FIG. 17E, 17F, 17G, 17H are graphical illustrations of different pallets (see above) holding a vehicle, where FIG. 17E corresponds to FIG. 17A, FIG. 17F corresponds to FIG. 17B, FIG. 17G corresponds to FIG. 17C and FIG. 17H corresponds to FIG. 17D.
Figure 17G:
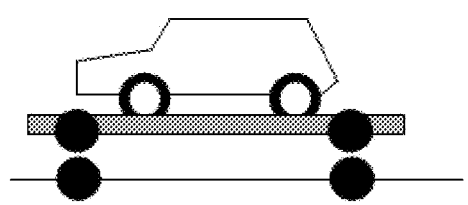
Figure 17H:
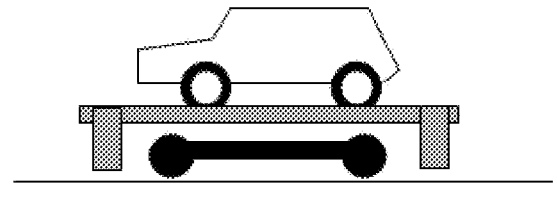
Figure 17I:
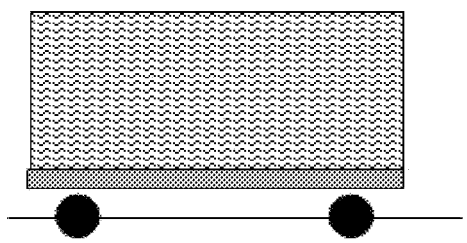
FIGS. 17I, 17J, 17K, 17L are graphical illustrations of different pallets (see above) holding boxes and cargo, where FIG. 17I corresponds to FIG. 17A, FIG. 17J corresponds to FIG. 17B, FIG. 17K corresponds to FIG. 17C and FIG. 17L corresponds to FIG. 17D.
Figure 17J:
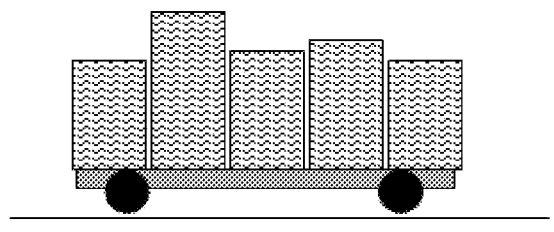
Figure 17K:
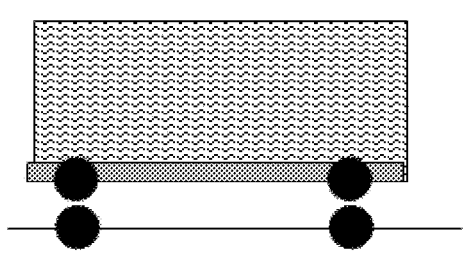
Figure 17L:
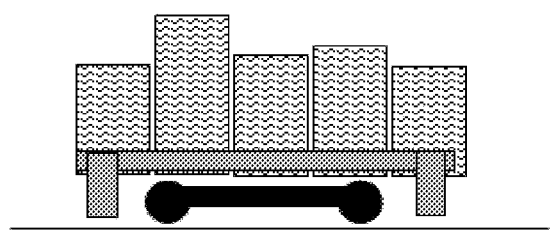

FIG. 17(C) is a graphical illustration of a pallet with an automatic transport mechanism whilst the floor (e.g., block 201) also carries a transport mechanism. These mechanisms work in synergy with each other. FIG. 17(D) is a graphical illustration of a pallet without autonomic transport mechanism and the floor is without transport mechanism. A separate transport mechanism that arrives on the location when necessary is provided in this case. This mechanism is used for transporting the pallet from block to block. FIG. 17(E), 17(F), 17(G), 17(H) are graphical illustrations of different pallets (see above) holding cargo. FIG. 17(I), 17(J), 17(K), 17(L) are graphical illustrations of different pallets (see above) holding boxes and cargo.

Figures 18A, 18B:
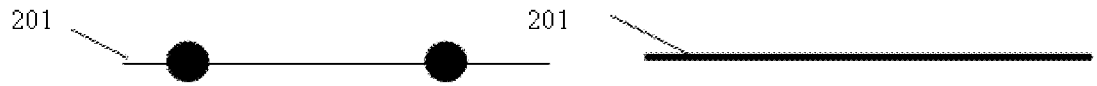
FIGS. 18A-18B are graphical illustrations of the difference in the structure of a block.

Reference is now made to FIGS. 18(A) and 18(B), graphical illustrations of two different possible embodiments of the structure of a block 201.

In 18(A) the block includes a transportation mechanism and in 18(B) the block constitutes a floor without mechanisms.

Figure 18C:
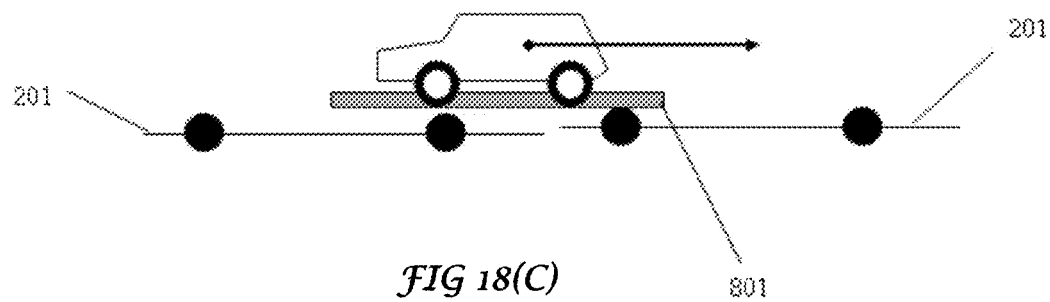
FIG. 18C is a graphical illustration of the transportation of a pallet without mechanisms between blocks that have transportation mechanisms.

FIG. 18(C) is a graphical illustration of the transportation of a pallet without mechanisms between blocks that have transportation mechanisms.

Figure 18D:
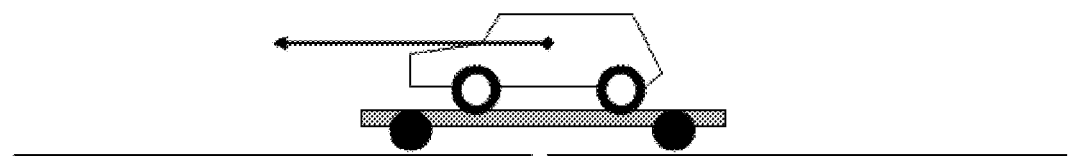
FIG. 18D is a graphical illustration of the transportation of a pallet with transportation mechanisms between blocks without transportation mechanisms.

FIG. 18(D) is a graphical illustration of the transportation of a pallet with transportation mechanisms between blocks without transportation mechanisms.

Figure 19A:
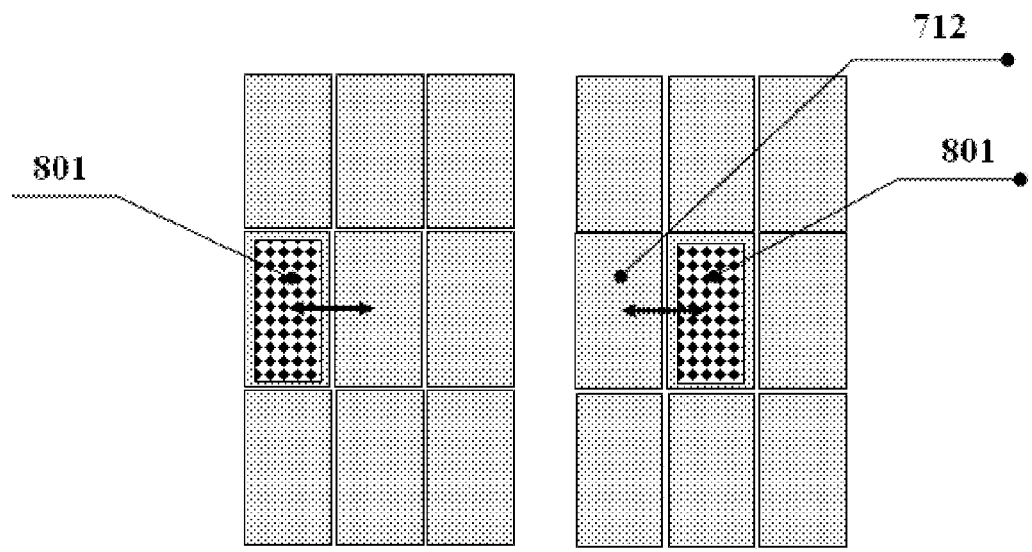
FIGS. 19A-19B are graphical illustration of a manner by which a pallet may be transported in perpendicular directions.
Figure 19B:
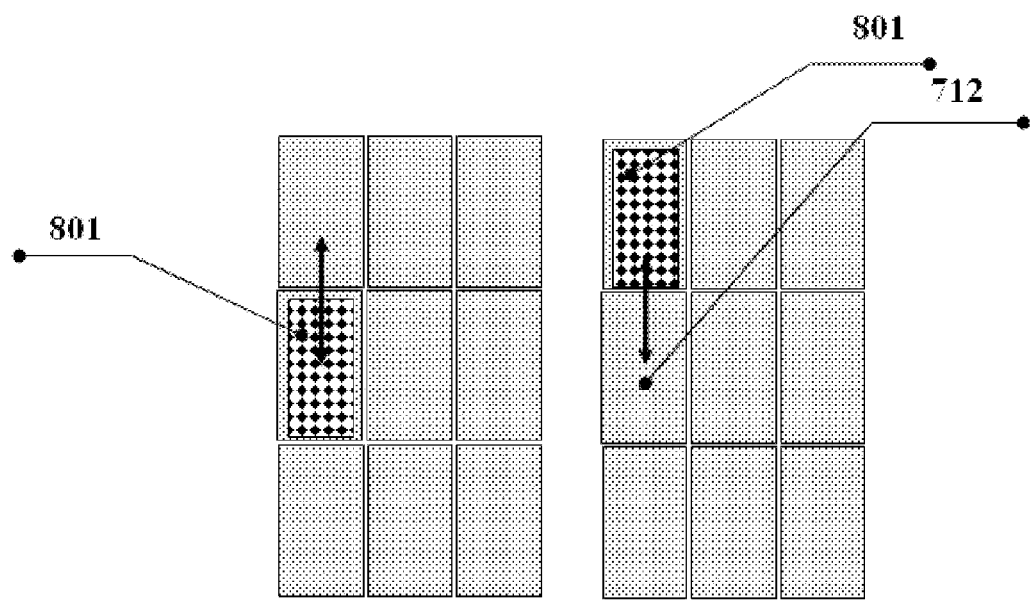

Reference is now made to FIGS. 19(A) and 19(B), a graphical illustration of one manner by which a pallet 801 may transported from one position to another position in two different perpendicular directions.

Figure 20A:
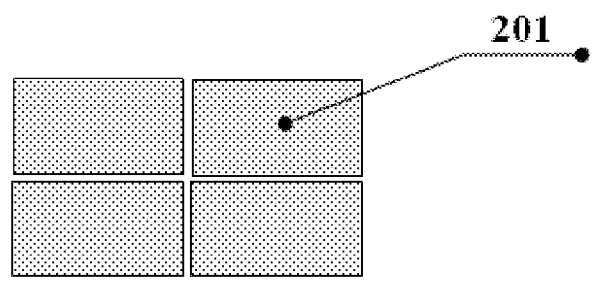
FIGS. 20A-20B are graphical illustrations of the minimal area of a service level built out of blocks.

Reference is now made to FIG. 20A, a graphical illustration of the minimal area of a service level built of blocks 201. The minimal area comprises a length of two blocks 201; and the width is two blocks.

Figure 20B:
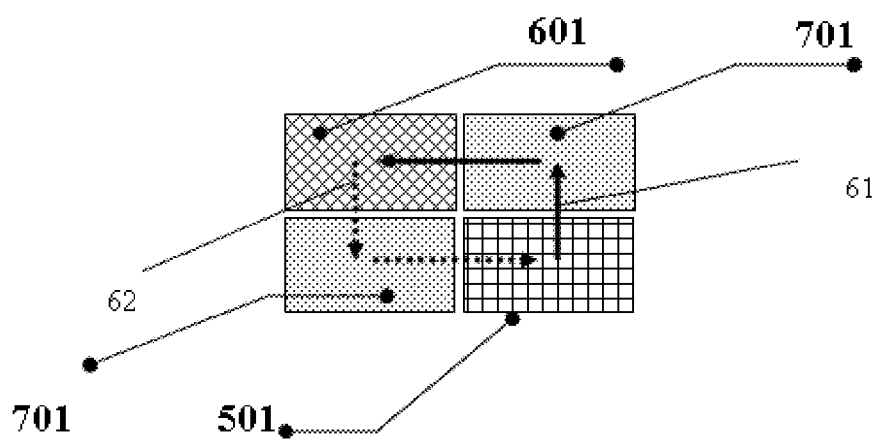

Reference is now made to FIG. 20B, a graphical illustration of the two different path for transporting cargo from and to the service area. In the first path, cargo is transported from the storage level (via the elevator 601) to the box 501 in the service area via the buffer 701. The first path is denoted with the dotted arrows 62. In the second path, cargo is transported from the box 501 in the service area via the buffer 701 to the storage level via the elevator 601. The second path is denoted with the solid arrows 61. As can be seen from both figures each cargo can be transported in two orthogonal directions.

Furthermore, it should be emphasized that the storage path and the removal path are completely independent with no overlap thus, allowing simultaneous operation.

Figure 21A:
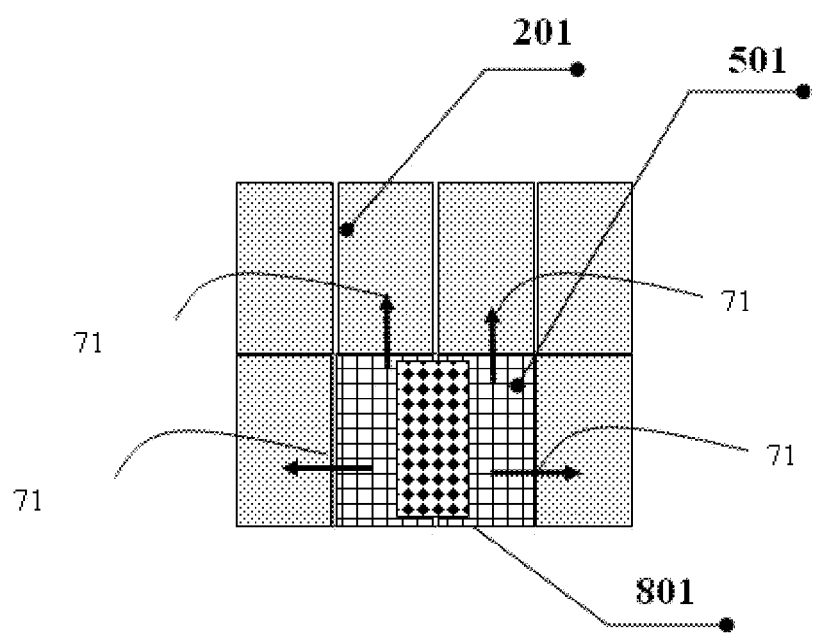
FIGS. 21A-21C are graphical illustrations of the transmission between the box and the adjacent blocks. The arrows show the directions of the transmission.
Figure 21B:
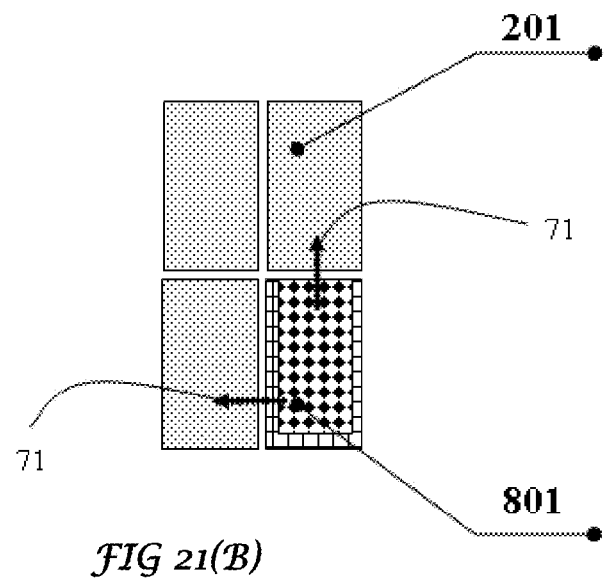
Figure 21C:
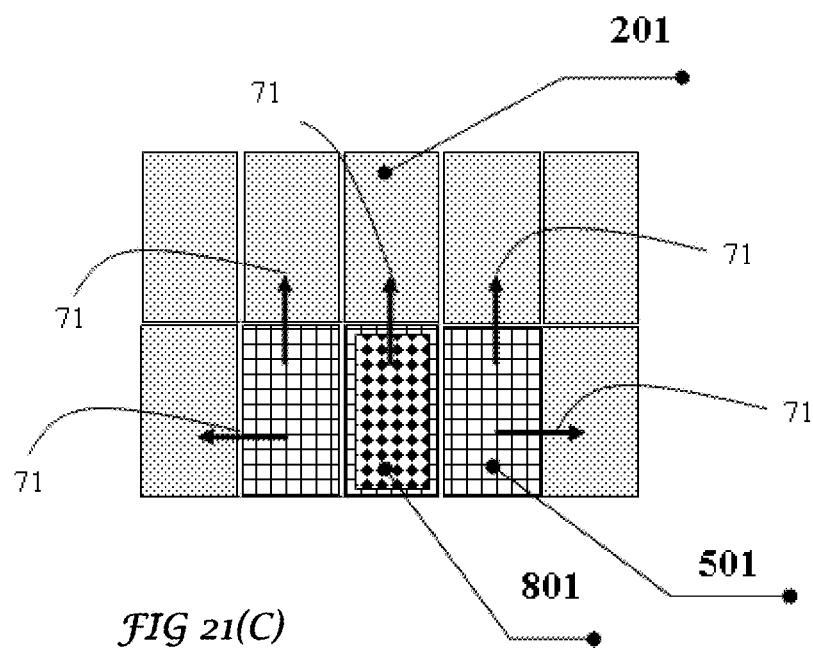

Reference is now made to FIGS. 21(A)-21(C), in which a graphical illustration of the transmission between the box 501 and the adjacent block 201 (which may be a buffer 701 or elevator 601) is provided. The arrows (denotes as numerical reference 71) show the directions of the transmission of pallet 801, which in FIG. 21A occupies the center of box 501, straddling the two blocks that comprise the box. Box 501 consists of two adjacent blocks. It should be appreciated, that in all cases, one side of the box 501 is adjacent to the outer border of the service level. FIG. 21(A) illustrates an embodiment in which the service level comprises a matrix of 4×2 blocks; FIG. 21(B) illustrates an embodiment in which the service level comprises a matrix of 2×2 blocks; and, FIG. 21(C) illustrates an embodiment in which the service level comprises a matrix of 5×2 blocks.

It should be noted that in FIG. 21C the box comprises 3 blocks.

Figure 22A:
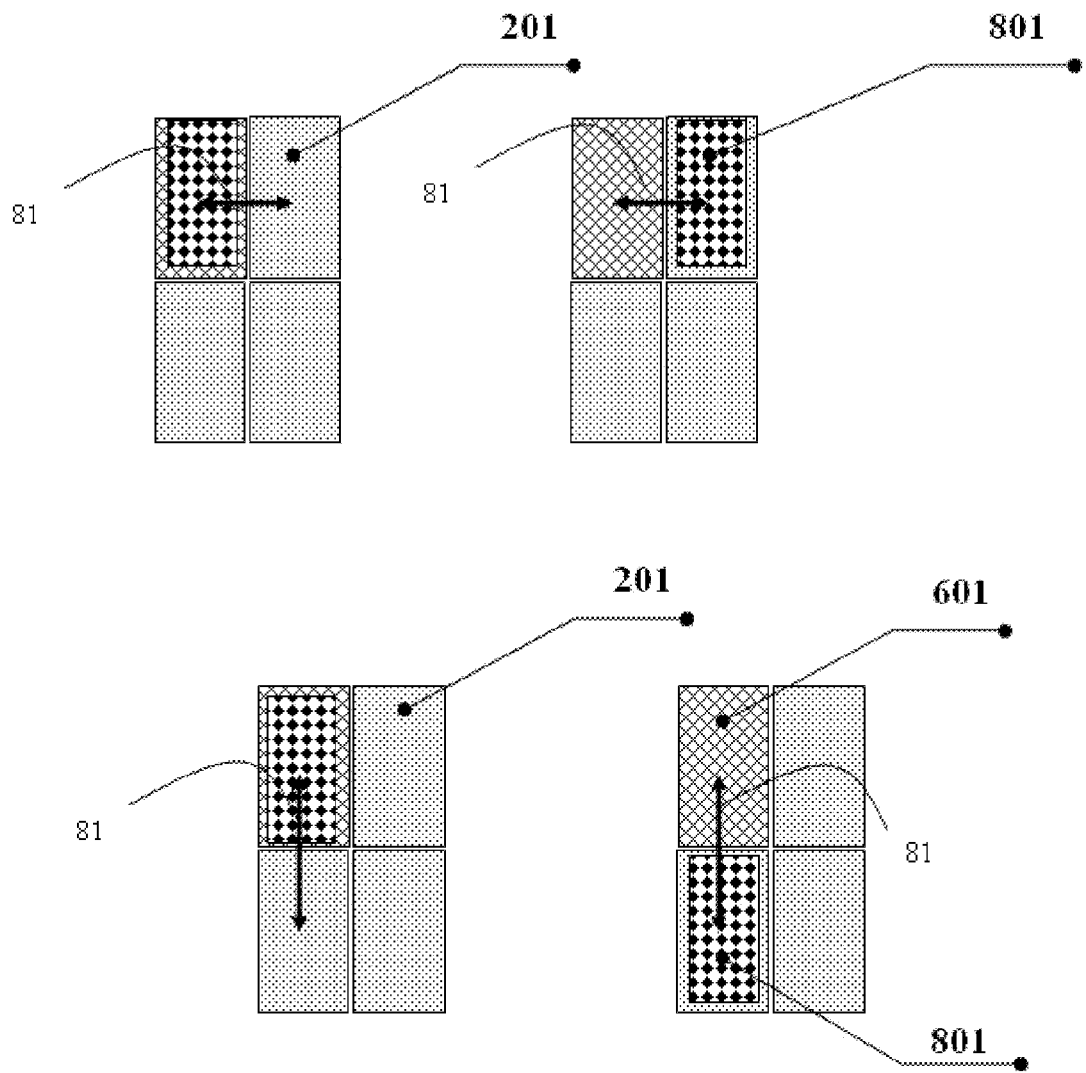
FIGS. 22A-22C are graphical illustrations of the transmission between the elevator and the adjacent blocks. The arrows show the directions of the transmission.
Figure 22B:
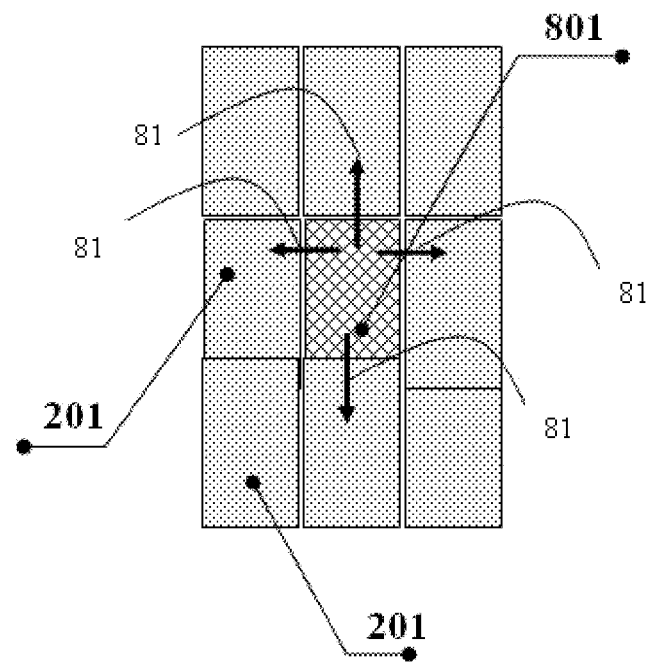
Figure 22C:
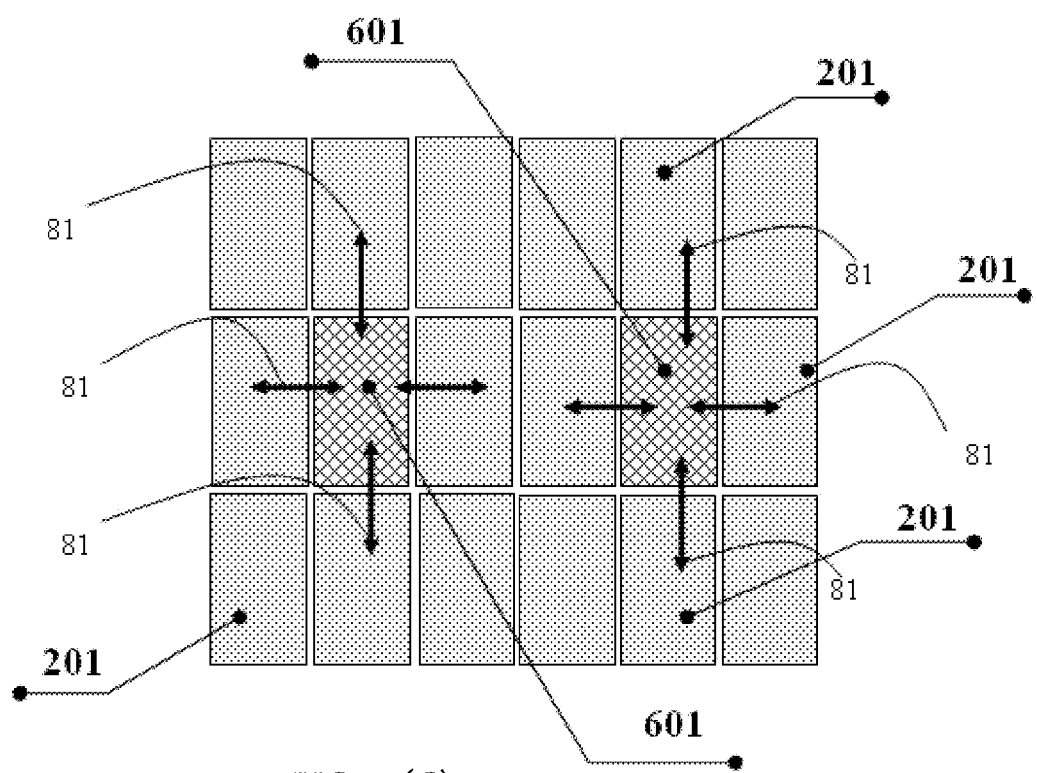

Reference is now made to FIGS. 22A-22C, an illustration of pallet transport between the elevator 601 and the adjacent block 201 (which may be buffer or box). The arrows (denotes as numerical reference 81) show the directions of the movement of pallet 801. It should be emphasized that according to a preferred embodiment of the present invention the elevator 601 enables the movement of pallets in two orthogonal directions.

FIG. 22(A) illustrates an embodiment in which the service level comprises a matrix of 2×2 blocks; FIG. 22(B) illustrates an embodiment in which the service level comprises a matrix of 3×3 blocks; and, FIG. 22(C) illustrates an embodiment in which the service level comprises a matrix of 6×3 blocks.

Furthermore FIG. 8C illustrates and embodiment in which two elevators exists.

Figure 23A:
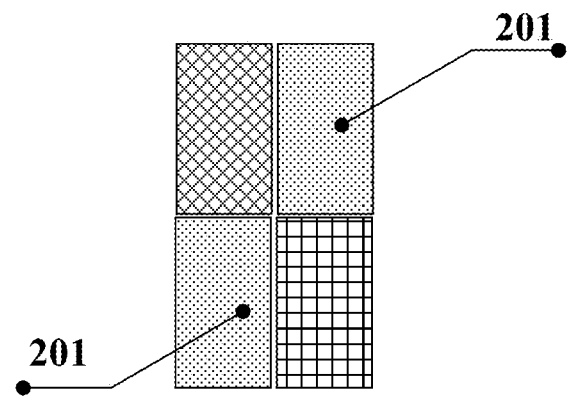
FIGS. 23A-23D are graphical illustrations of different embodiments of the service level and the different path exists therein.

Reference is now made to FIGS. 23A-23D, an illustration of the buffers 701 scattered in a service level. FIG. 23A illustrates the minimum configuration of the system which comprises 2 block 201, one elevator 601 and one box 501.

Figure 23B:
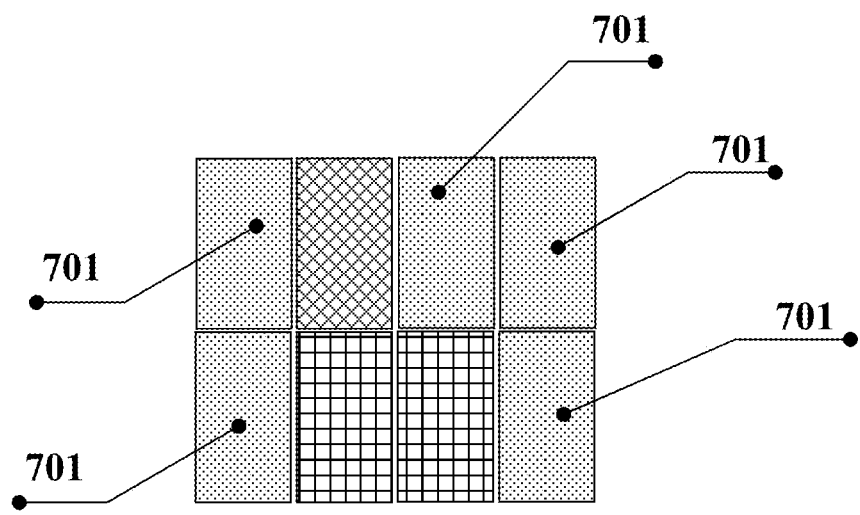

FIG. 23B illustrates a system which comprises a configuration in which there are 4×2 blocks.

FIG. 23B also illustrates the two different paths for storage and retrieval of cargo. The first path (denoted by the solid arrows) is a storage path in which cargo is received from outside the system into box 501 and then to the elevator 601 through buffers 701.

The second path (denoted by the dotted arrows) is a retrieval path in which cargo is extracted outside the system (i.e., from the storage level via the elevator 601 to the service level, from there to box 501 through buffers 701).

Figure 23C:
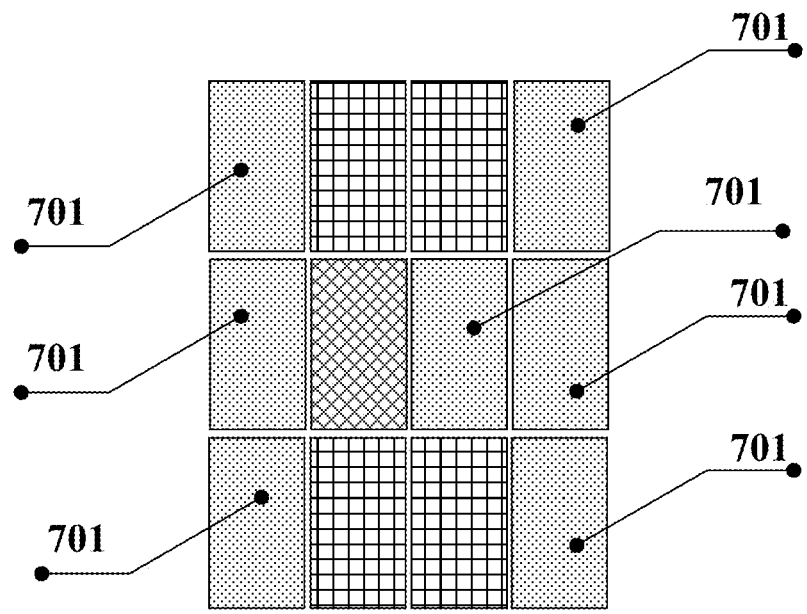
Figure 23D:
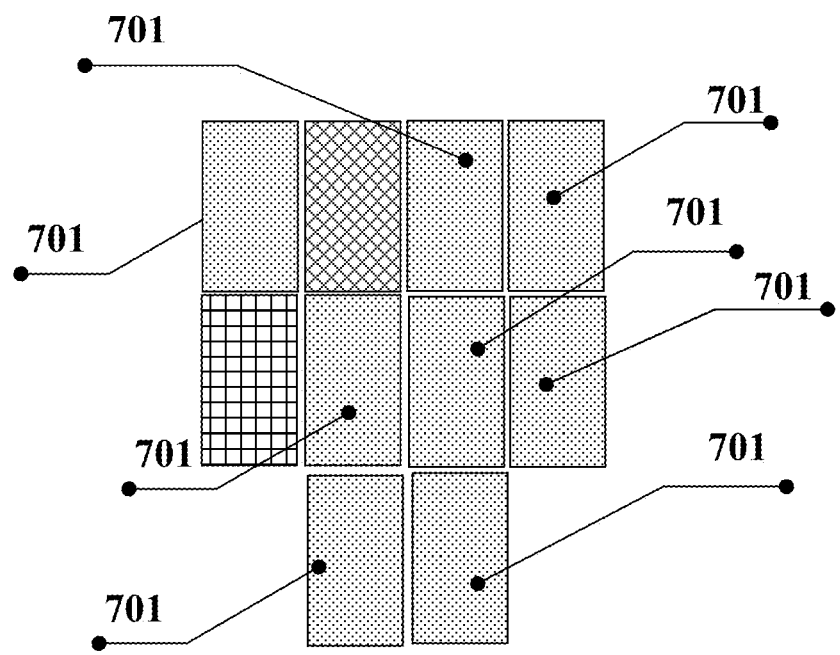

FIG. 23C illustrates an embodiment in which two boxes are utilized. Usage of two boxes increases the efficiency of the system and converts the system to be redundant such that the operation of the system is not neutralized by malfunction of one box.

Figure 24A:
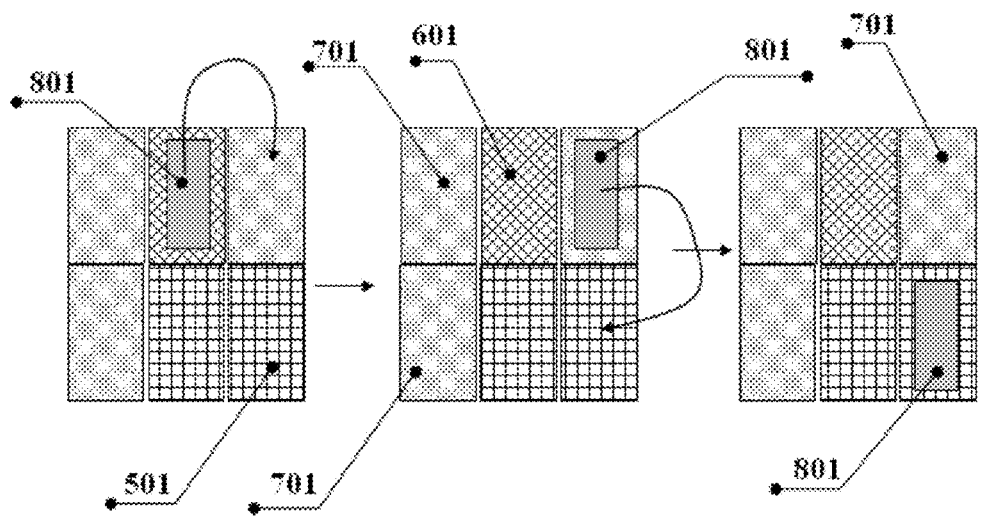
FIGS. 24A-24B are graphical illustrations of the transmission between a block and the adjacent blocks (including buffer blocks, elevator and boxes).
Figure 24B:
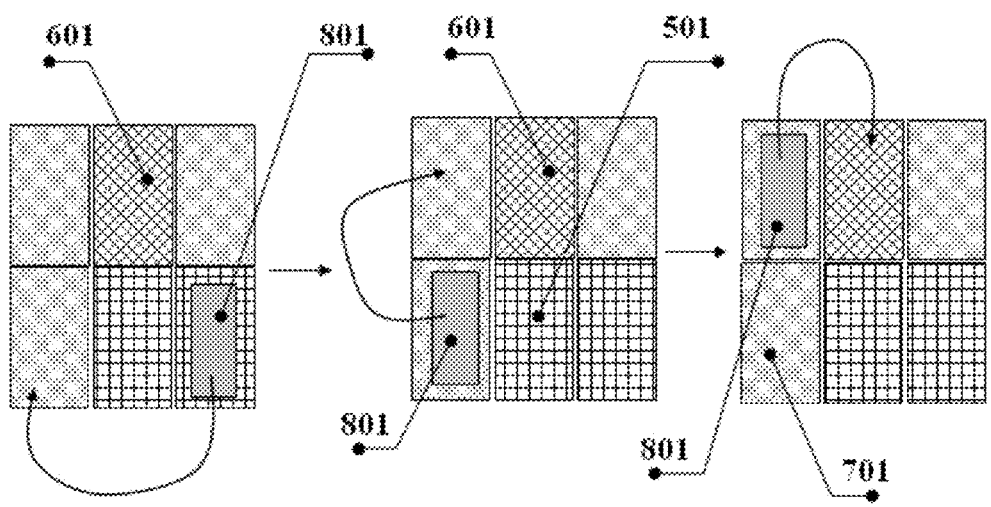
Figure 25A:
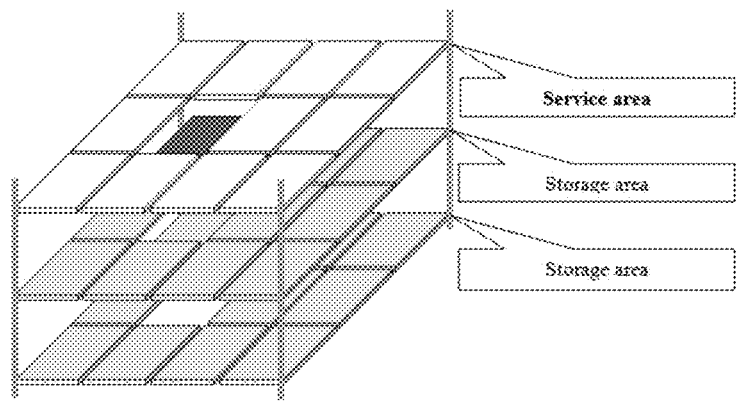
FIGS. 25A-25H illustrate complex types with service and storage areas.
Figure 25B:
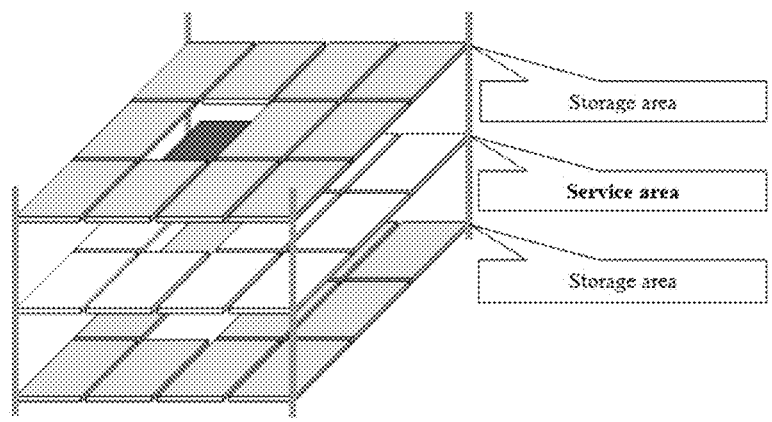
Figure 25C:
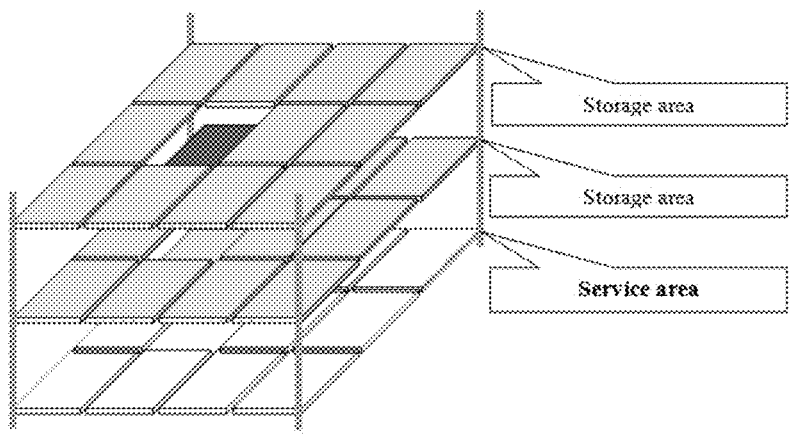
Figure 25D:
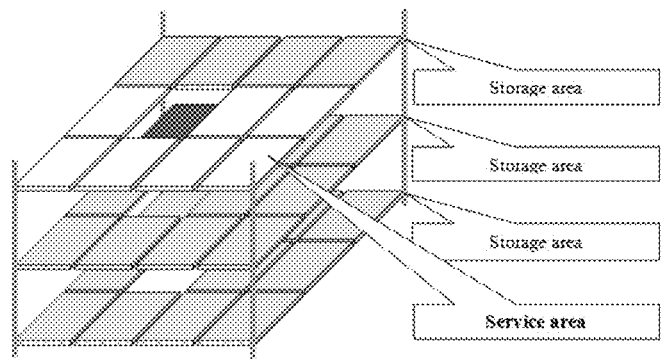
Figure 25E:
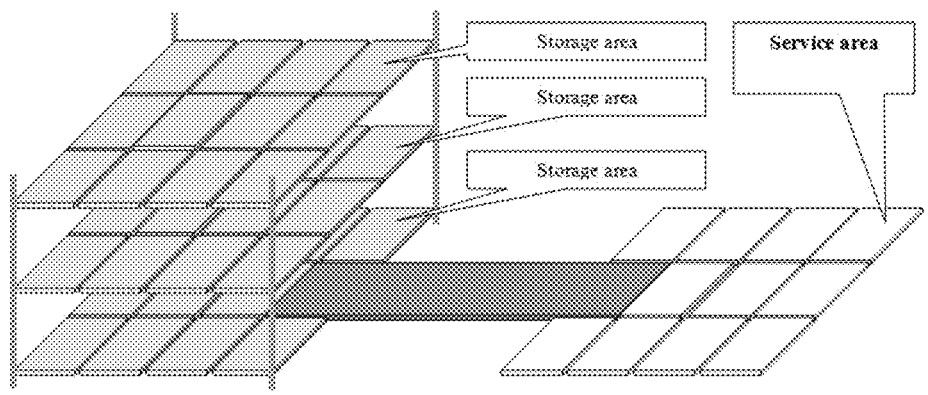
Figure 25F:
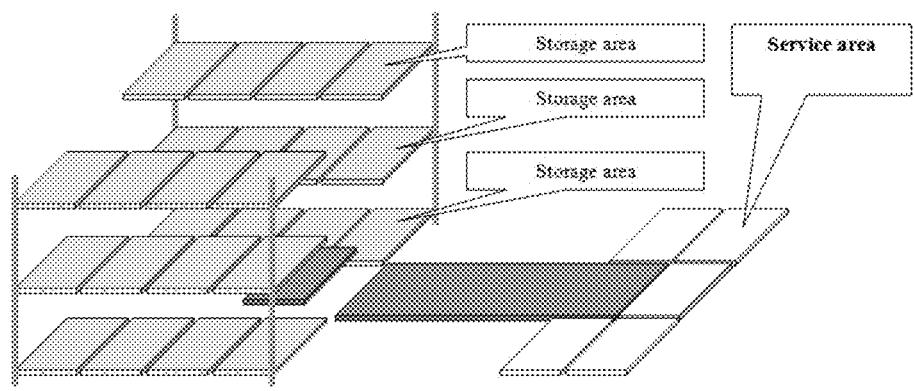
Figure 25G:
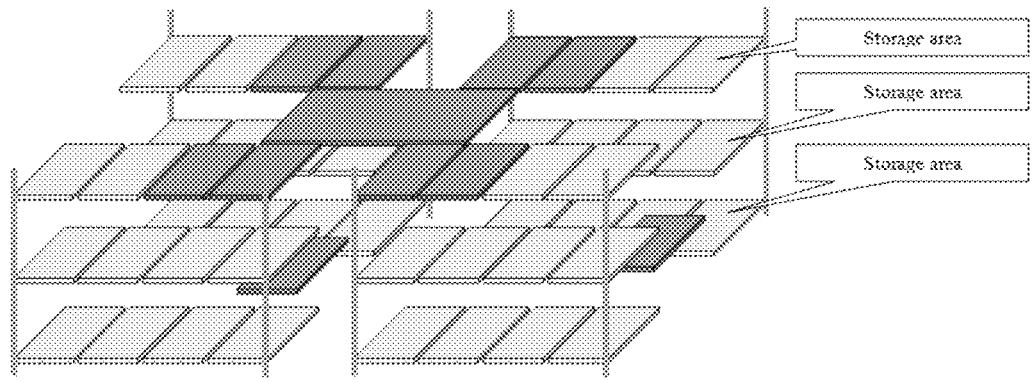
Figure 25H:
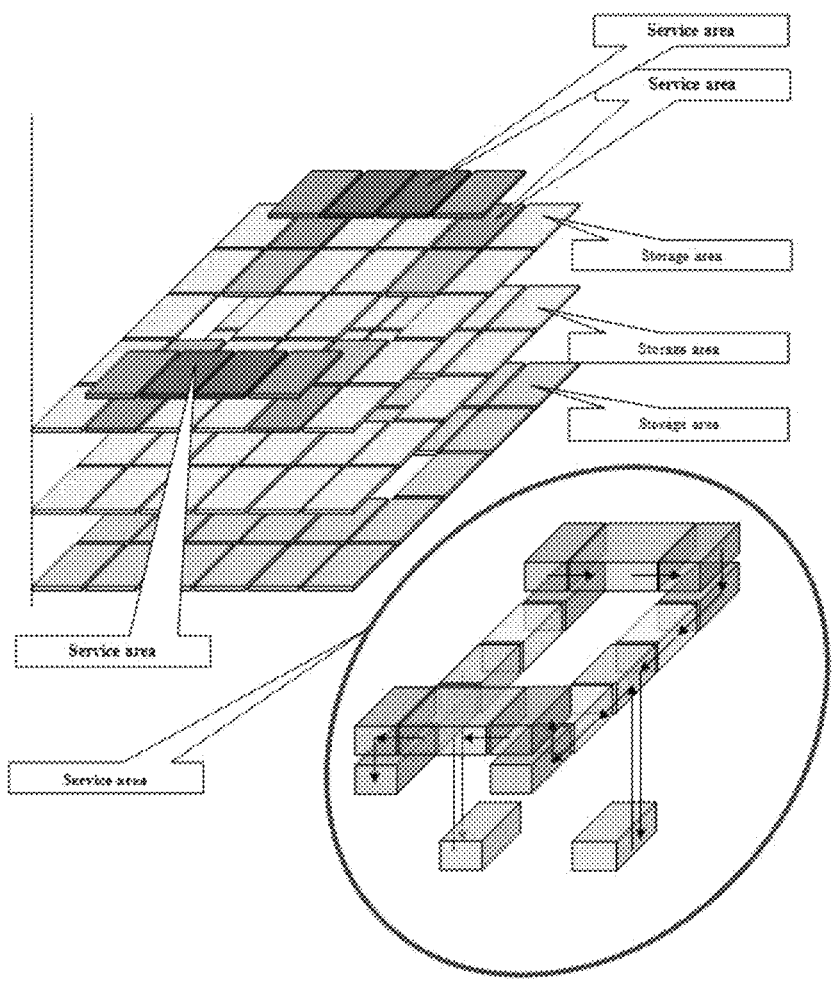
Figure 26A:
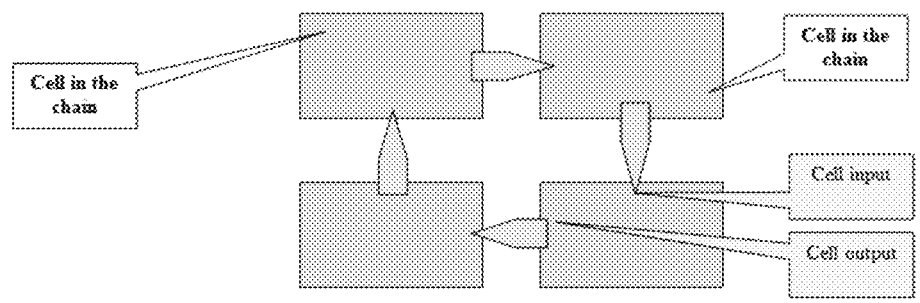
FIGS. 26A-26D illustrate connection types between the cells into closed chains indicating inputs and outputs of each cell.
Figure 26B:
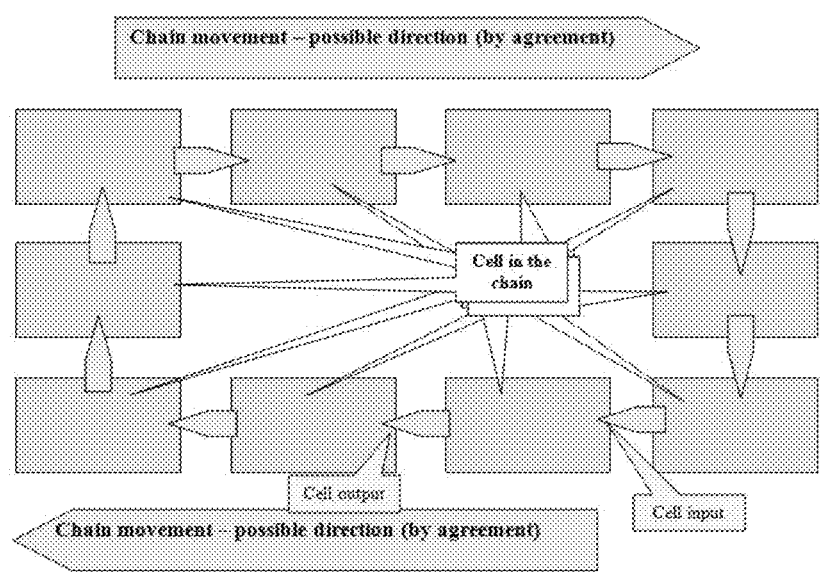
Figure 26C:
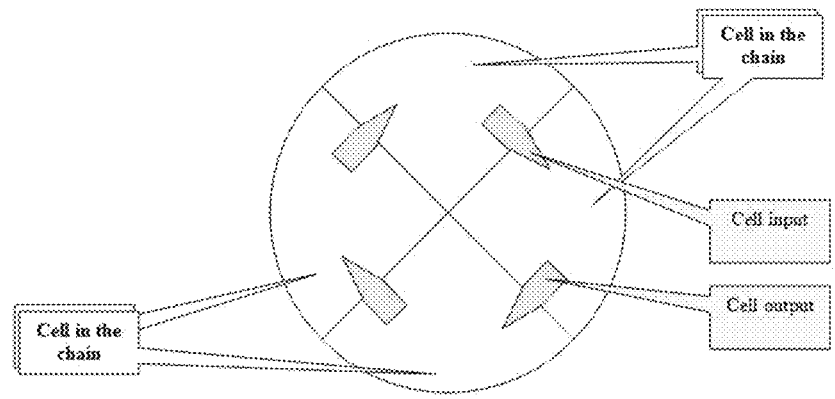
Figure 26D:
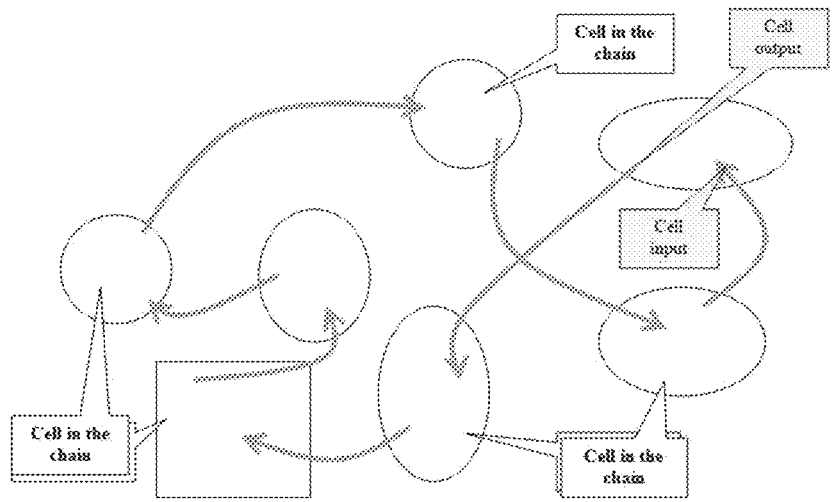
Figure 27A:
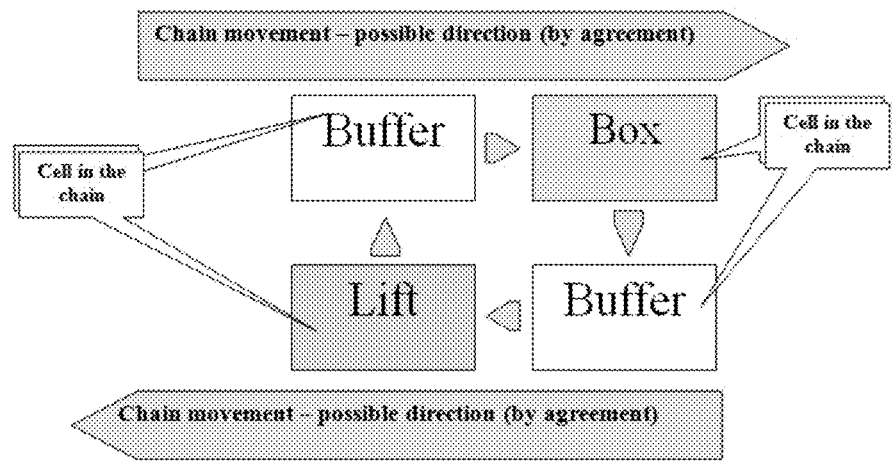
FIGS. 27A-27D illustrate chain types indicating box-cells, lift-cells and buffer-cells.
Figure 27B:
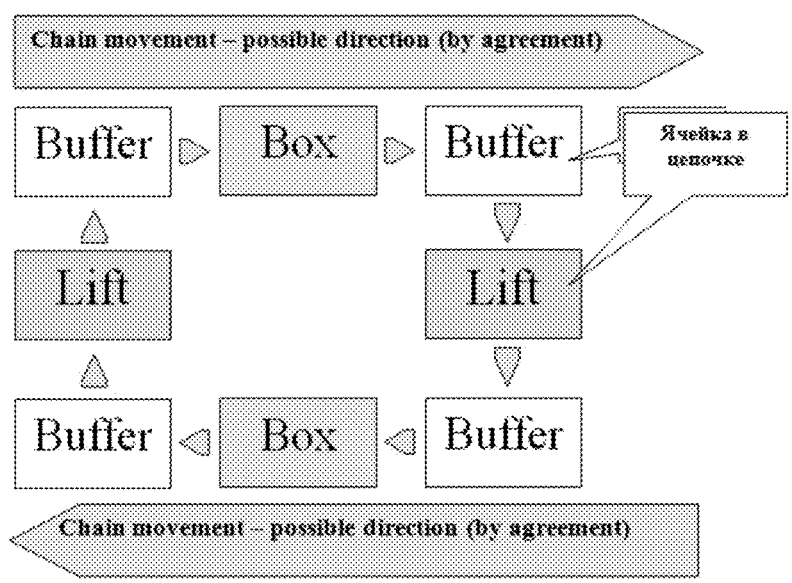
Figure 27C:
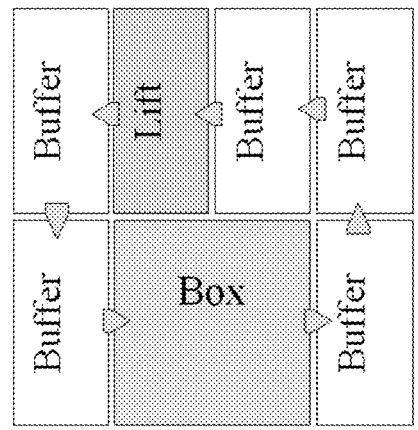
Figure 27D:
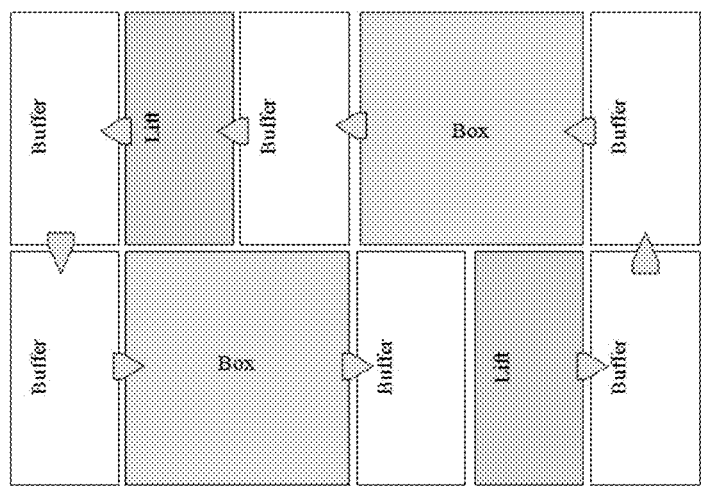
Figure 28A:
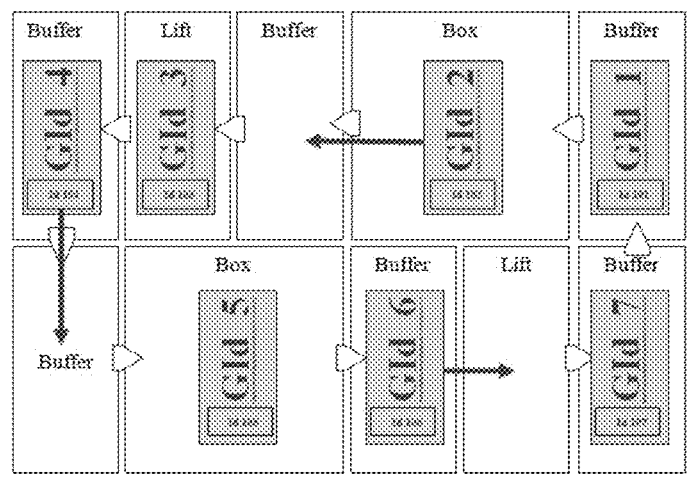
FIGS. 28A-28D illustrate chain types with assigned GId and Id, meaning cargo.
Figure 28B:
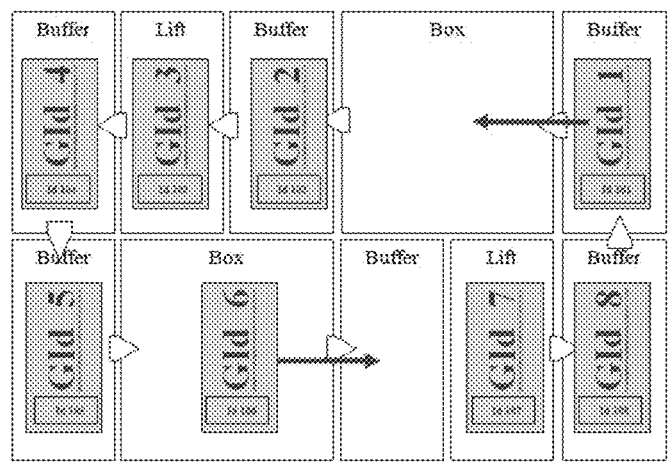
Figure 28C:
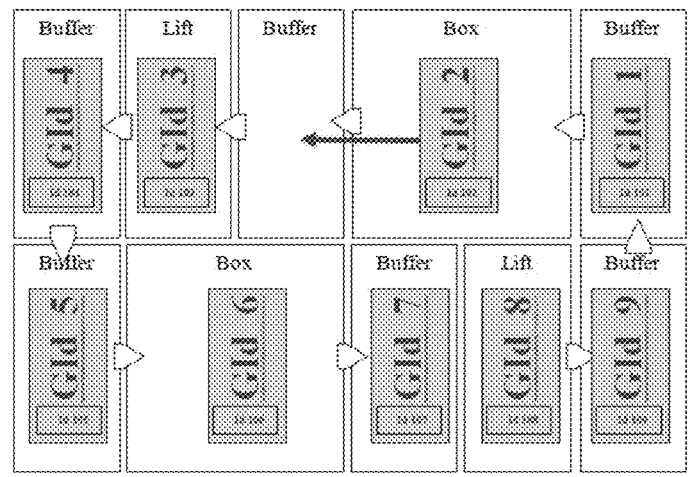
Figure 28D:
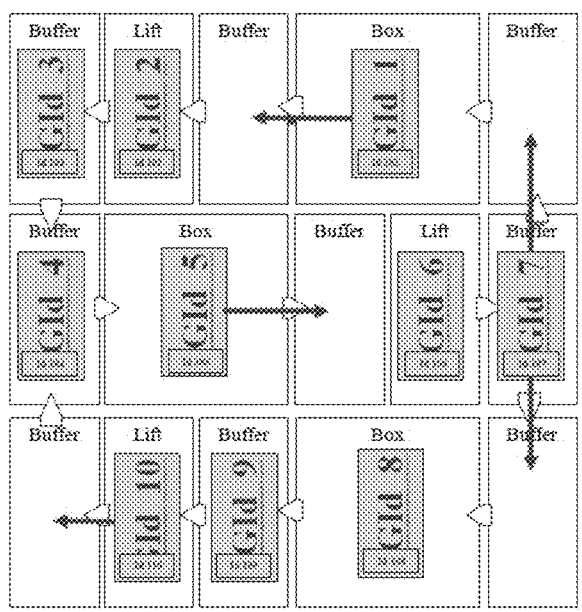

Reference is now made to FIGS. 24A-24B, an illustration of the transmission of pallet 801 between a block and the adjacent blocks (including buffers 701, elevator 601 and boxes 501). The arrows show the directions of the transmission.

Reference is now made to FIGS. 25A-25F, illustrating complex types with service and storage areas. These figures are not to be regarded as a complete list of organizing possibilities of various storage and/or parking complex types, rather as illustrations of the statements declared by the applicator of the present invention.

Reference is now made to FIGS. 26A-26D, illustrating connection types between the cells into closed chains indicating inputs and outputs of each cell. These figures are not to be regarded as a complete list of organizing possibilities of various chain types, rather as illustrations of the statements declared by the applicator of the present invention.

Reference is now made to FIGS. 27A-27D, illustrating chain types indicating box-cells, lift-cells and buffer-cells. These figures are not to be regarded as a complete list of organizing possibilities of various chain types, rather as illustrations of the statements declared by the applicator of the present invention.

Reference is now made to FIGS. 28A-28D, illustrating chain types with assigned GId and Id, red arrows illustrate possible shifts of some of the GId with its assigned Id (GId=Id) into free cells located along the moving direction within a given chain. Each of the figures below is independent of any previous or subsequent figures. These figures are not to be regarded as a complete list of organizing possibilities of various GId movements within the chains presented below, rather as illustrations of the statements declared by the applicator of the present invention.

Figure 29A:
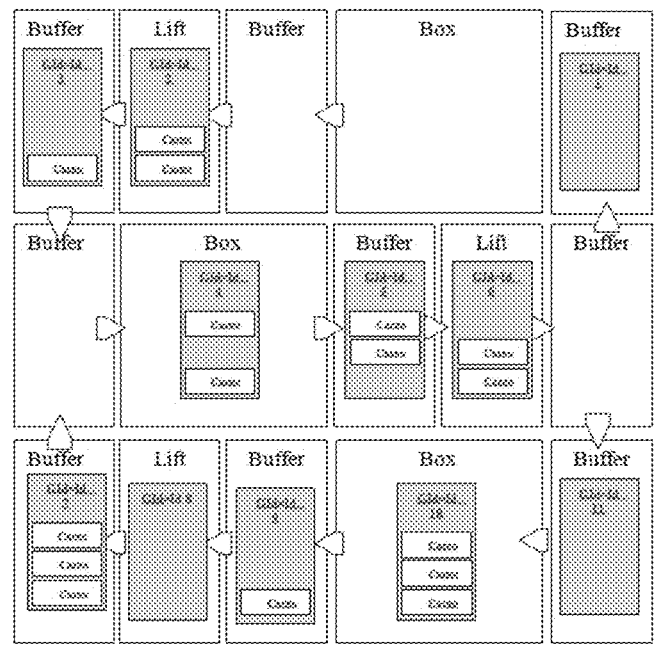
FIGS. 29A-29B illustrate MAD within the service area, part of which carry cargo while others are empty.
Figure 29B:
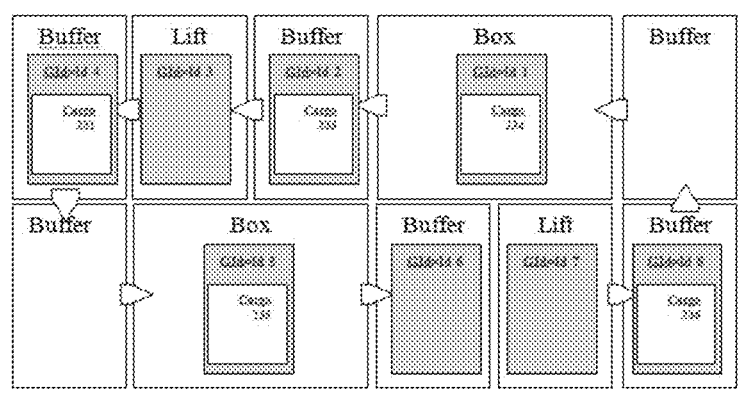

Reference is now made to FIGS. 29A-29B, illustrating GId=ID within the service area, part of which carry cargo while others are empty. Each of the figures above is independent of any previous or subsequent figures. These figures are not to be regarded as a complete list of organizing possibilities of various service areas, chains, GId/Id or its "assigned" cargo allocation, rather as illustrations of the statements declared by the applicator of the present invention.

Figure 30A:
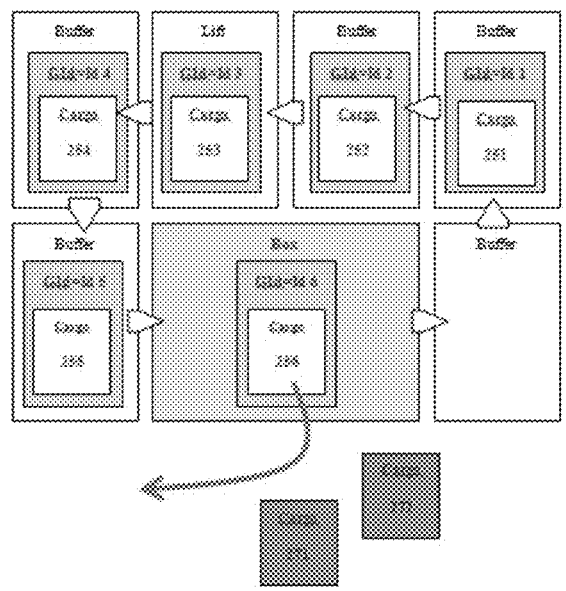
FIGS. 30A-30F illustrate box cells located in the service area, GId=Id step-by-step movement in the chain and the change of cargo status in the box.
Figure 30B:
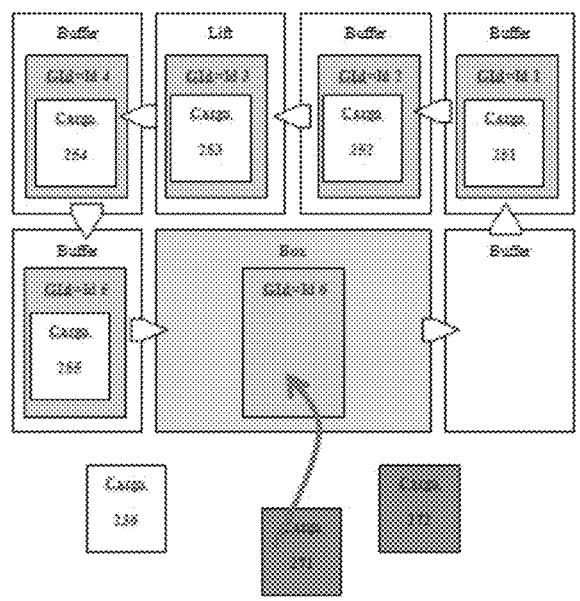
Figure 30C:
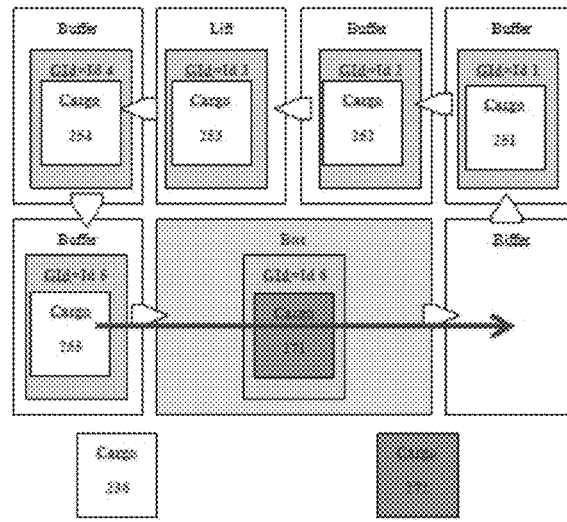
Figure 30D:
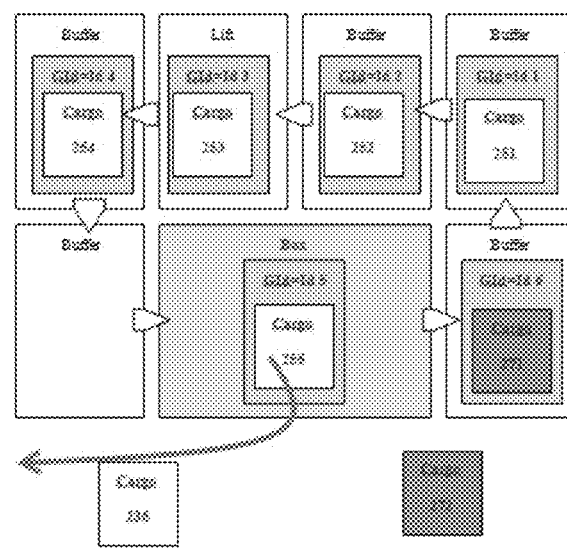
Figure 30E:
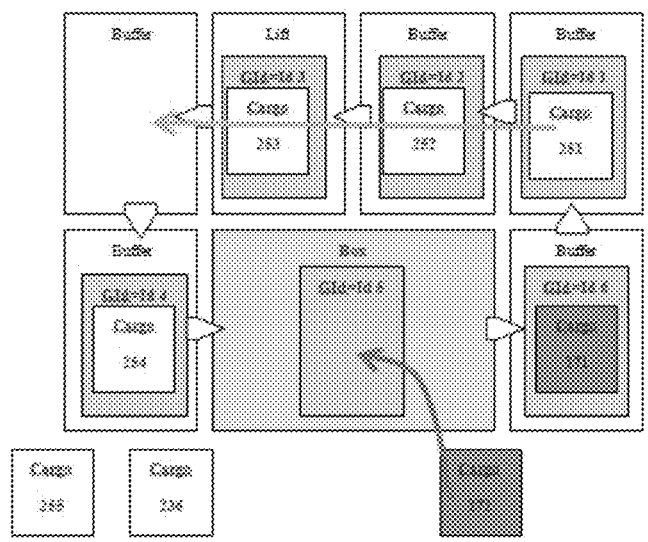
Figure 30F:
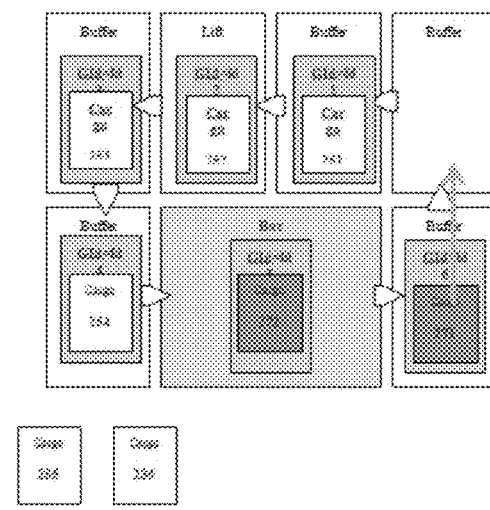

Reference is now made to FIGS. 30A-30F, illustrating box cells located in the service area, GId=Id step-by-step movement in the chain and the change of cargo status in the box. FIG. 30a illustrates that "Cargo 256" in the box is "removed" from the "GId-6" carrier and then "retrieved" from the box and the complex. FIG. 30b illustrates that "Cargo 271" is "inserted" in to the complex and "set" on the "GId-6" carrier within the box. FIG. 30c illustrates that "GId-6" carrier with "Cargo 271" moves along the red arrow to the buffer "on its right", "GId-5" carrier with "Cargo 255" moves along the red arrow to the buffer "on its right" ("trio" movement). FIG. 30d illustrates that "Cargo 255" within the box is "removed" from the "GId-5" carrier and "retrieved" from the box and the complex. Simultaneously, "GId-4" carrier with "Cargo 254" moves along the red arrow into the buffer "on its left". FIG. 30e illustrates that "Cargo 272" is "inserted" into the complex and "set" on the "GId-5" carrier within the box. Simultaneously, "GId-3" carrier with "Cargo 253" moves along the red arrow into the buffer "on its left"; "GId-2" carrier with "Cargo 252" moves along the red arrow into the buffer "on its left" and "GId-1" carrier with "Cargo 251" moves along the red arrow into the buffer "on its left". FIG. 30f illustrates that "GId-5" carrier with "Cargo 272" is in the box and awaits its shifting into the buffer "on its right", "GId-6" carrier with "Cargo 271" moves along the red arrow into the buffer "in front of him".

Figure 31A:
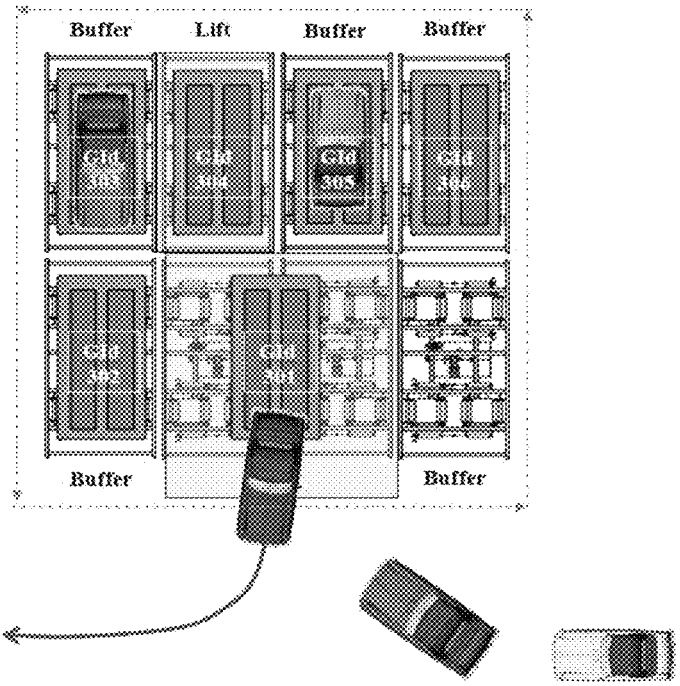
Figure 31B:
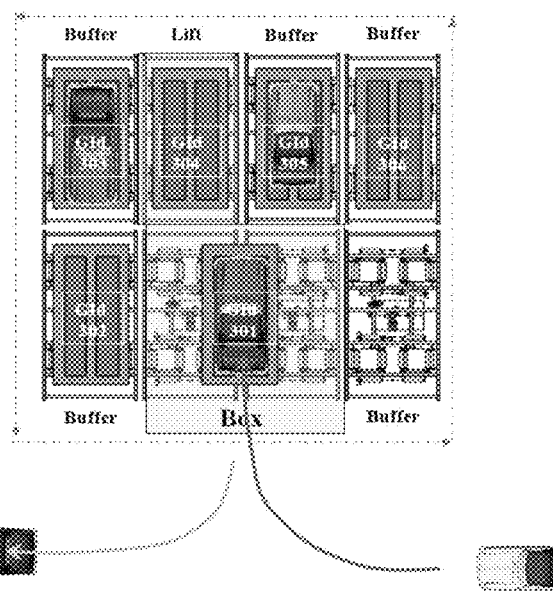
Figure 31E:
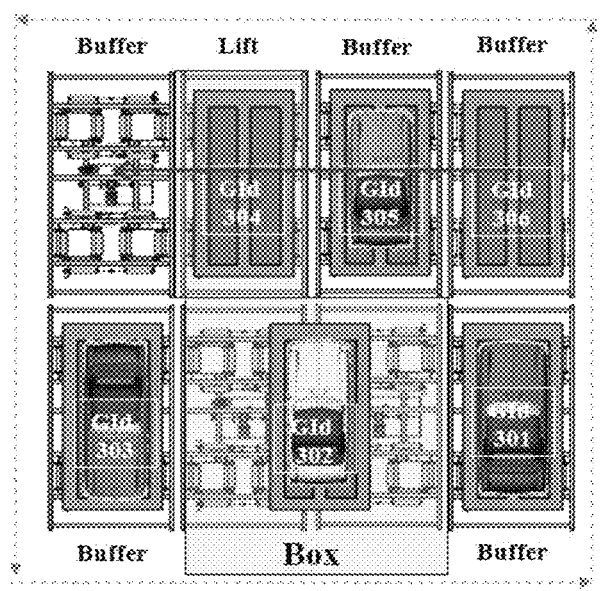

Reference is now made to FIGS. 31A-31F, illustrating box cells located in the service area, GId=Id step-by-step movement in the chain and the change of cargo status in the box. FIG. 31a illustrates that Cargo "black car" exits the box and the complex (blue arrow) and "detaches" itself from the "GId-301" carrier. FIG. 31b illustrates that Cargo "green car" enters the box and the complex (green arrow) and "attaches" itself to the "GId-301" carrier. FIG. 31c illustrates that "GId-301" and "attached to it" Cargo "green car" moves along the red arrow from the box into the buffer on its right, whereas "GId-302" carrier moves along the red arrow from the buffer into the box on its right in the moving direction of the chain (orange arrows)—movement within the box trio "buffer>>box>>buffer". FIG. 31d illustrates that Cargo "Yellow car" enters the box and the complex (see green arrow) and "attaches" itself to the "GId-302" carrier. Simultaneously, "GId-303" carrier and the Cargo "attached to it"—"Maroon car" moves along the red arrow from the buffer into the adjacent buffer in the moving direction of the chain (orange arrows). FIG. 31e illustrates that "GId-304" carrier moves along the red arrow in the moving direction of the chain (orange arrows), "GId-305" carrier moves along the red arrow in the moving direction of the chain (shifting within the lift trio "buffer>>lift>>buffer"), "GId-306" carrier moves along the red arrow in the moving direction of the chain. These figures are not to be regarded as a complete list of all the possibilities of the box, rather as illustrations of the statements declared by the applicator of the present invention.

Reference is now made to FIGS. 32A-32F, illustrating the lifts within the service area, the step-by-step movement of GId and Id in the chain and the Id status change, in case of Id=cargo, within the lift. Once the GId is in the "lift" cell, it will be in a "conditional expectance" mode.

Figure 32A:
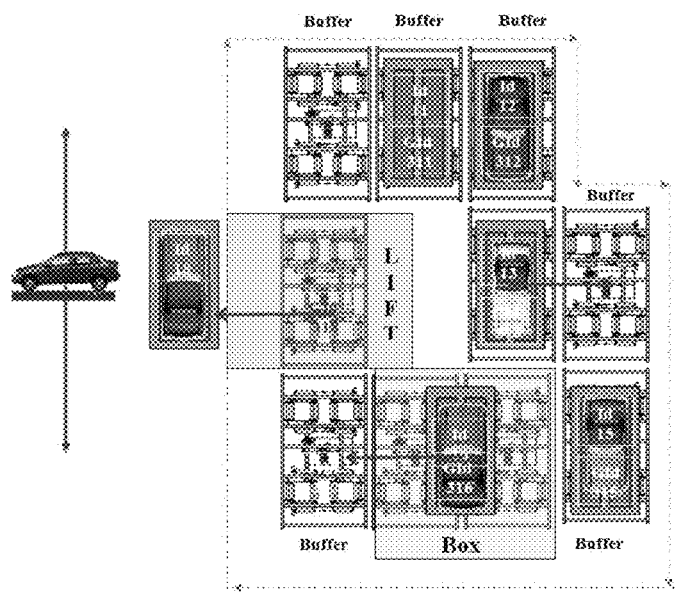
FIGS. 32A-32F illustrates the lifts within the service area, the step-by-step movement of GId and Id in the chain and the Id status change, in case of Id=cargo, within the lift.
Figure 32B:
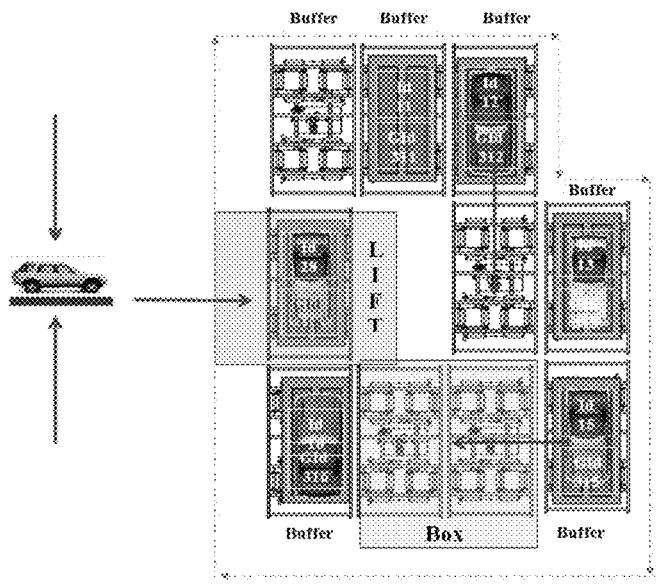
Figure 32C:
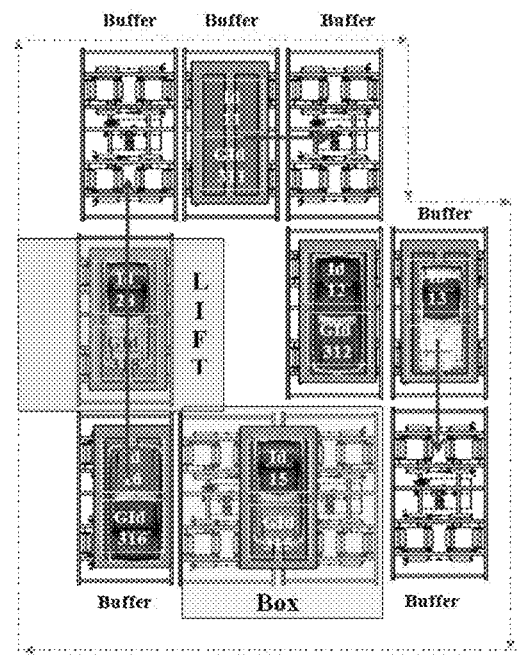
Figure 32D:
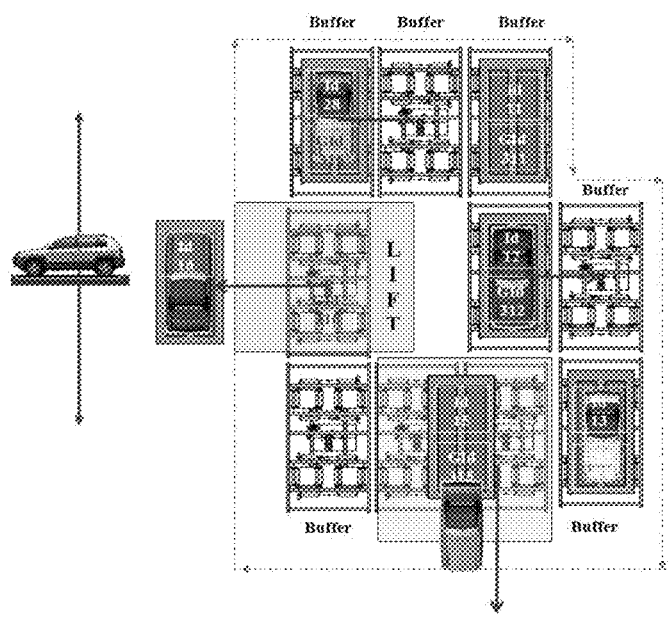
Figure 32E:
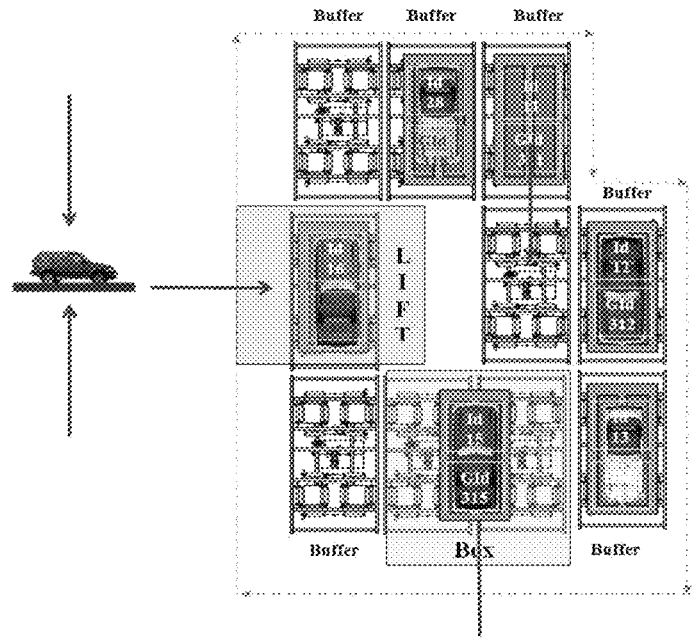
Figure 32F:
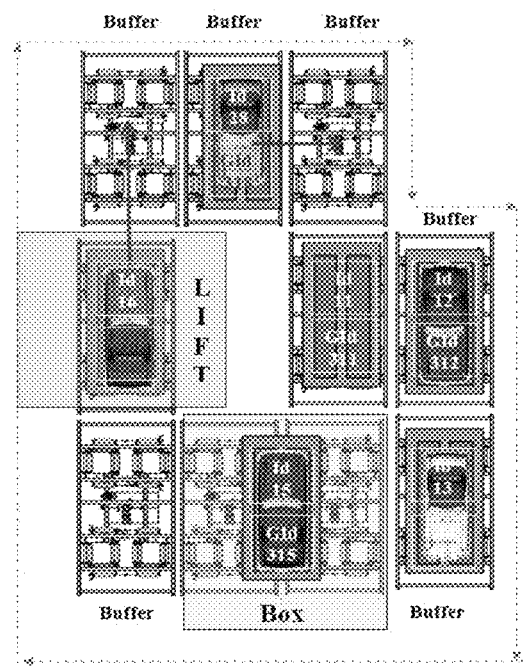
Figure 33A:
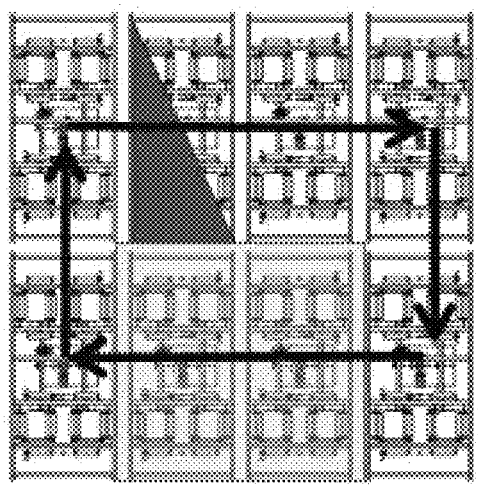
Figure 33B:
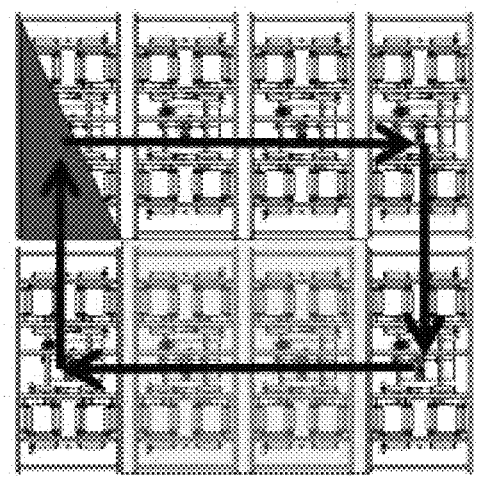
Figure 33C:
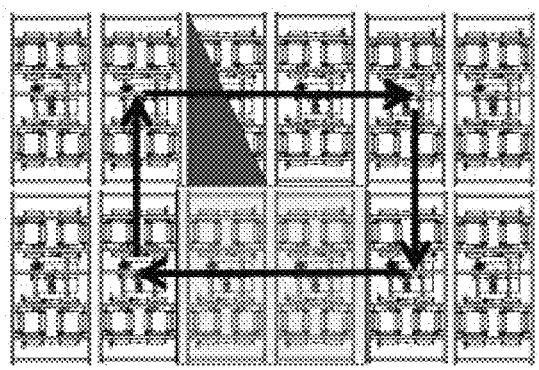
Figure 33D:
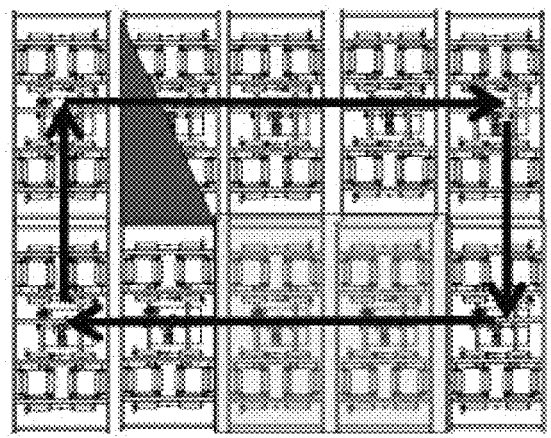
Figure 34A:
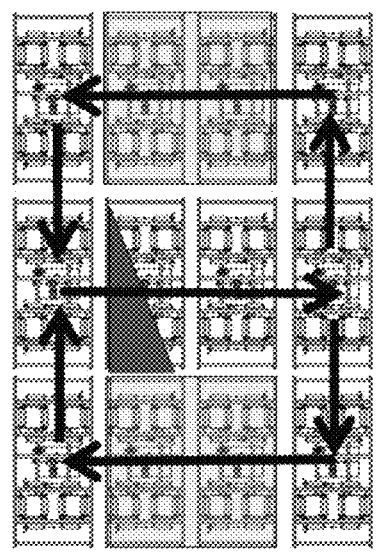
FIGS. 34A-34E illustrate possible organization of a 12 cell configuration, where
Figure 34B:
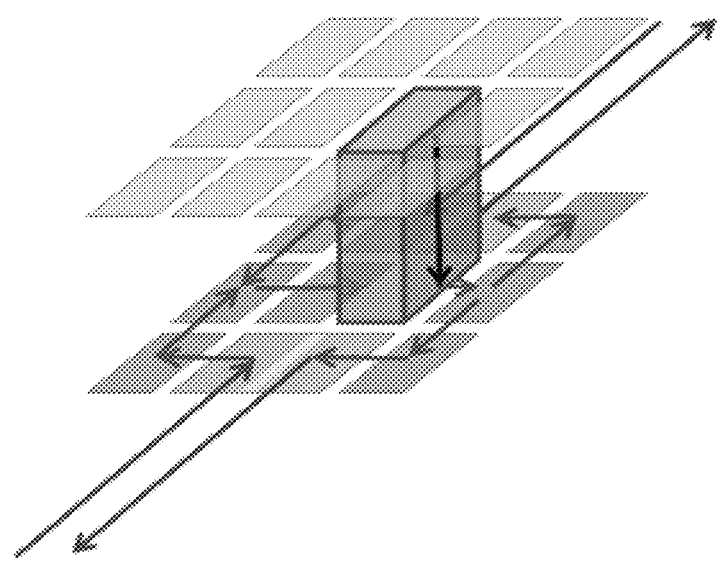
Figure 34C:
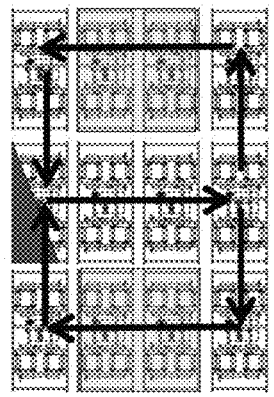
Figure 34D:
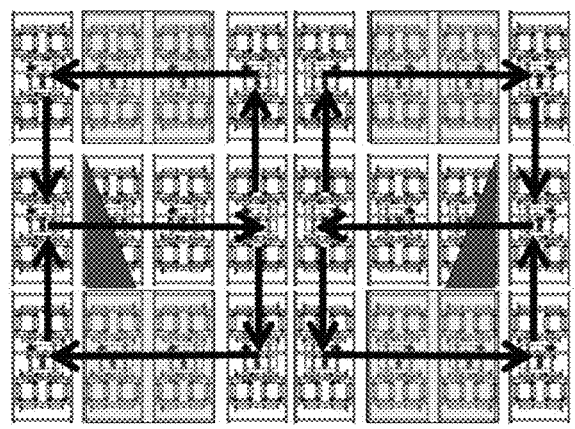
Figure 34E:
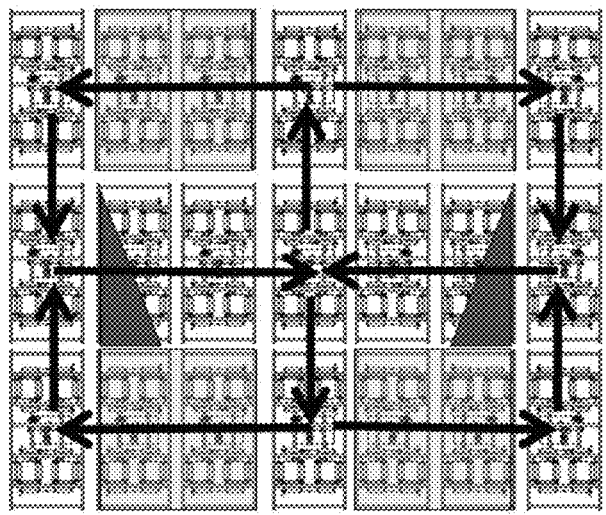

At the same time, the detached Id from GId (with or without cargo) will be transferred by the lift into the storage area. Instead of the received Id (with or without cargo) another Id will be delivered from the storage area that on its arrival will be synchronized with the awaiting GId (virtually generated identification of the service area). FIG. 32a illustrates that Id-18="Cargo red car", once in the lift, fixates on "GId 318" in the lift and moves into the storage area, where instead of Id-18 another Id, ordered from the storage area into the service area, will enter the lift. Simultaneously, "GId-313" carrier moves along the red arrow in the moving direction of the chain (orange arrows), "GId-316" carrier moves along the red arrow in the moving direction of the chain (orange arrows). FIG. 32b illustrates that Id-28="Cargo green car" arrives on the lift from the storage area into the Lift cell of the service area and "assigns itself" to the "GID-318" located there. Simultaneously, "GId-312" carrier moves along the red arrow in the moving direction of the chain (orange arrows), "GId-315" carrier moves along the red arrow in the moving direction of the chain (orange arrows). FIG. 32c illustrates that GId-318 with assigned Id-28="Cargo green car", moves along the red arrow in the moving direction of the chain from the Lift into the buffer (orange arrows). Simultaneously, "GId-311" carrier moves along the red arrow in the moving direction of the chain (orange arrows), "GId-313" carrier moves along the red arrow in the moving direction of the chain (orange arrows), "GId-316" carrier with its assigned Id-16="Cargo dark green car" moves along the red arrow in the moving direction of the chain (orange arrows). FIG. 32d illustrates that Id-16="Cargo dark green car", once in the lift, fixates on "GId 316" in the lift and moves into the storage area, where instead of Id-16 another Id, ordered from the storage area into the service area, will enter the lift. Simultaneously, "GId-318" carrier moves along the red arrow in the moving direction of the chain (orange arrows), "GId-312" carrier moves along the red arrow in the moving direction of the chain (orange arrows), "Cargo brown car" leaves the Box. FIG. 32e illustrates that Id-16="Cargo red car" arrives on the lift from the storage area into the Lift cell of the service area and "assigns itself" to the "GID-316" located there. Simultaneously, "GId-311" carrier moves along the red arrow in the moving direction of the chain (orange arrows), "Cargo black car" arrives into the Box and identifies as Id-15=GId-315. FIG. 32f illustrates that GId-316 with assigned Id-26="Cargo red car", moves along the red arrow in the moving direction of the chain from the Lift into the buffer (orange arrows). Simultaneously, "GId-318" carrier moves along the red arrow in the moving direction of the chain (orange arrows), "GId-315" carrier moves along the red arrow in the moving direction of the chain (orange arrows), "GId-315" carrier moves along the red arrow in the moving direction of the chain (orange arrows).

Figure 35A:
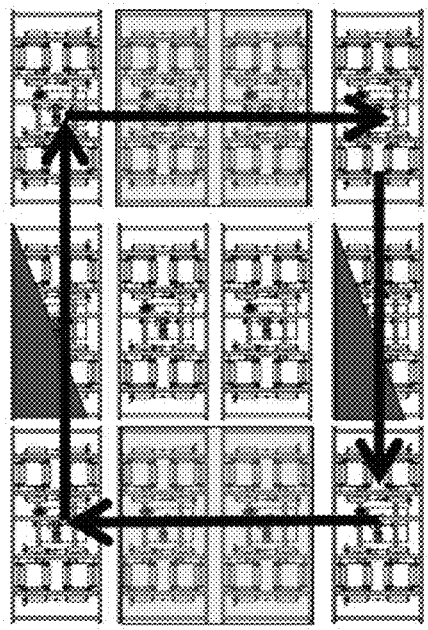
FIGS. 35A-35C illustrate a scenario of two cargoes in the configuration illustrated in FIG. 34A.
Figure 35B:
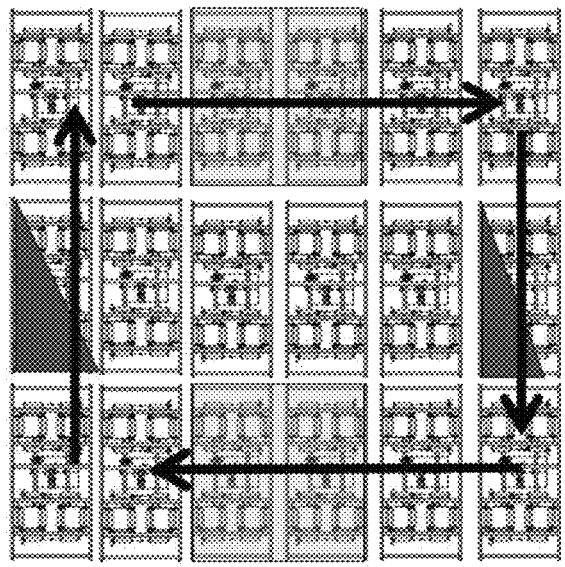
Figure 35C:
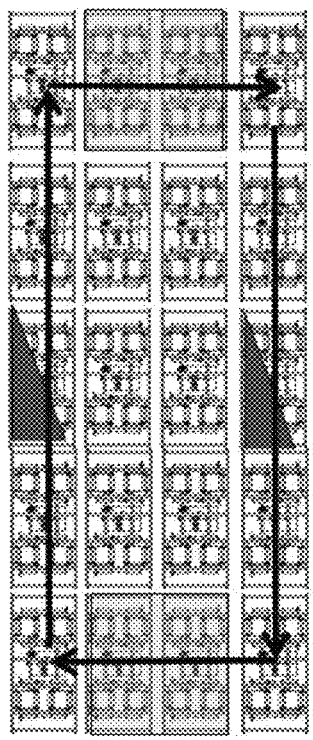
Figure 36A:
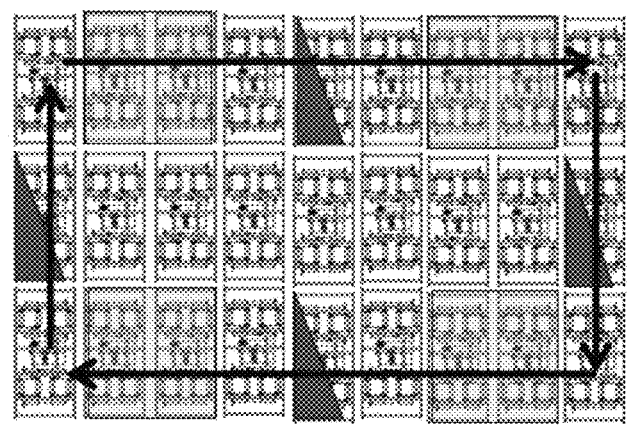
FIGS. 36A-36B illustrate the organization and movement of 4 cargoes in various configurations.
Figure 36B:
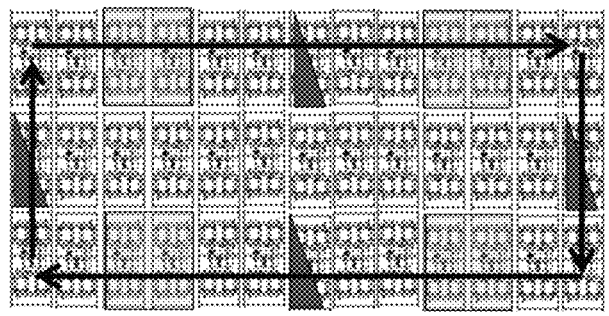
Figure 37A:
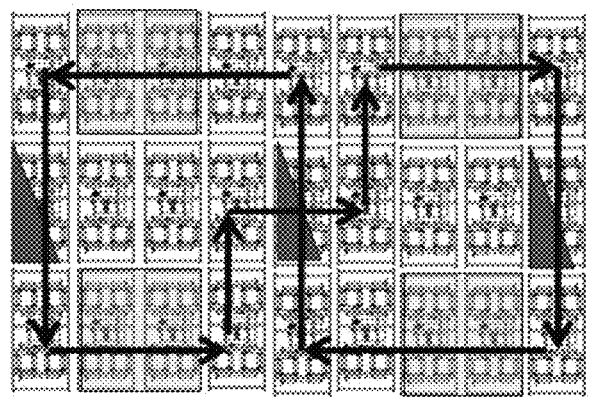
FIGS. 37A-37C illustrate possible cargo organizations and movements in various cell configurations.
Figure 37B:
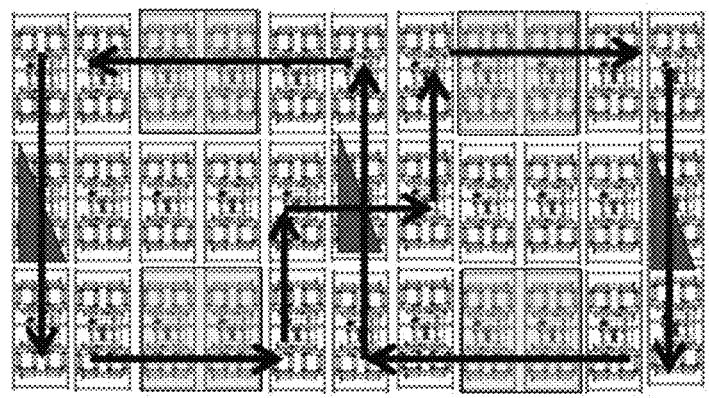
Figure 37C:
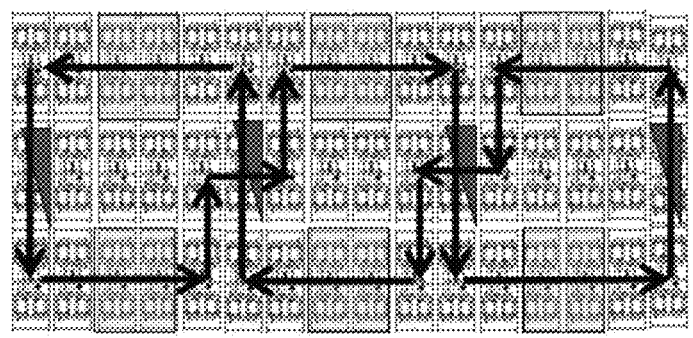
Figure 38A:
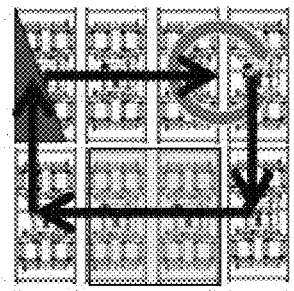
Figure 38B:
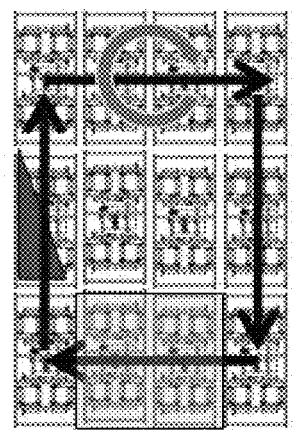
Figure 38C:
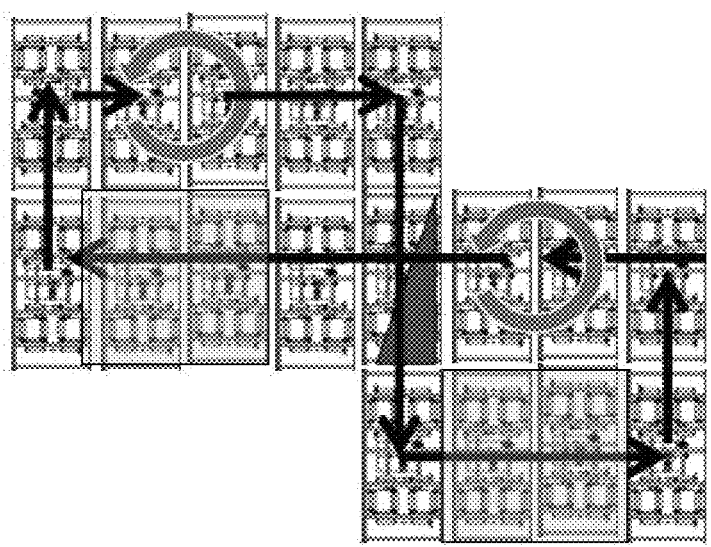
Figure 38D:
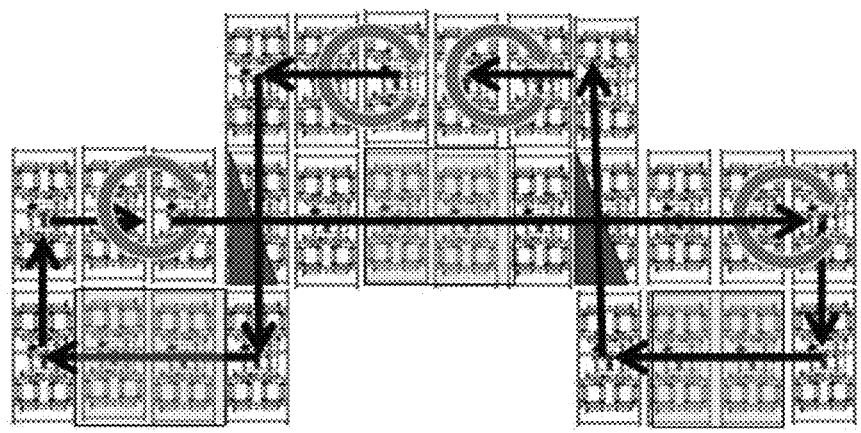
Figure 38E:
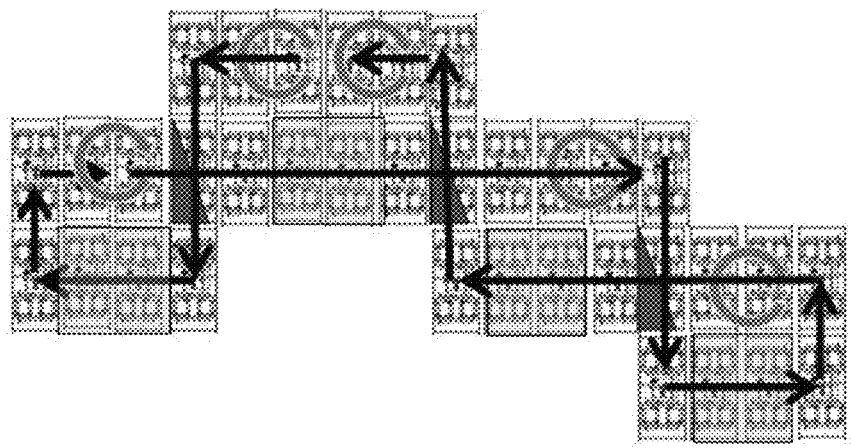
Figure 39D:
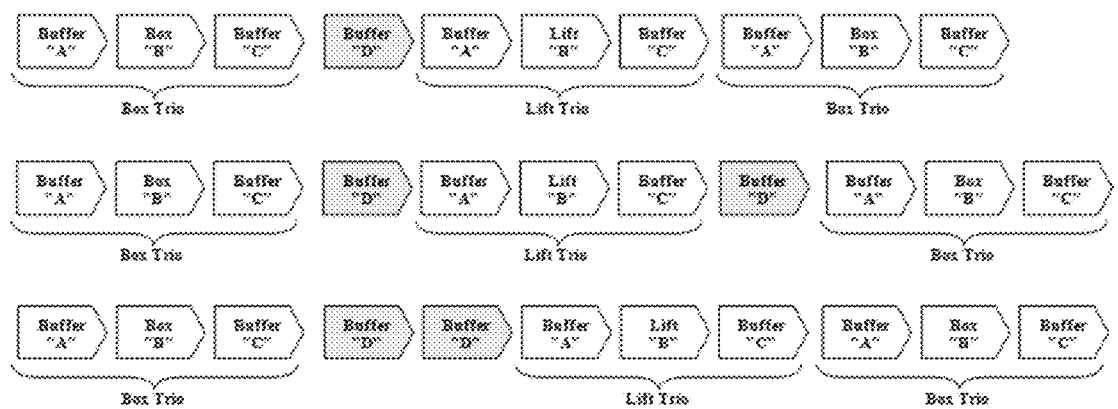
Figure 39E:
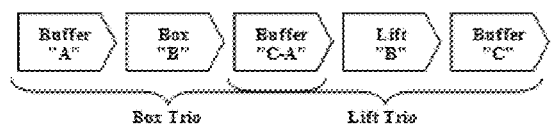
Figure 39F:
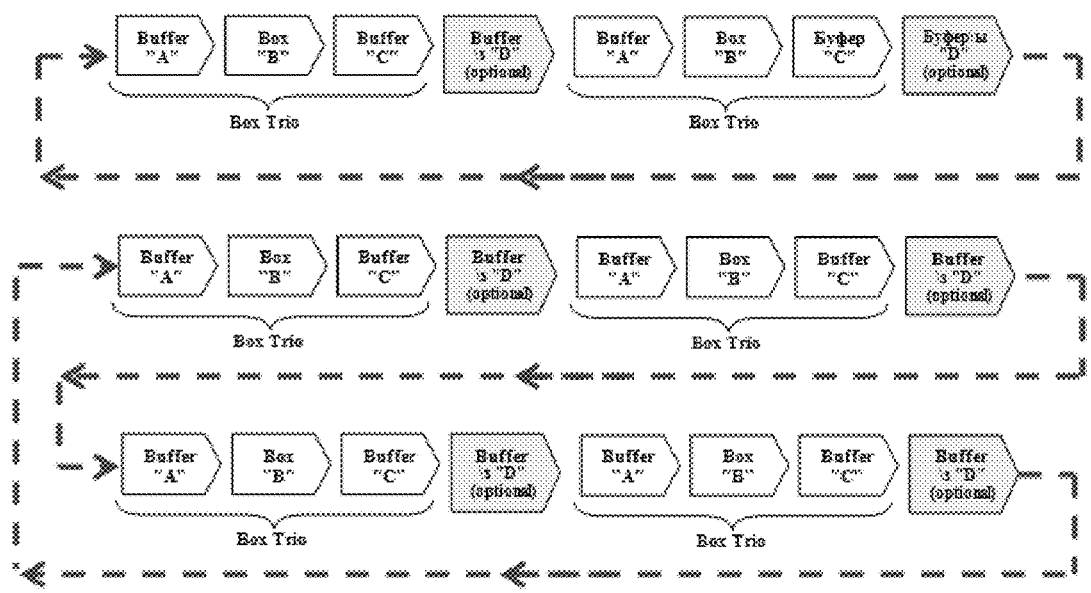
Figure 39G:
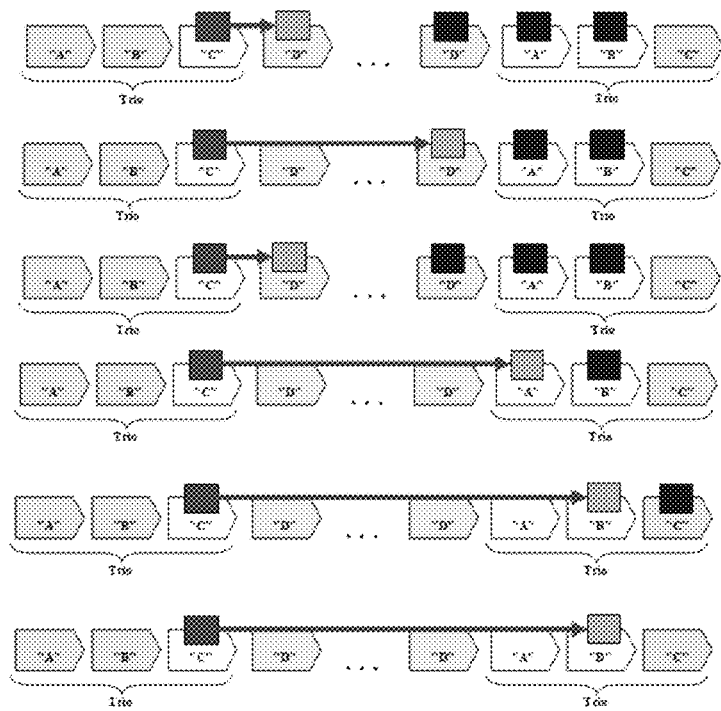
Figure 39H:
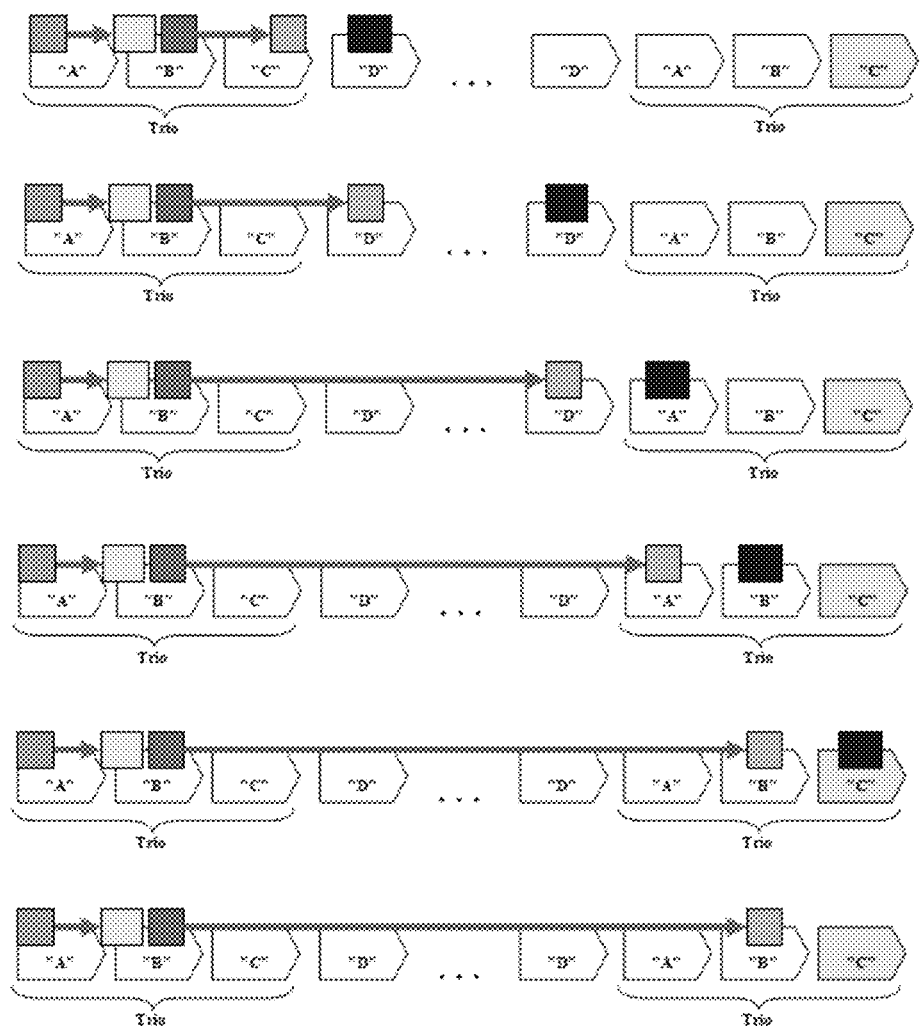
Figure 40A:
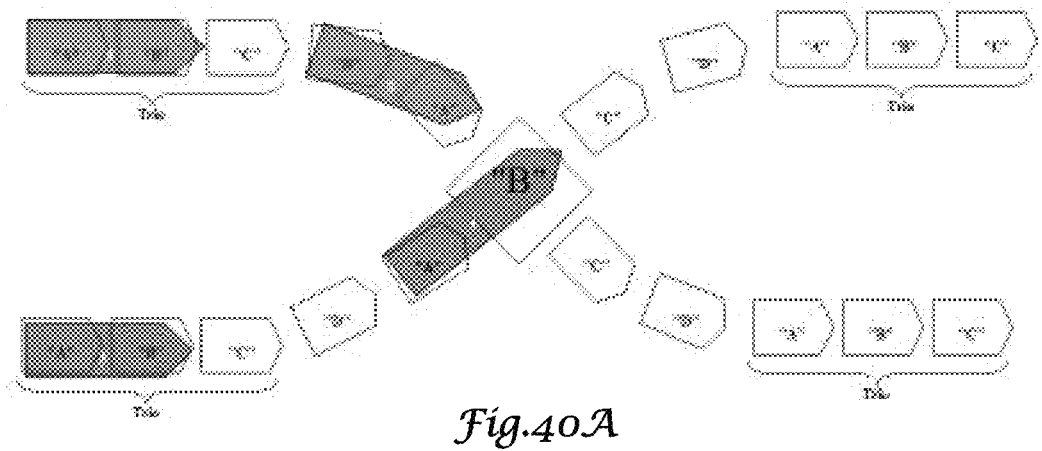
FIGS. 40A-40H illustrate movement versions of two sets of GId.
Figure 40B:
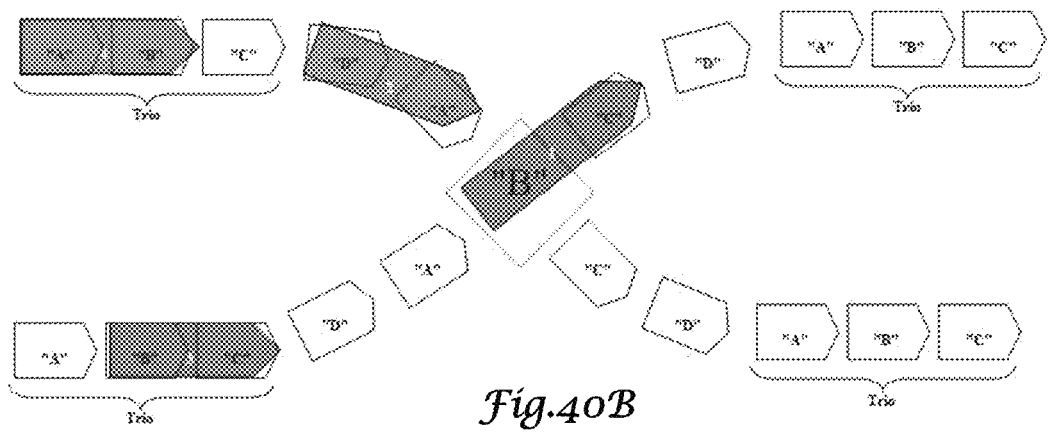
Figure 40C:
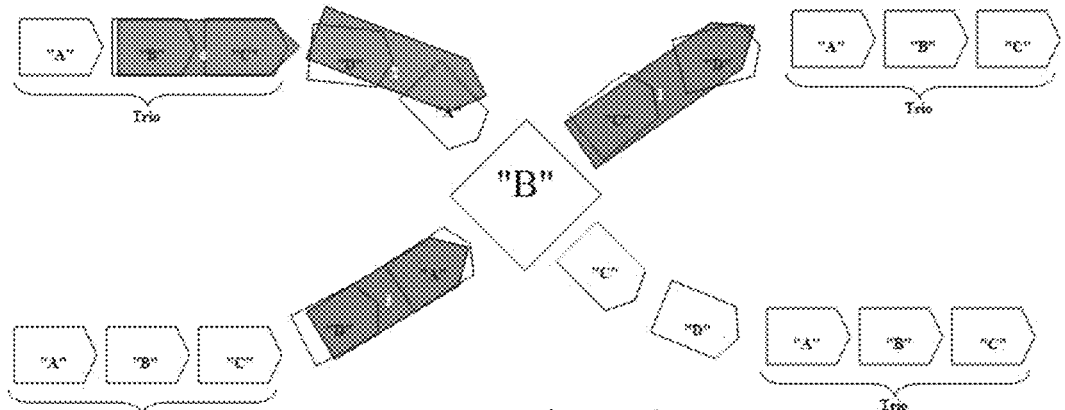
Figure 40D:
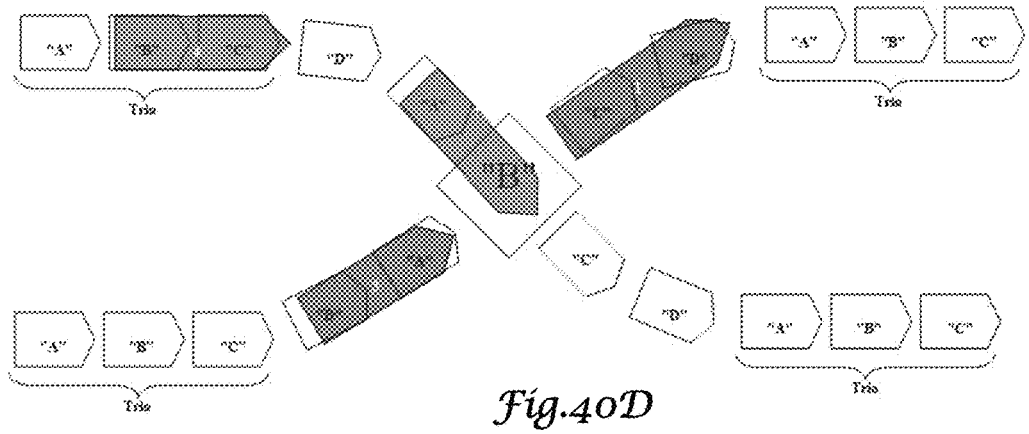
Figure 40E:
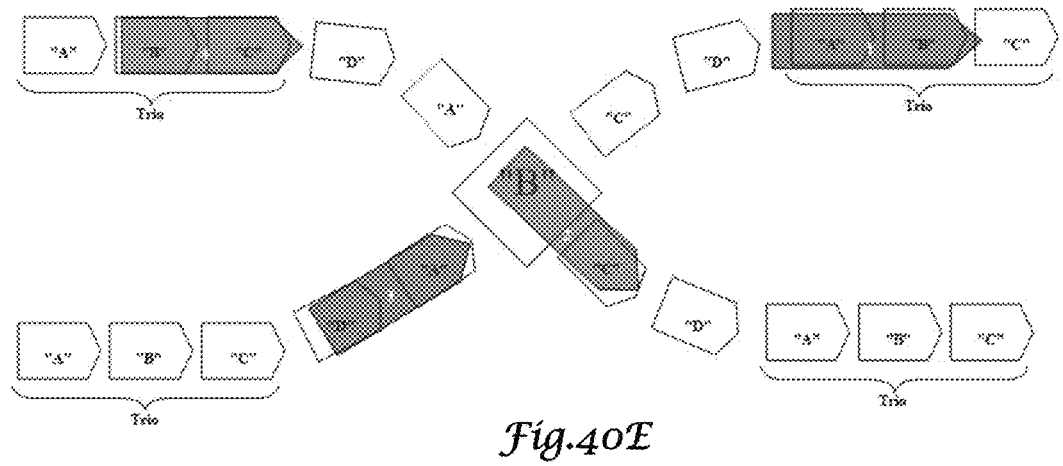
Figure 40F:
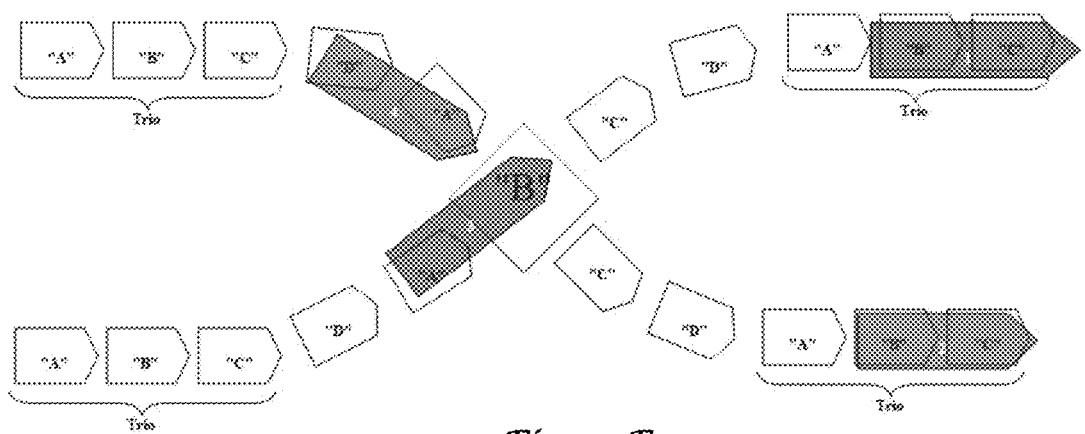
Figure 40G:
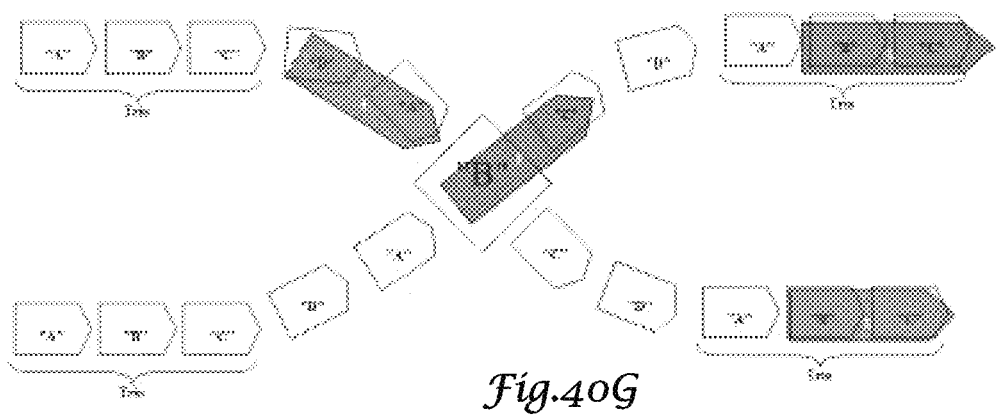
Figure 40H:
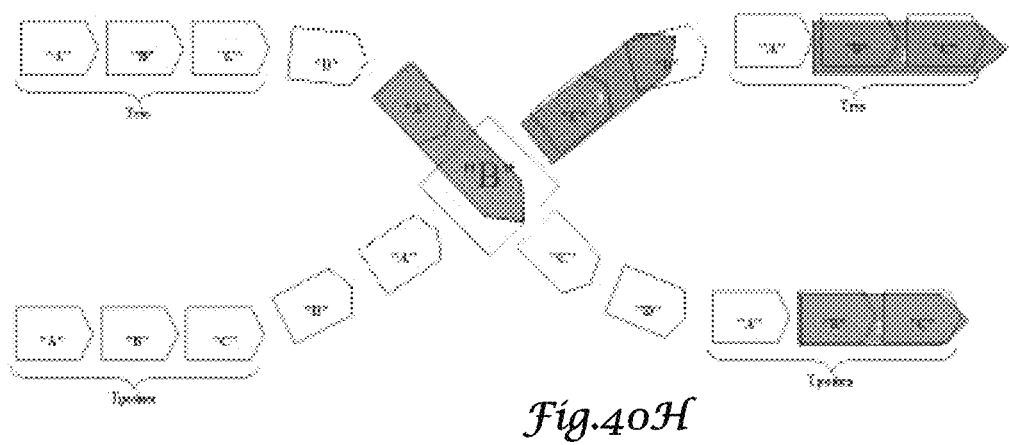

Reference is now made to FIGS. 33-38, illustrating organizing principles of various service area types designed for different purposes, constructed of boxes, lifts and buffers, and developed by the author of the present patent for Robotic Parking Systems (RPS) of matrix type within Israeli company Olimpus-P ltd. Application of the present patent is not limited to RPS of matrix type only, as it can be utilized in various types of storage and parking systems. These figures are not to be regarded as a complete list of all the organizing possibilities of chains within the service areas of storage and parking systems, rather as illustrations of the statements declared by the applicator of the present invention. On all the illustrations, the lift cell is indicated by a red triangle, reception/delivery box—pink transparent square and the moving direction of the chain—black arrows. The moving direction of the chain can be reversed affecting the ratio and the arrangement of the buffers that may influence the functioning of the service area. Nonfunctional cells or rows of cells can be added to the service area, existence or absence of which have little to no influence on the chain structure, except for the cases of breakage or a local malfunction when an alternative path and an expansion of a buffer are required. Cells or rows of cells can be added to the service area, part of which shall be integrated within the chain. Existence or absence of such cells can determine the expansion of buffers in the systems. FIG. 33 illustrates MRPS (Micro) model. FIG. 34 illustrates SRPS (Short) model and BRPS (Dig). FIG. 35 illustrates FRPS (Fest) model. FIG. 36 illustrates BFRPS (Big Fest) model. FIG. 37 illustrates LRPS (Loop) model. FIG. 38 illustrates OsRPS (One-Sided) model. The present model designed in such a way that all the boxes for reception, delivery and exchange are located on one side of the complex. Special boxes designed for rotation of Cargo or cars at 180 degrees are located within the service area in the complex. They are designed for a full integration of the car order process, its rotation and return to the storage area within the general operation of the complex. Rotation boxes are indicated by circular arrow.

Reference is now made to FIG. 39, illustrating organizing principles for service area in a way that a lift trio and a box trio enable establishing a constant GId movement in the chain by minimizing parasitic loss of time for lifts and boxes. That is, we are talking about the loss of time on parasitic delays on releases of lifts/boxes after completing the cycle and its reloading for the next cycle. Thus, parasitic loss of service time that arises out of naturally asynchronous and spasmodic operation of the boxes and lifts is reduced. Figures under 39 illustrate general concepts of construction and operation of trios and service area chain, all the following figures illustrate particular cases, its structures and application. FIGS. 39a and 39b illustrate box trio structure (39a) and lift trio (39b) structure respectively. The arrows of the cells define the moving direction of the chain. FIG. 39c illustrates the arrangement possibilities of buffer D cells between the trios. Between adjacent trios may appear no buffer cells at all or appears one or more thereof. FIG. 39d illustrates that given the existence of equal conditions, D cells shall be arranged in the moving direction from the box trio to the lift trio or, at least, evenly distributed along the chain, and, in any case, it is undesirable for a higher number of D cells to be located in the moving direction from the lift trio to the box trio. FIG. 39e illustrates that given other equal conditions, combination of two trios and creation of one mutual buffer cell (C=A) is preferable in transition from box trio to the lift trio. FIG. 39f illustrates that in all cases the chain closes and forms a "loop", the movement along the chain is of a pseudo continuous nature. FIG. 39f shows versions of GId movements (red arrow), initially positioned at "C" (indicated by a red square on the schemes), in the moving direction of the chain. The aforementioned GId will always move through the highest number of cells (up until the movement is interfered by another GId—indicated by a blue square on the schemes), but the present GId moves up until the closest lift or box along its moving path. Its final position is indicated by a pink square. FIG. 39h shows versions of GId movements (green arrow), initially positioned at "B" (indicated by a green square on the schemes), in the moving direction of the chain. The aforementioned GId will always move through the highest number of cells (up until the movement is interfered by another GId—indicated by a blue square on the schemes), but the present GId moves up until the closest lift or box along its moving path. Its final position is indicated by a light green square. FIG. 39h also shows versions of GId movements (orange arrow), initially positioned at "A" (indicated by an orange square on the schemes), in the moving direction of the chain. The aforementioned GId will always move through one cell (indicated by a light orange square) from "A" into the closest "B".

Reference is now made to FIG. 40 showing movement versions of two sets of GId (black arrow), initially positioned at "A" and "B" at the first line of the chain and two GId (blue arrow), initially positioned at "A" and "B" at the second line of the chain (the first one is shifted in the moving direction of the chain), in the moving direction of the chain. The aforementioned GId will occupy the same cell alternately.

Figure 41A:
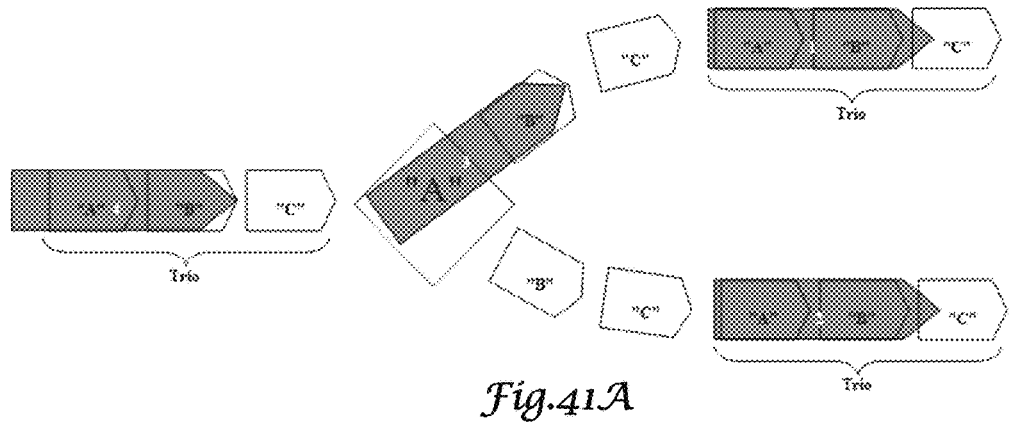
FIGS. 41A-41C illustrate movement versions of two sets of GId (black arrow), that are divided into two "flows" instead of one through a shared buffer cell.
Figure 41B:
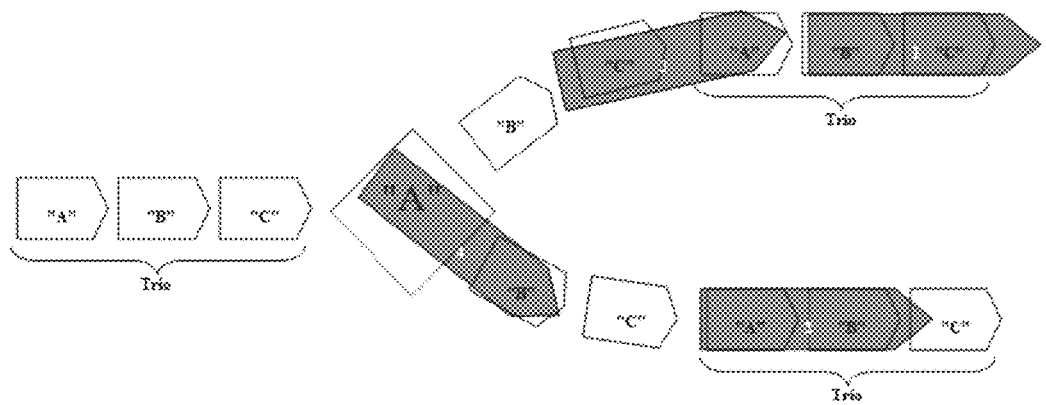
Figure 41C:
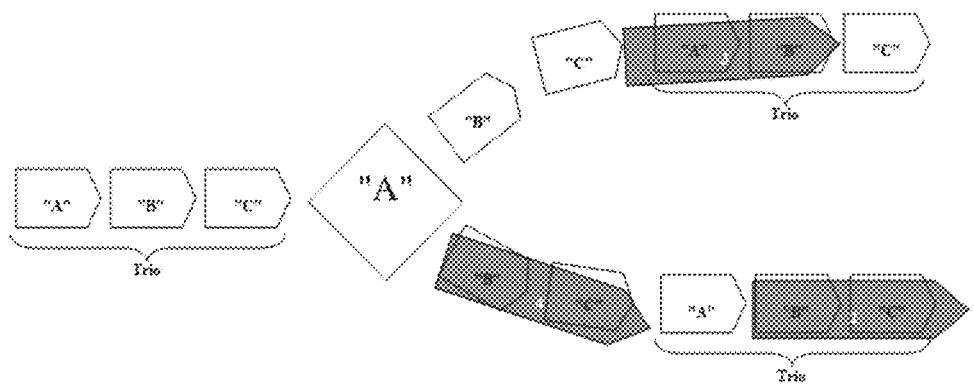
Figure 42A:
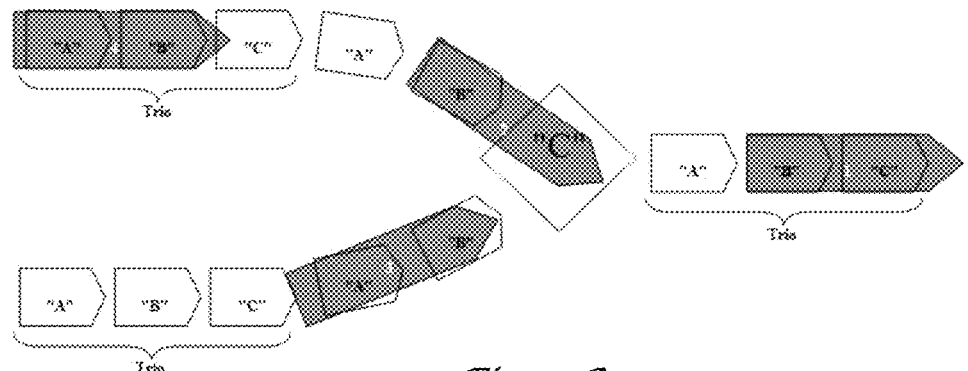
FIGS. 42A-42C illustrate movement versions of two sets of GId (black arrow), that are joined into one single "flow" out of two "flows" through a shared buffer cell.
Figure 42B:
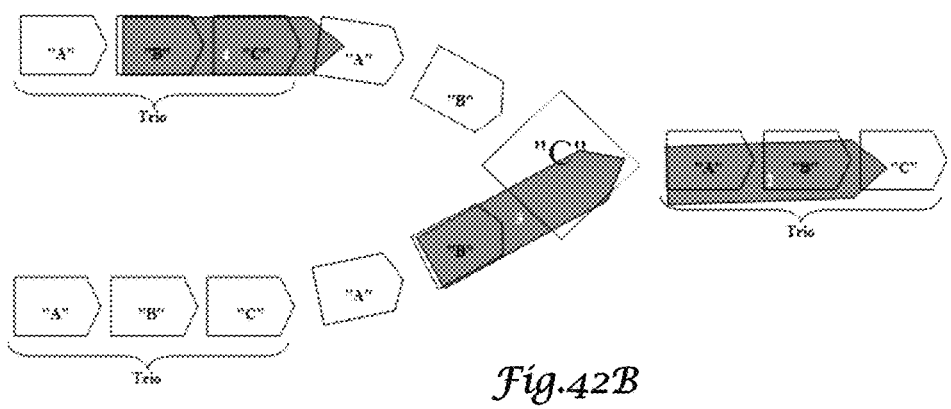
Figure 42C:
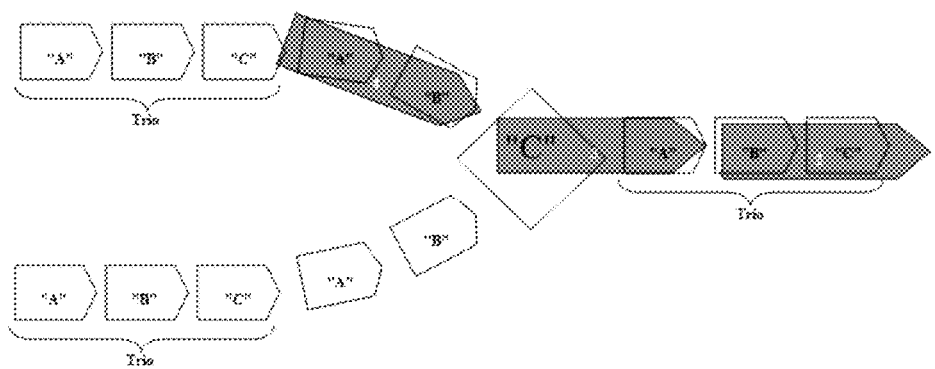

Reference is now made to FIG. 41 illustrating movement versions of two sets of GId (black arrow), that are divided into two "flows" instead of one through a shared buffer cell Reference is now made to FIG. 42 illustrating movement versions of two sets of GId (black arrow), that are joined into one single "flow" out of two "flows" through a shared buffer cell.

Figure 43:
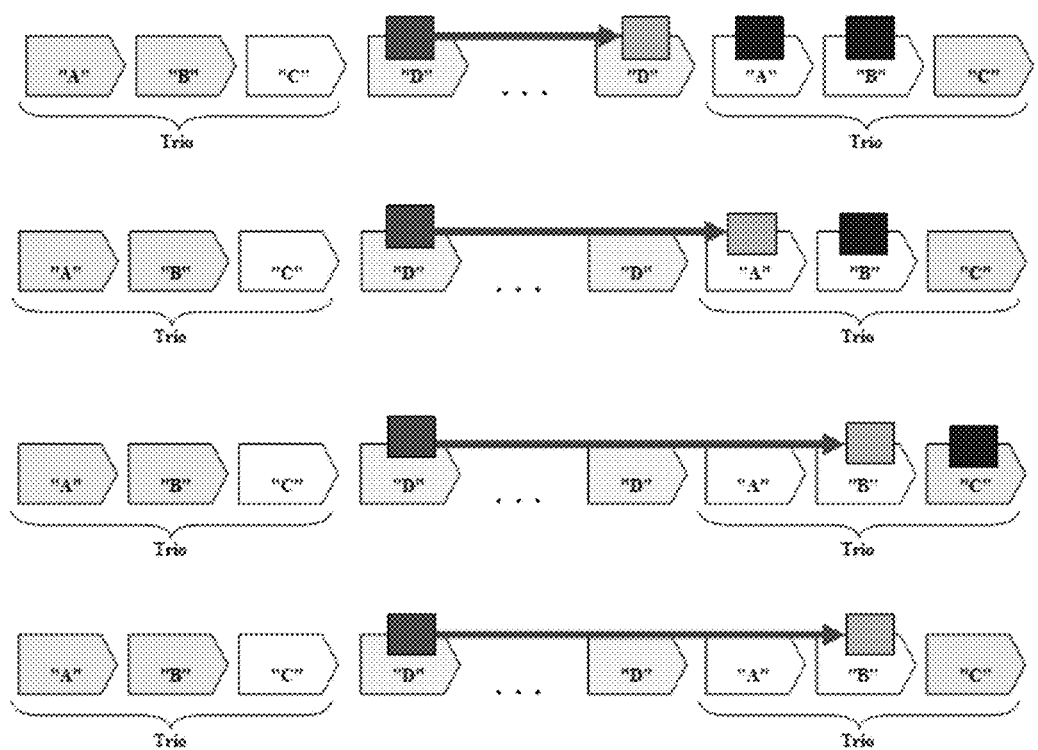
FIG. 43 illustrates versions of GId movements.

Reference is now made to FIG. 43 showing versions of GId movements (red arrow), initially positioned at "D" (indicated by a red square on the schemes), in the moving direction of the chain. The aforementioned GId will always move through the highest number of cells (up until the movement is interfered by another GId—indicated by a blue square on the schemes), but the present GId moves up until the closest lift or box along its moving path. Its final position is indicated by a pink square.

Figures 44A, 44B:
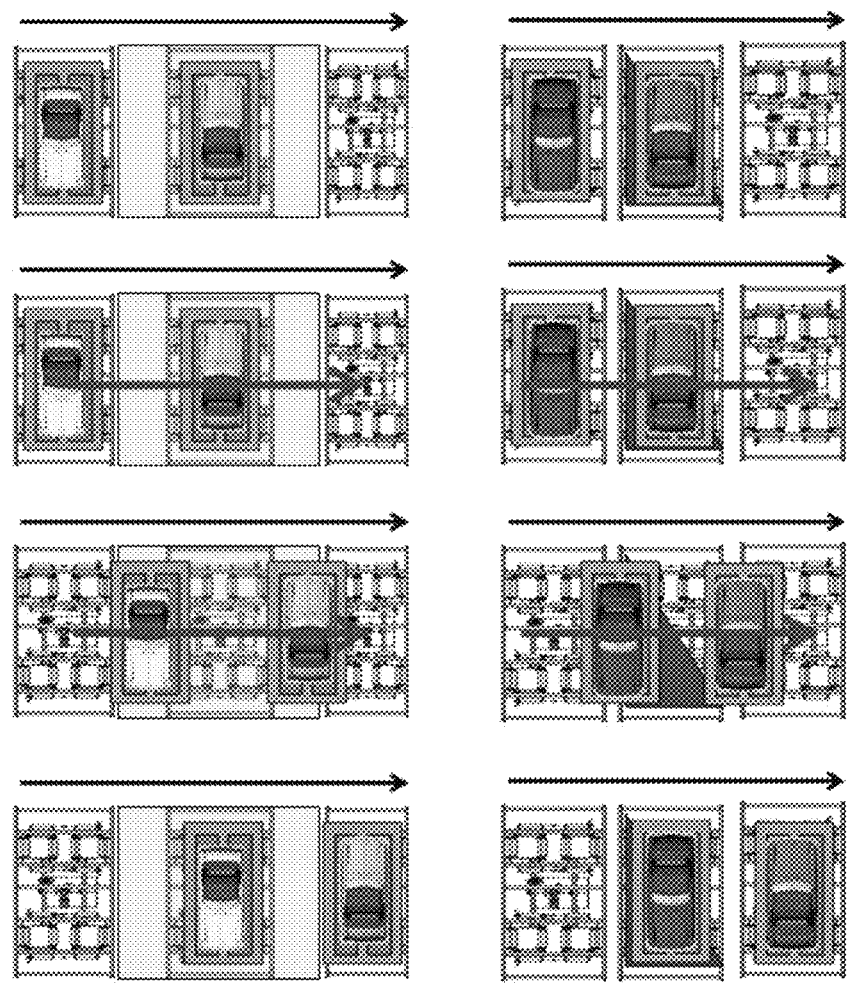
FIGS. 44A-44F illustrate specific examples of a box trio and a lift trio utilization within the RPS/APS (Pallet and Car).
Figures 44C, 44D:
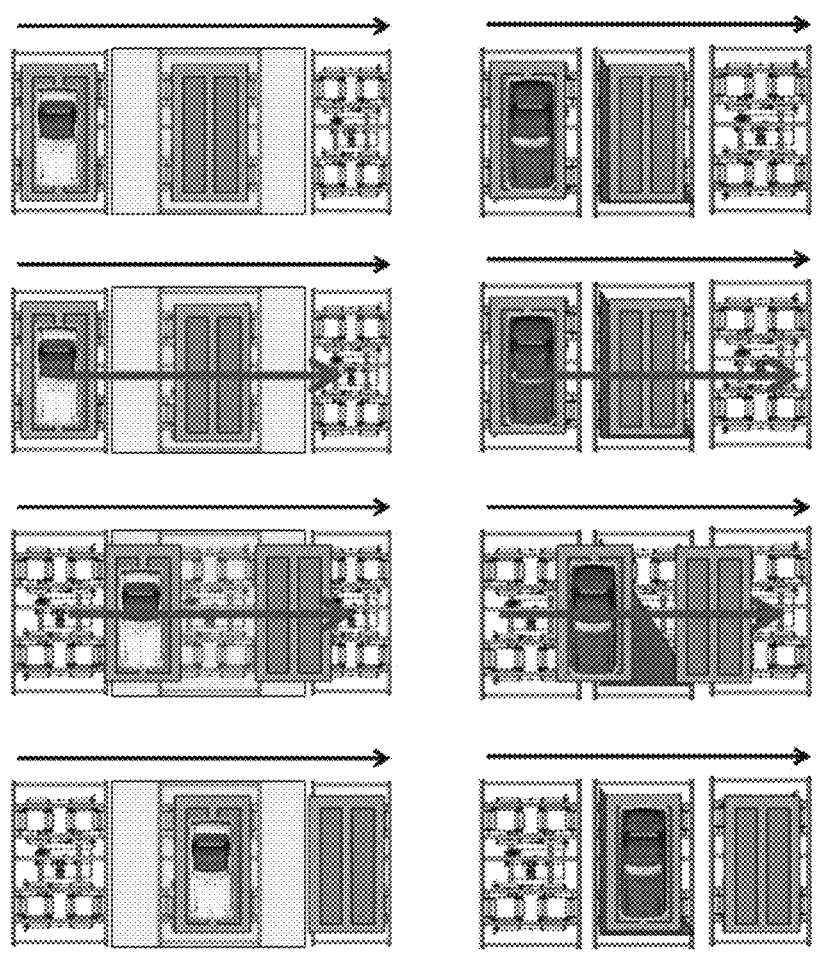
Figures 44E, 44F:
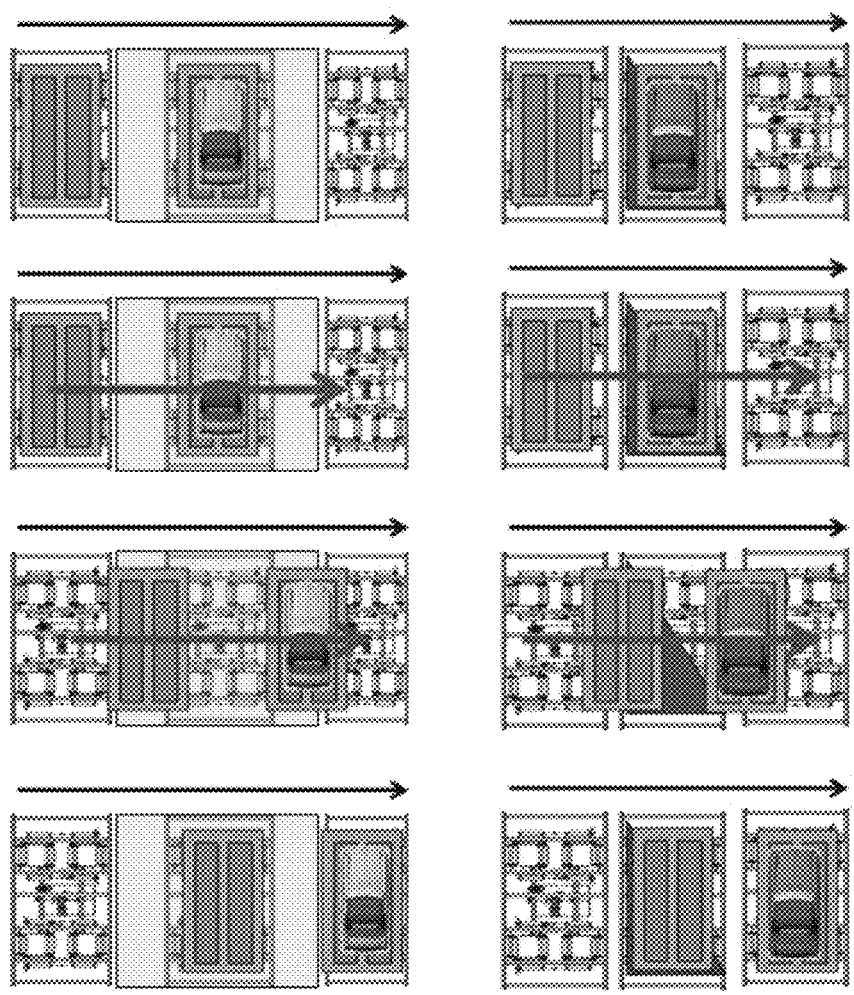

Reference is now made to FIG. 44 illustrating specific examples of a box trio and a lift trio utilization within the RPS/APS (Pallet and Car).

Figure 45A:
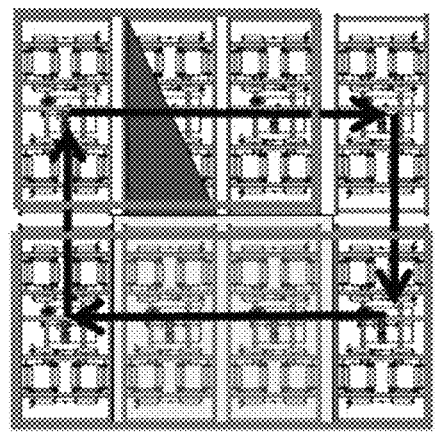
FIGS. 45A-45B illustrate a MRPS (Micro) model—are specific examples of a box trio and a lift trio utilization within the RPS/APS, where
Figure 45B:
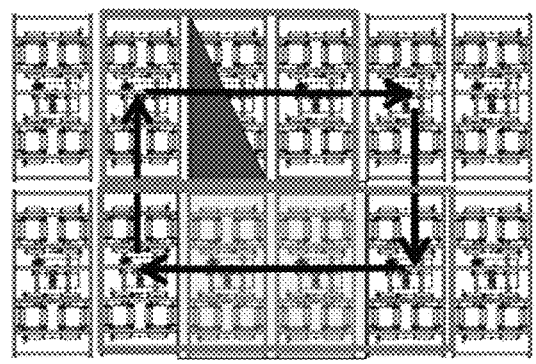

Reference is now made to FIG. 45 illustrating a MRPS (Micro) model—are specific examples of a box trio and a lift trio utilization within the RPS/APS.

Figure 46A:
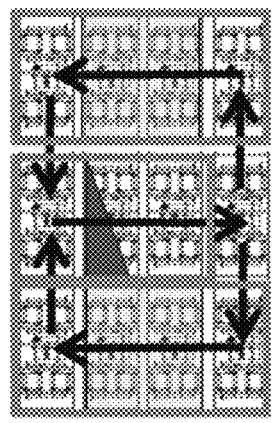
FIGS. 46A-46B illustrate a SRPS (Short) model (FIG. 46A) and BRPS (Big) model (FIG. 46B)
Figure 46B:
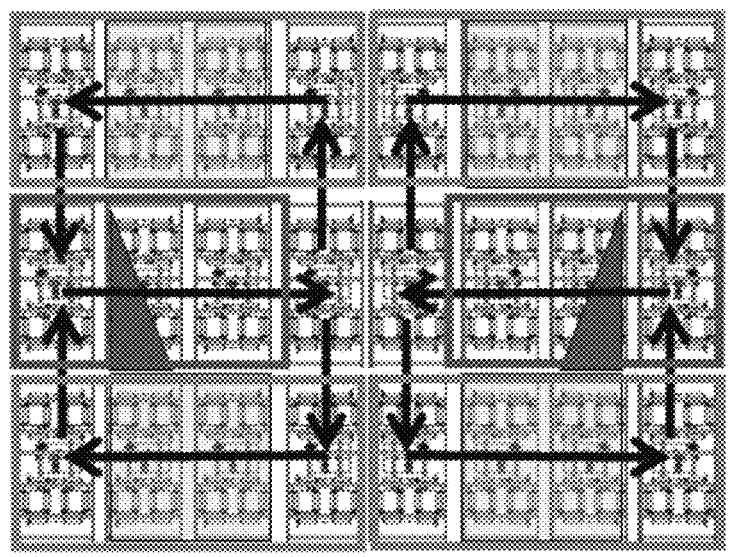

Reference is now made to FIG. 46 illustrating a SRPS (Short) model, BRPS (Big) model. In both cases, the chains share a common area and even a functional lift trio serving two adjacent chains by rotation—specific examples of a box trio and a lift trio utilization within the RPS/APS.

Figure 47A:
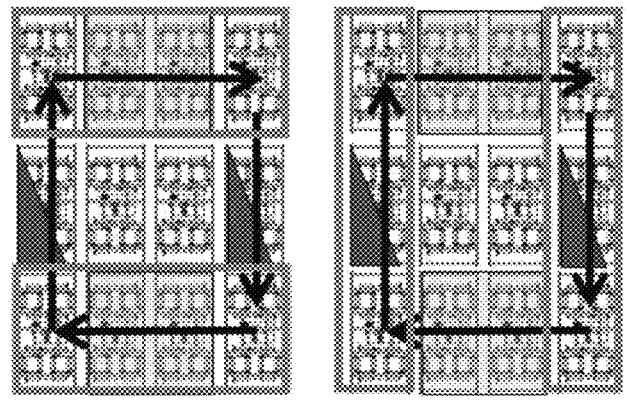
FIGS. 47A-47C illustrate possible configurations of a FRPS (Fest) model, where
Figure 47B:
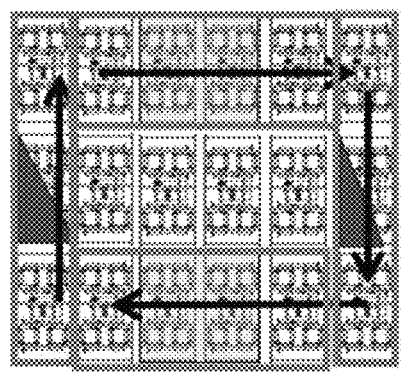
Figure 47C:
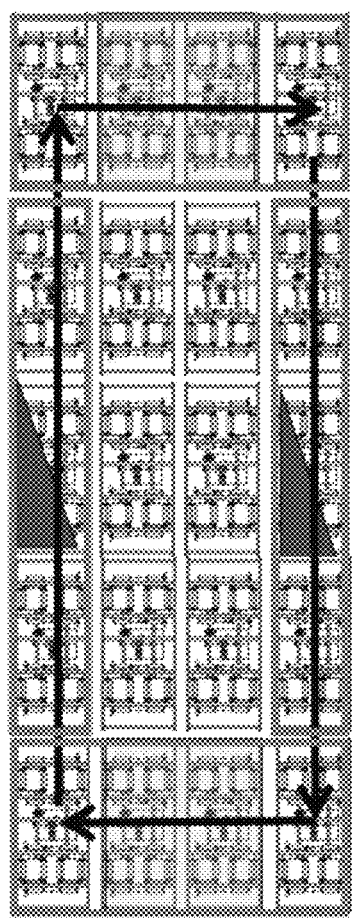

Reference is now made to FIG. 47 illustrating a FRPS (Fest) model For a small size basic FRPS "TRIO" model, governed by the priority, Lifts or Boxes move (see 2 versions)—specific examples of a box trio and a lift trio utilization within the RPS/APS.

Figure 48A:
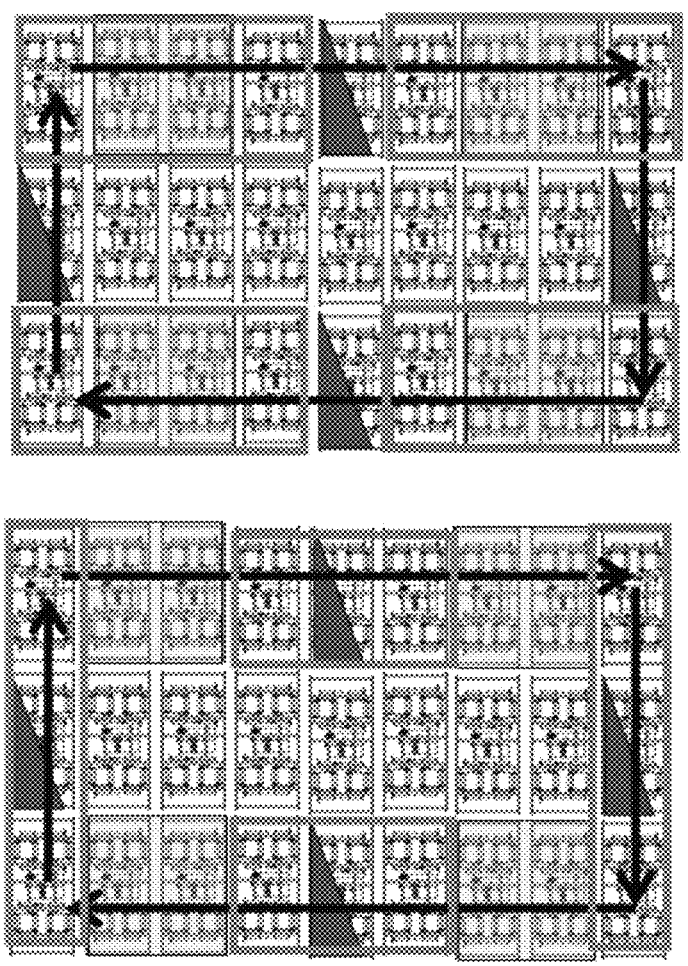
FIGS. 48A-48C illustrate possible configurations of a BFRPS (Big Fest) model, where
Figure 48B:
Figure 48C:
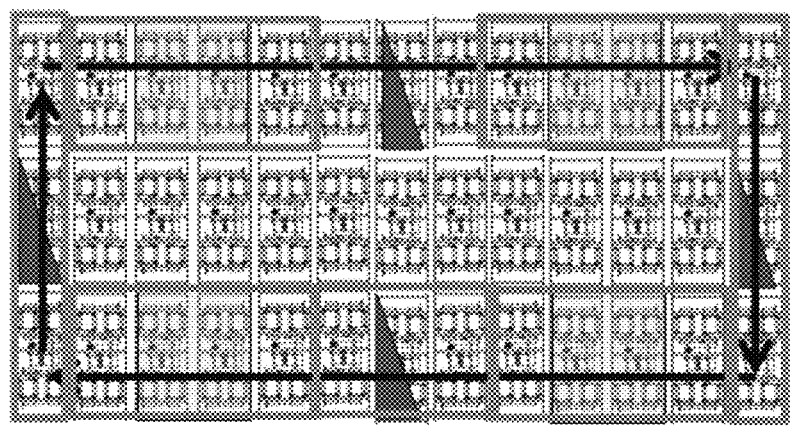

Reference is now made to FIG. 48 illustrating a BFRPS (Big Fest) model. For models 48a and 48b BFRPS "TRIO", governed by the priority, Lifts or Boxes move (see 2 versions)—specific examples of a box trio and a lift trio utilization within the RPS/APS.

Figure 49A:
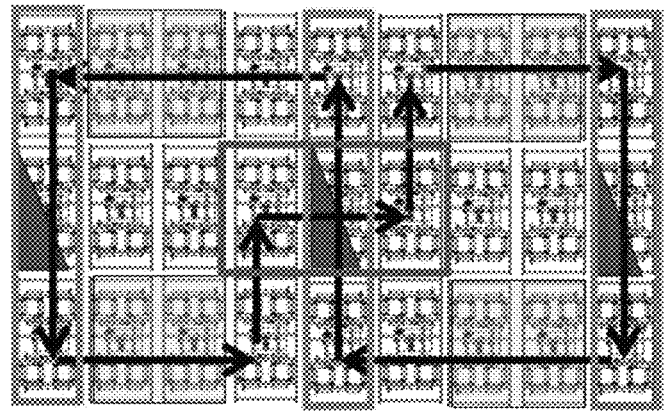
FIGS. 49A-49C illustrates possible configurations of a LRPS (Loop) model, where
Figure 49B:
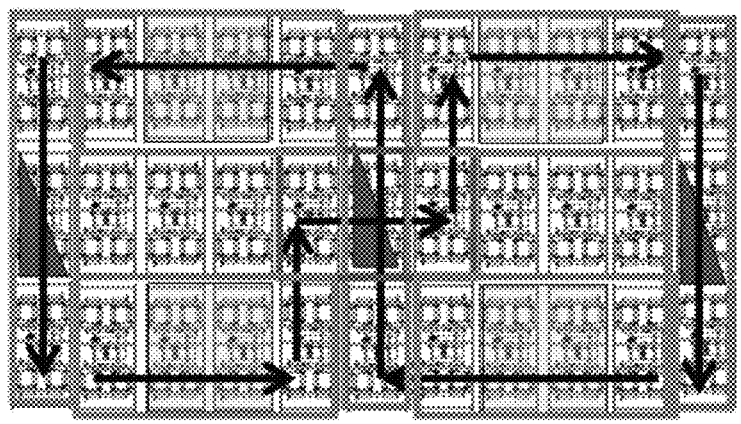
Figure 49C:
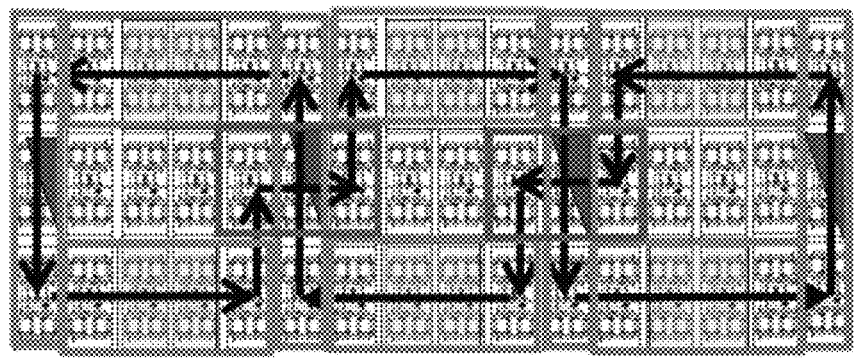
Figures 50A, 50B:
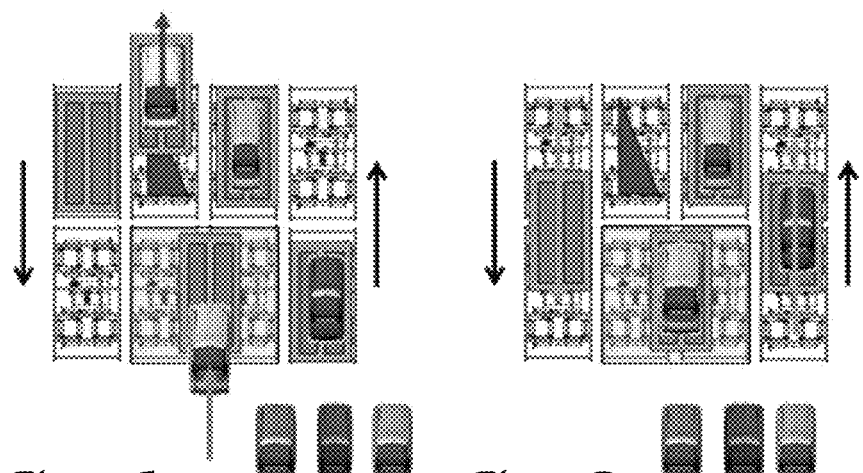
Figures 50C, 50D:
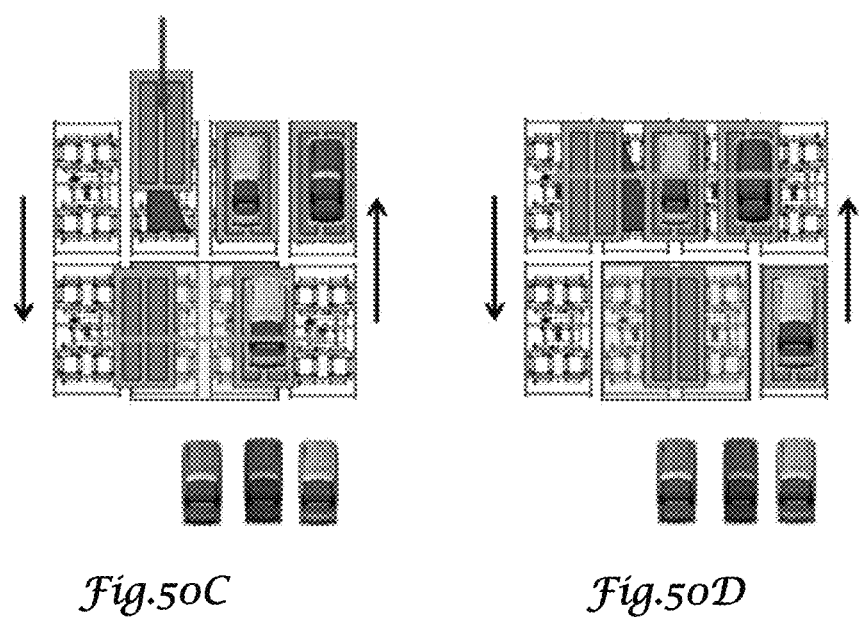
Figure 50E:
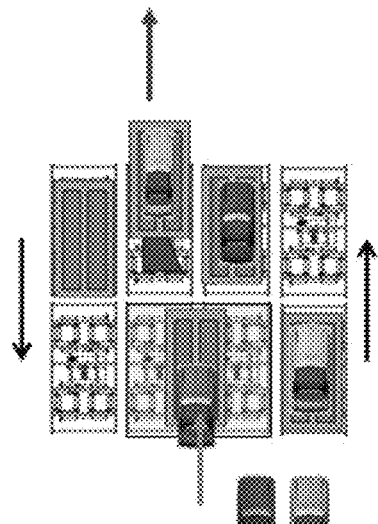
Figure 50F:
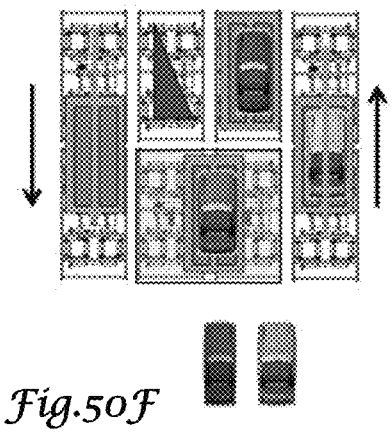
Figure 50G:
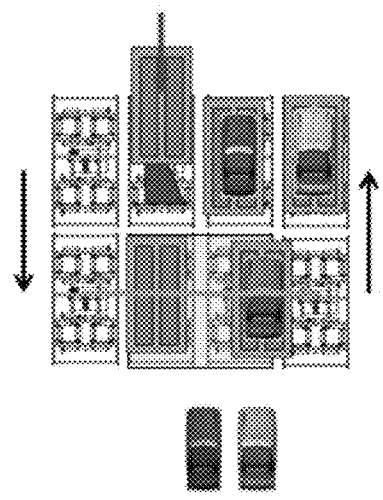
Figure 50H:
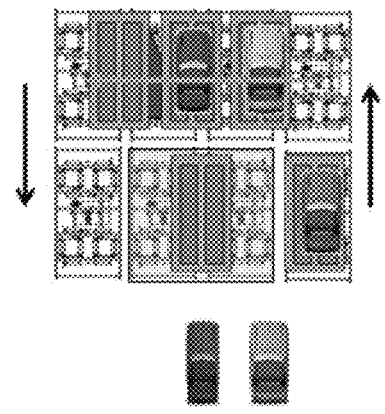

Reference is now made to FIG. 49 illustrating a LRPS (Loop) model. For a model 49a LRPS "TRIO", usually, the priority is given to two side lifts. Central lift (lifts) in all the versions of LRPS is/are prioritized and positioned on the intersection—specific examples of a box trio and a lift trio utilization within the RPS/APS.

Figures 51A, 51B:
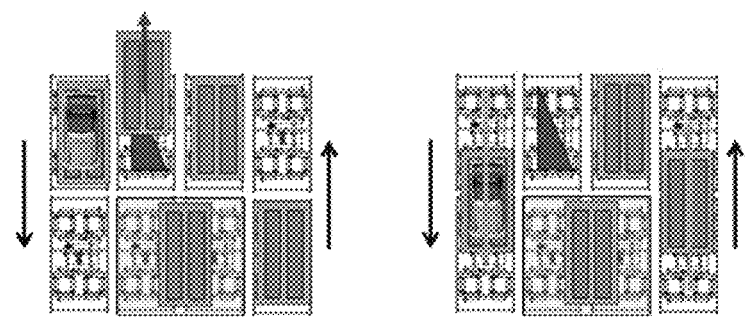
Figures 51C, 51D:
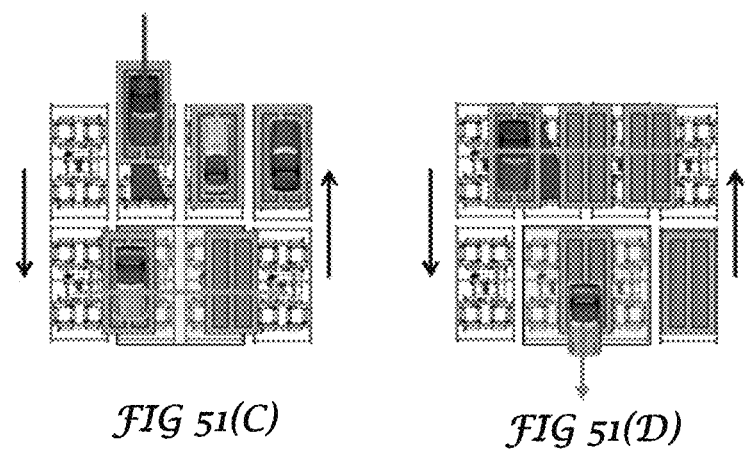
Figures 52A, 52B, 52C, 52D:
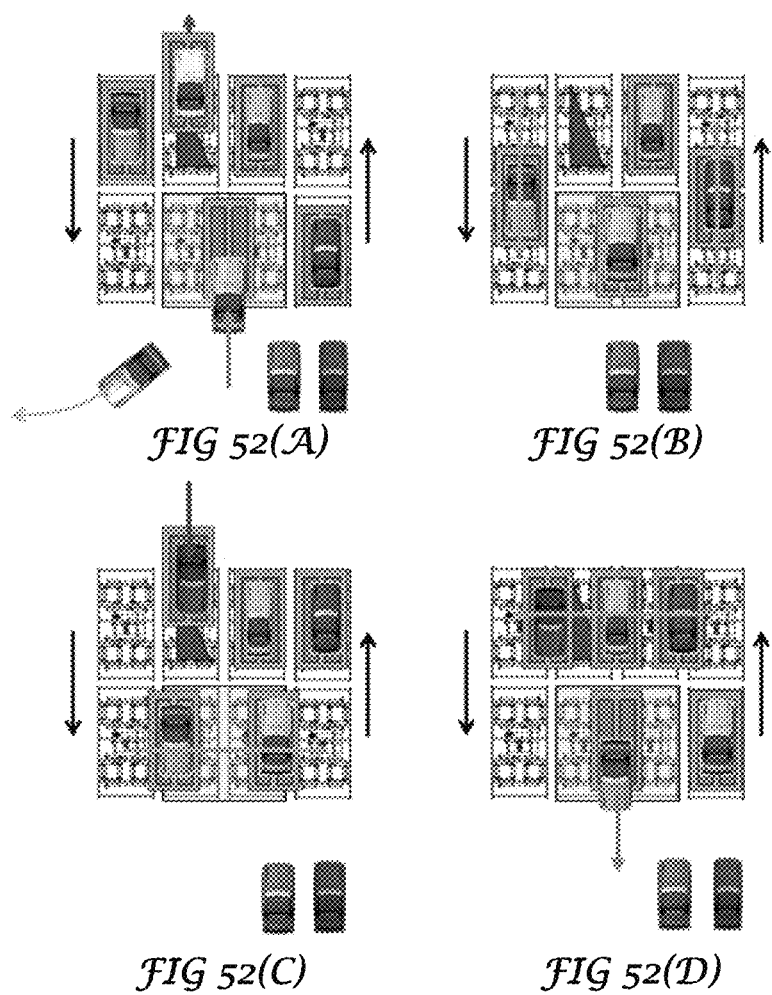
FIGS. 52A-52H illustrate examples of MRPS utilization in a Cargo exchange mode.
Figures 52E, 52F, 52G, 52H:
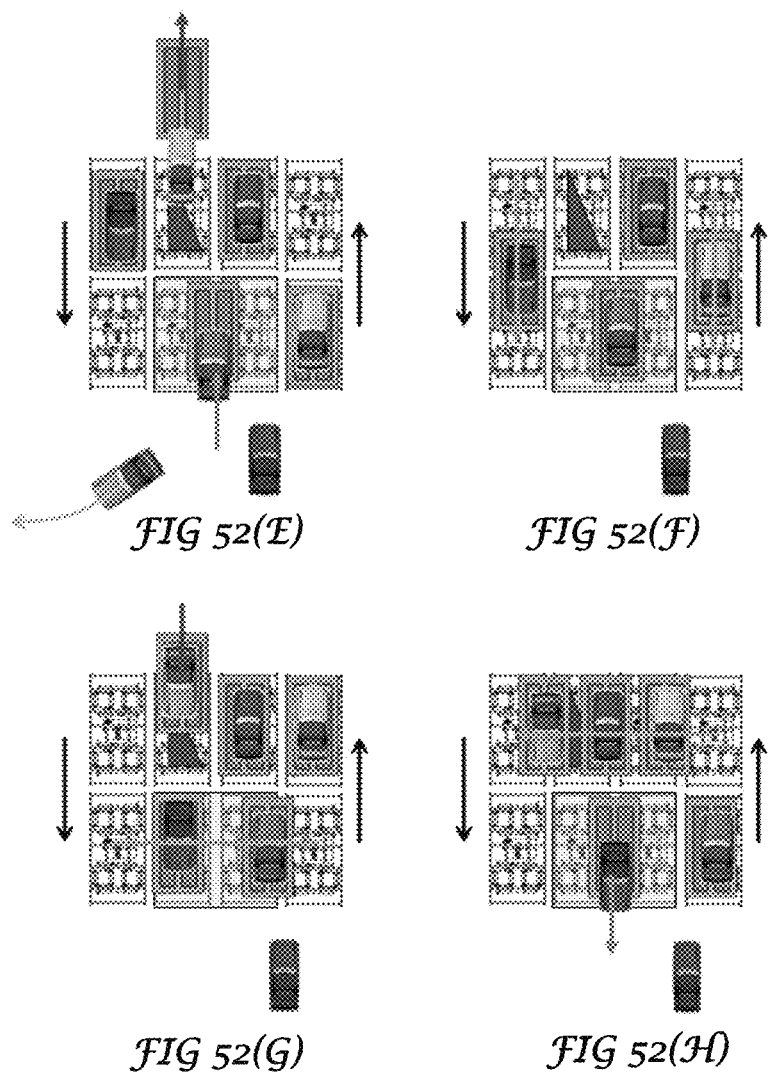
Figures 53A, 53B:
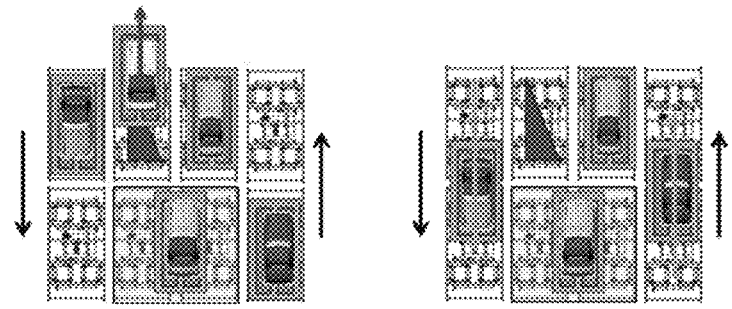
FIGS. 53A-53H illustrate examples of MRPS utilization in a Cargo handling mode.
Figures 53C, 53D:
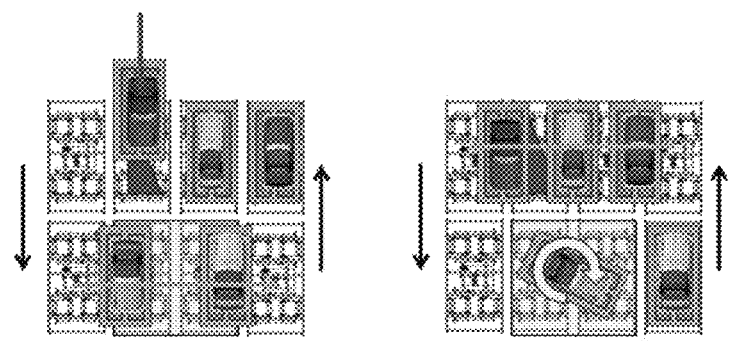
Figures 53E, 53F:
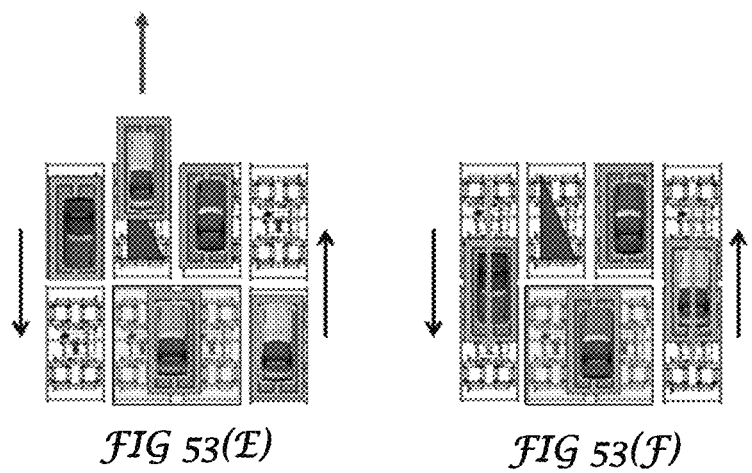
Figures 53G, 53H:
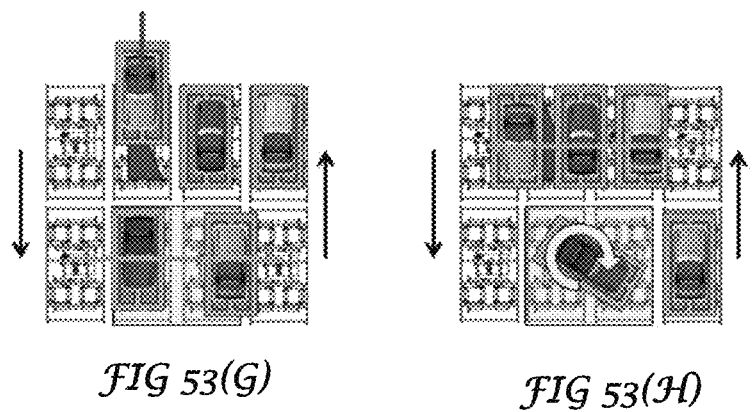
Figures 54A, 54B:
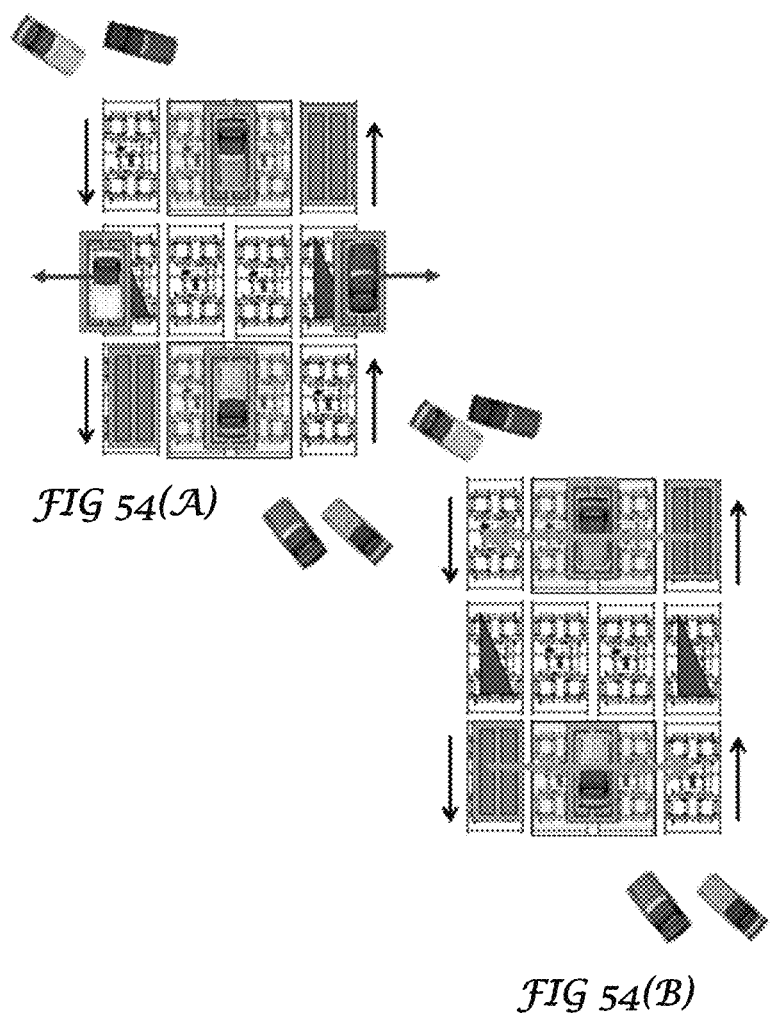
FIGS. 54A-54H illustrate examples of FRPS utilization in a mass Cargo reception mode.
Figures 54C, 54D:
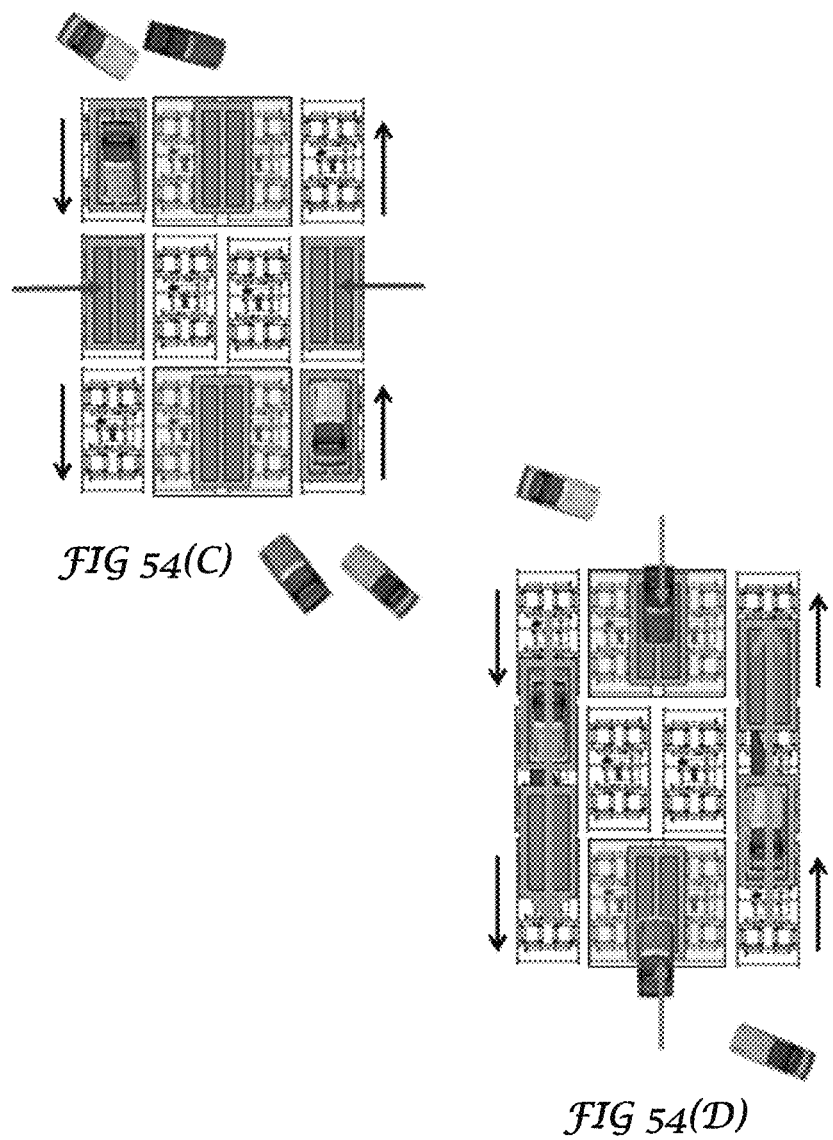
Figures 54E, 54F:
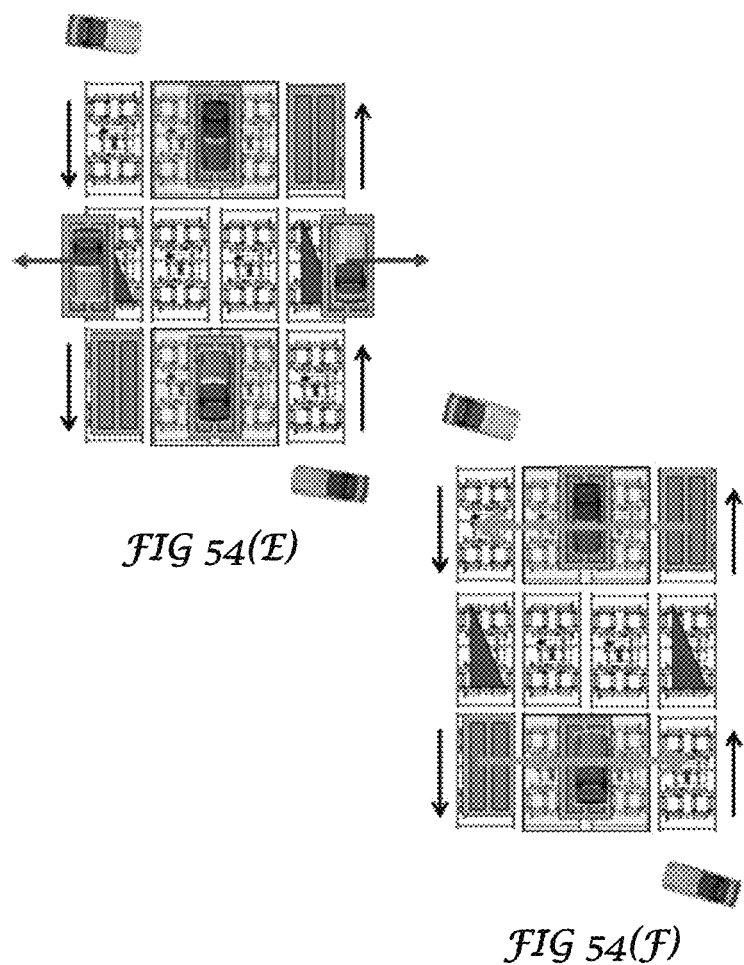
Figures 54G, 54H:
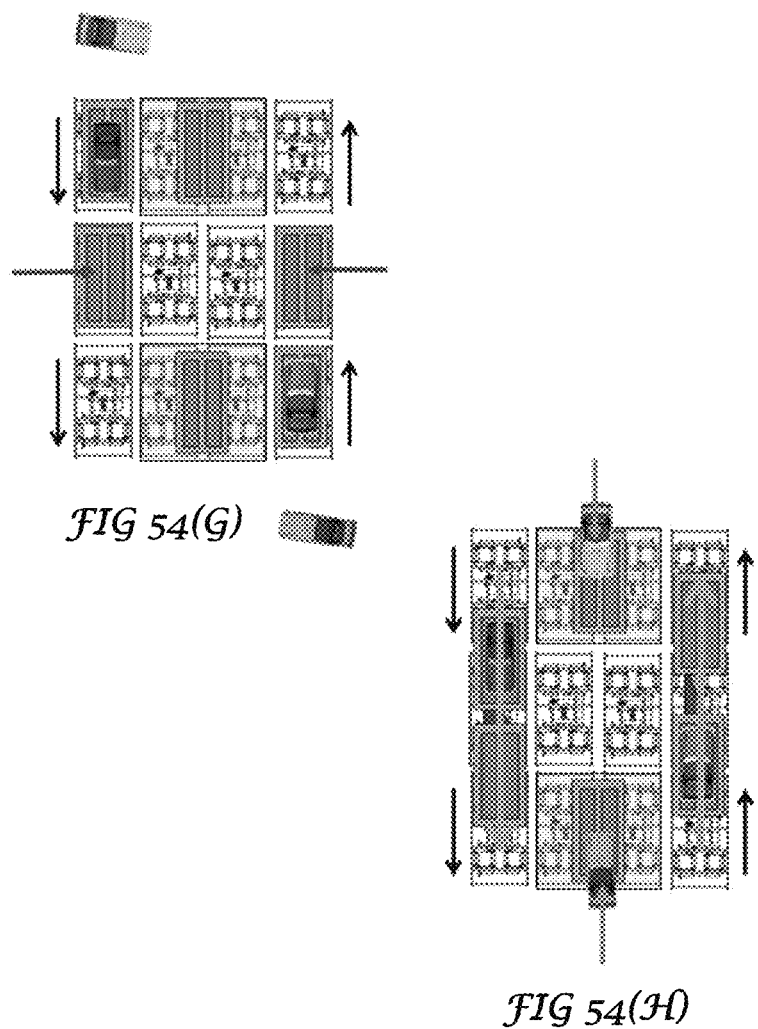
Figure 55A:
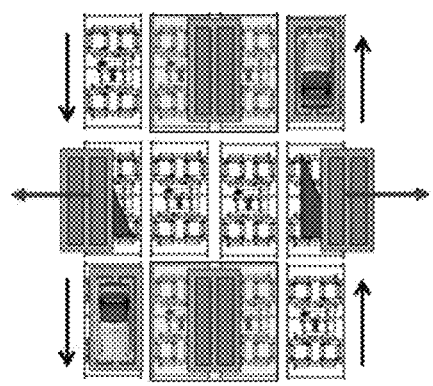
FIGS. 55A-55H illustrate examples of FRPS utilization in a mass Cargo delivery mode.
Figure 55B:
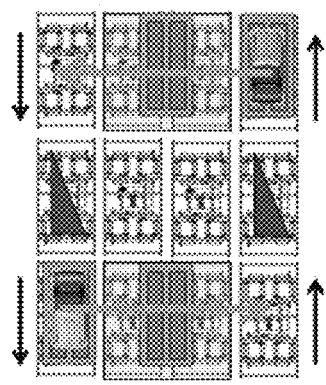
Figure 55C:
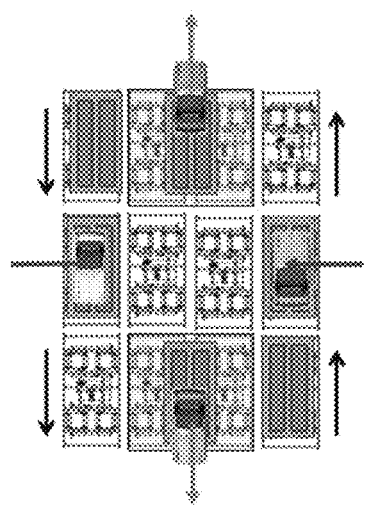
Figure 55D:
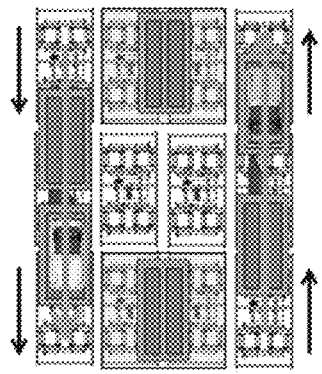
Figure 55E:
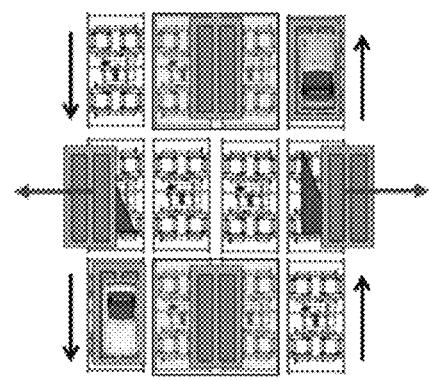
Figure 55F:
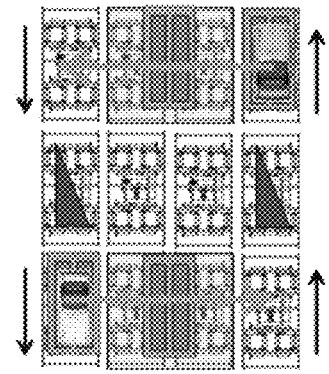
Figure 55G:
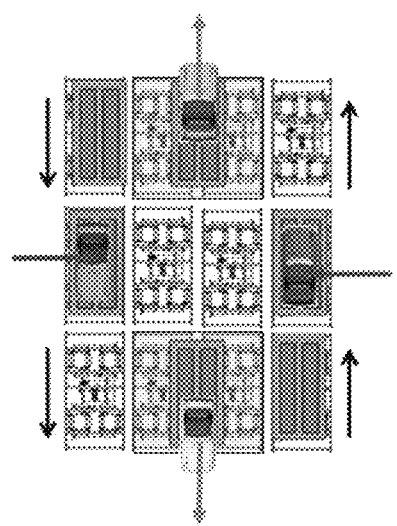
Figure 55H:
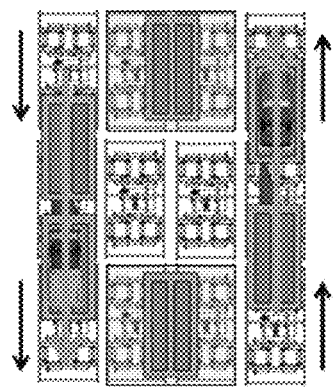
Figures 56A, 56B:
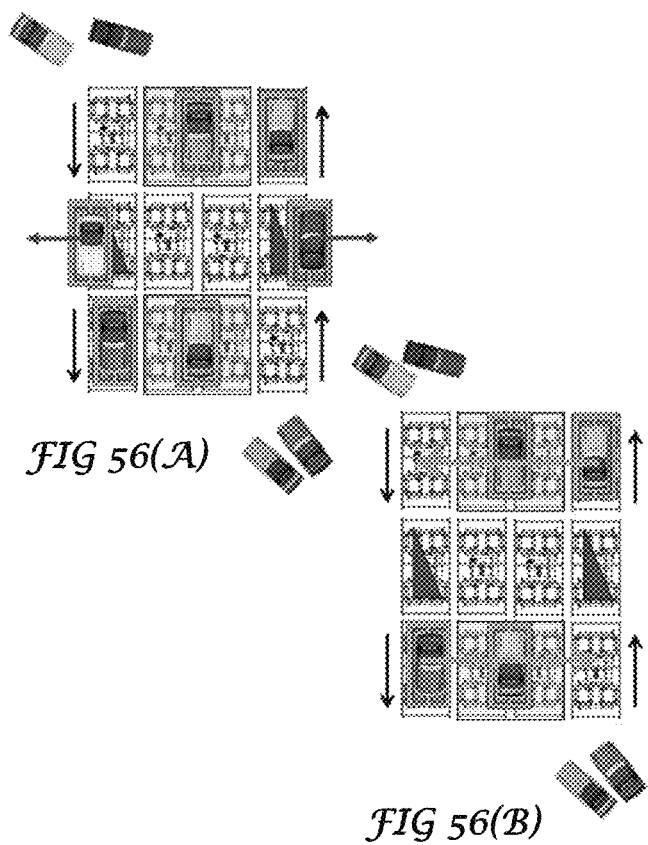
FIGS. 56A-56H illustrate examples of FRPS utilization in a Cargo exchange mode.
Figures 56C, 56D:
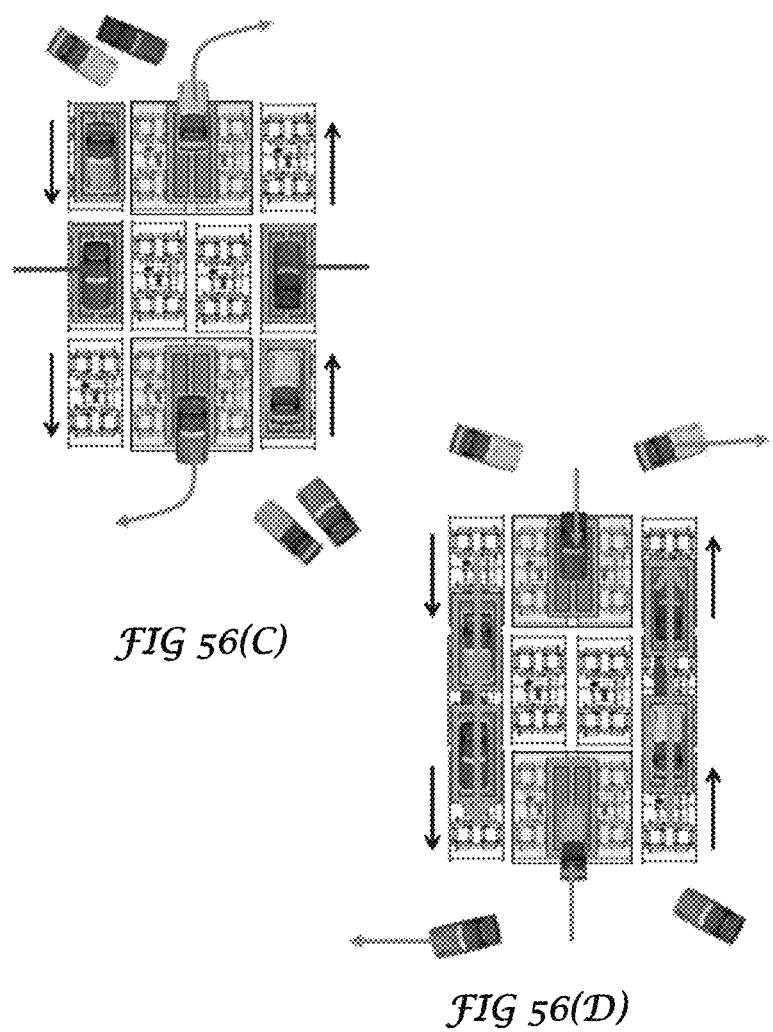
Figures 56E, 56F:
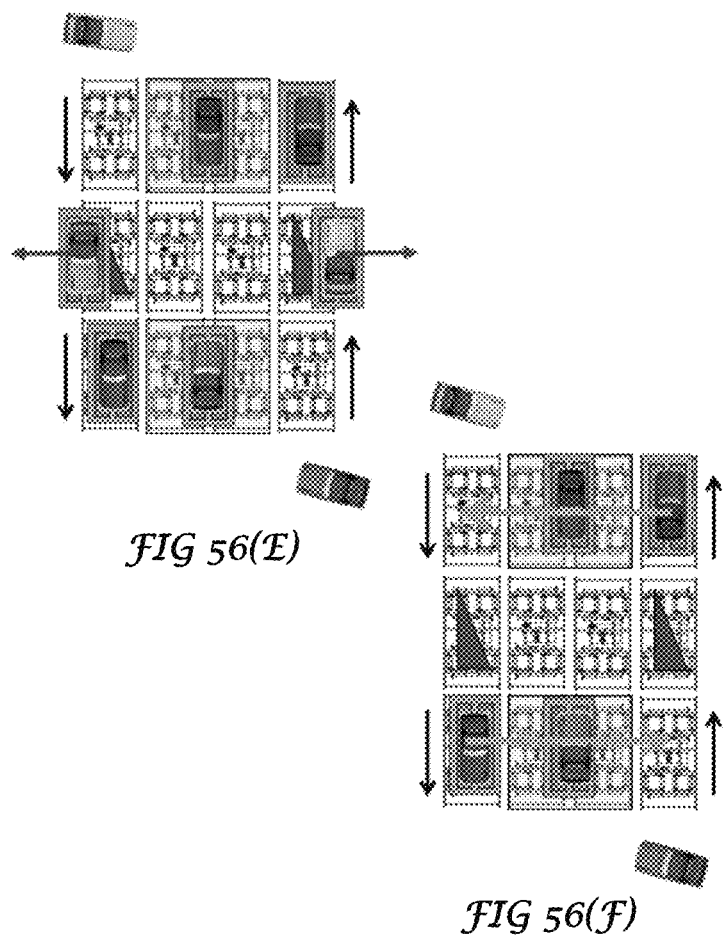
Figures 56G, 56H:
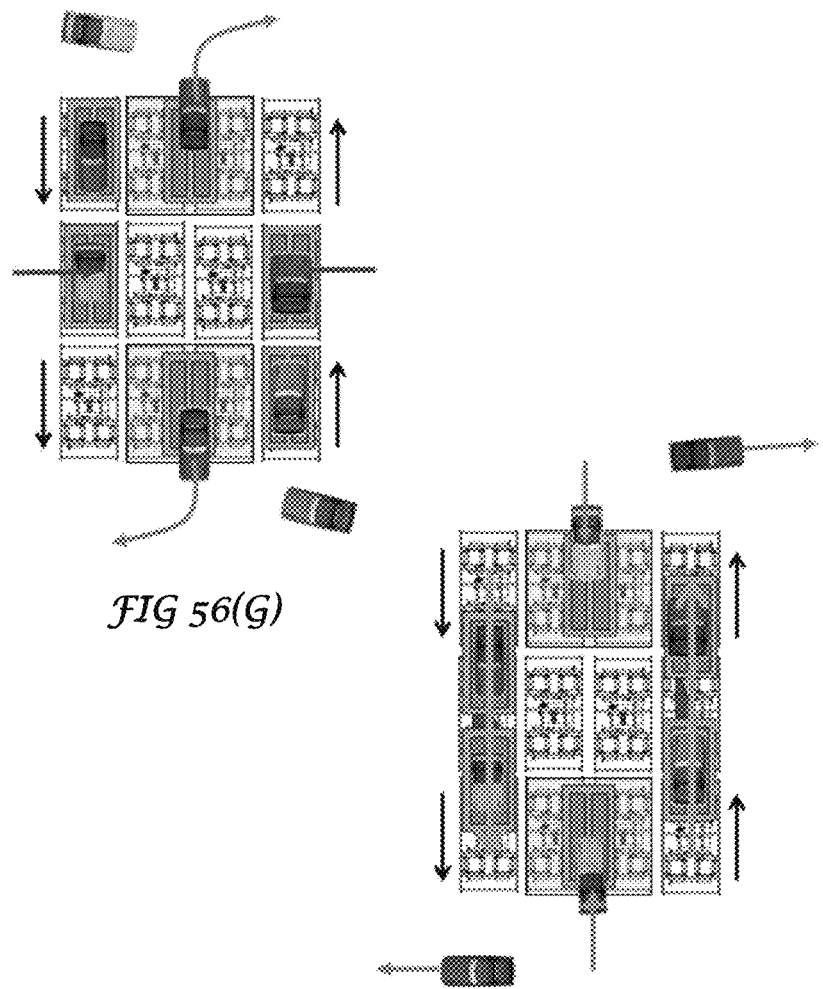
Figure 57A:
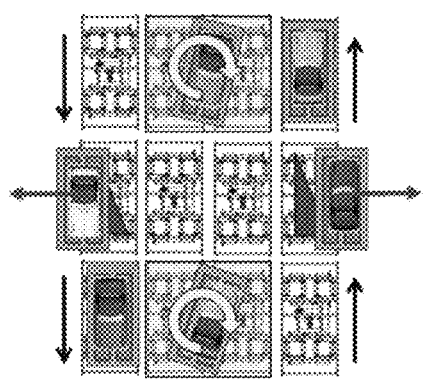
FIGS. 57A-57H illustrate examples of FRPS utilization in a Cargo handling mode.
Figure 57B:
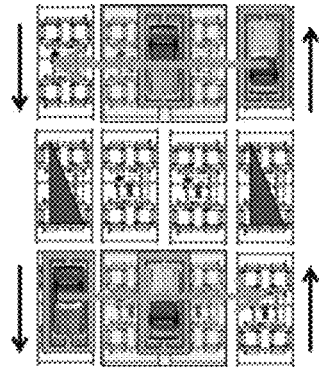
Figure 57C:
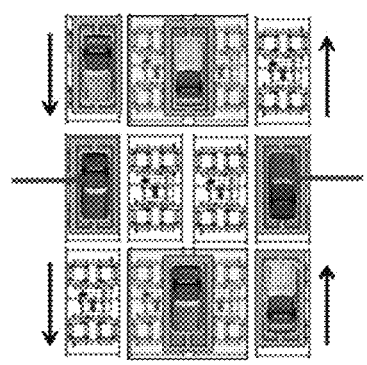
Figure 57D:
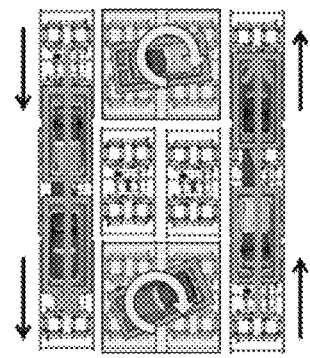
Figure 57E:
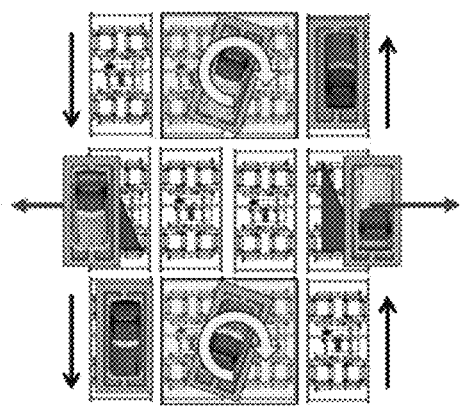
Figure 57F:
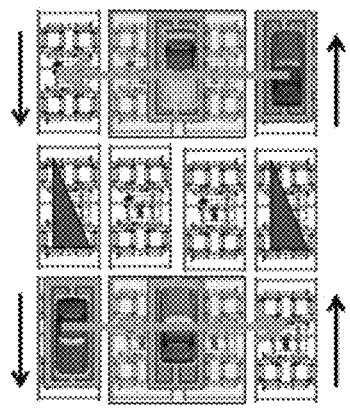
Figure 57G:
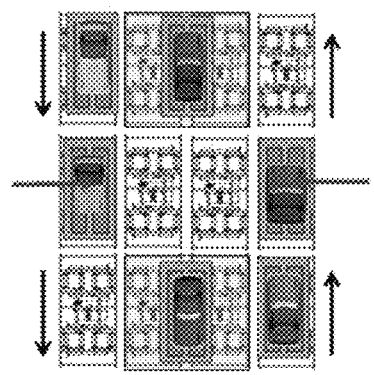
Figure 57H:
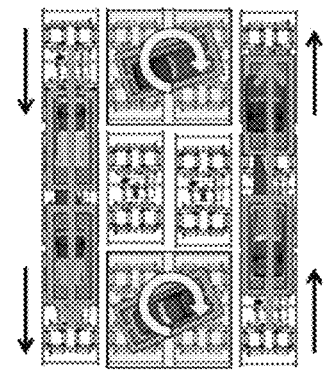
Figure 58A:
FIGS. 58A-58F illustrate examples of a vertical chain utilization in a mass Cargo delivery mode.
Figure 58B:
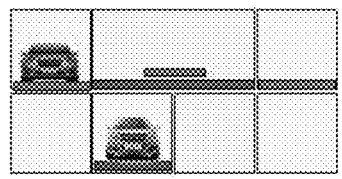
Figure 58C:
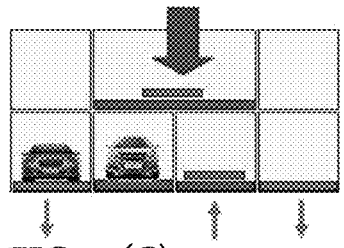
Figure 58D:
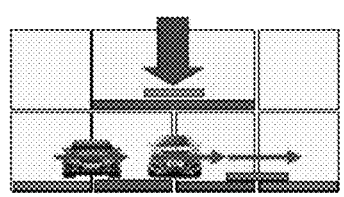
Figure 58E:
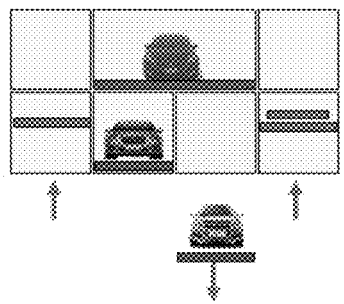
Figure 58F:
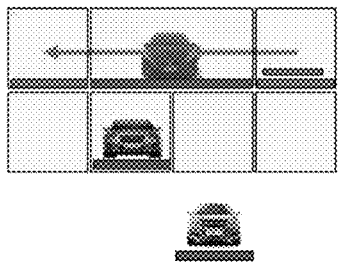
Figure 59A:
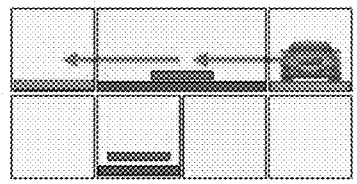
FIGS. 59A-59F illustrate examples of a vertical chain utilization in a mass Cargo delivery mode.
Figure 59B:
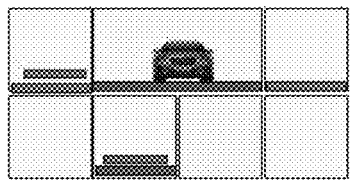
Figure 59C:
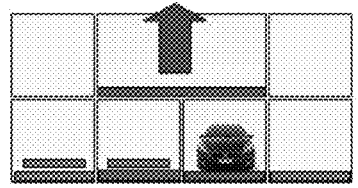
Figure 59D:
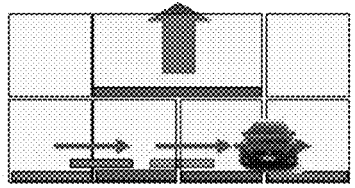
Figure 59E:
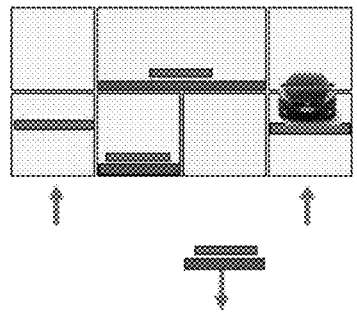
Figure 59F:
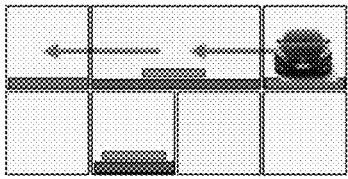
Figure 60A:
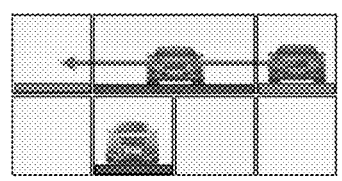
FIGS. 60A-60F illustrate examples of a vertical chain utilization in a mass Cargo reception mode.
Figure 60B:
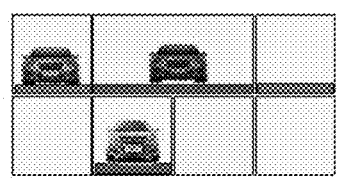
Figure 60C:
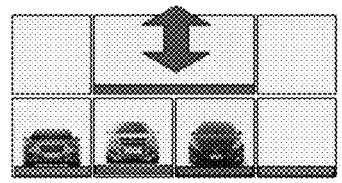
Figure 60D:
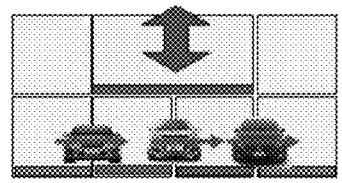
Figure 60E:
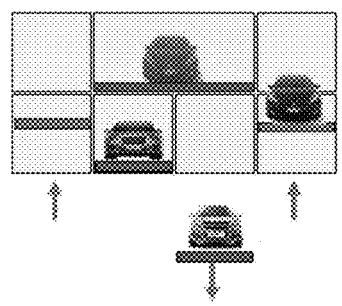
Figure 60F:
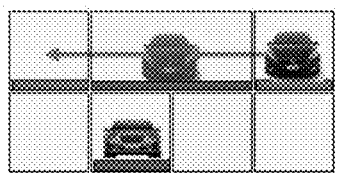
Figure 61A:
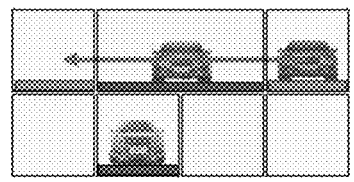
FIGS. 61A-61F illustrate examples of a vertical chain utilization in a Cargo handling mode.
Figure 61B:
Figure 61C:
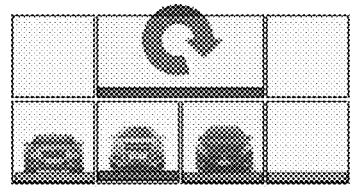
Figure 61D:
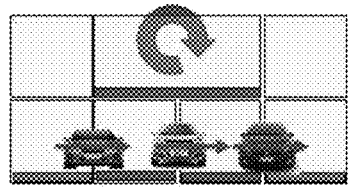
Figure 61E:
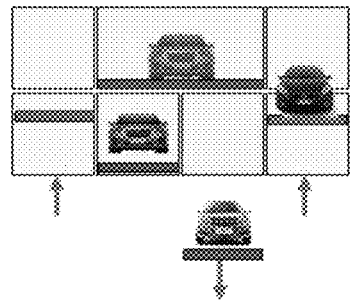
Figure 61F:
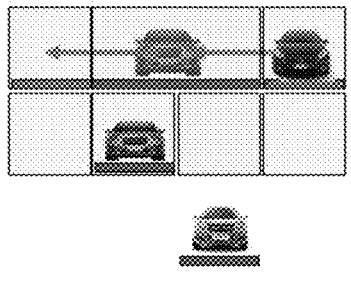
Figure 62:
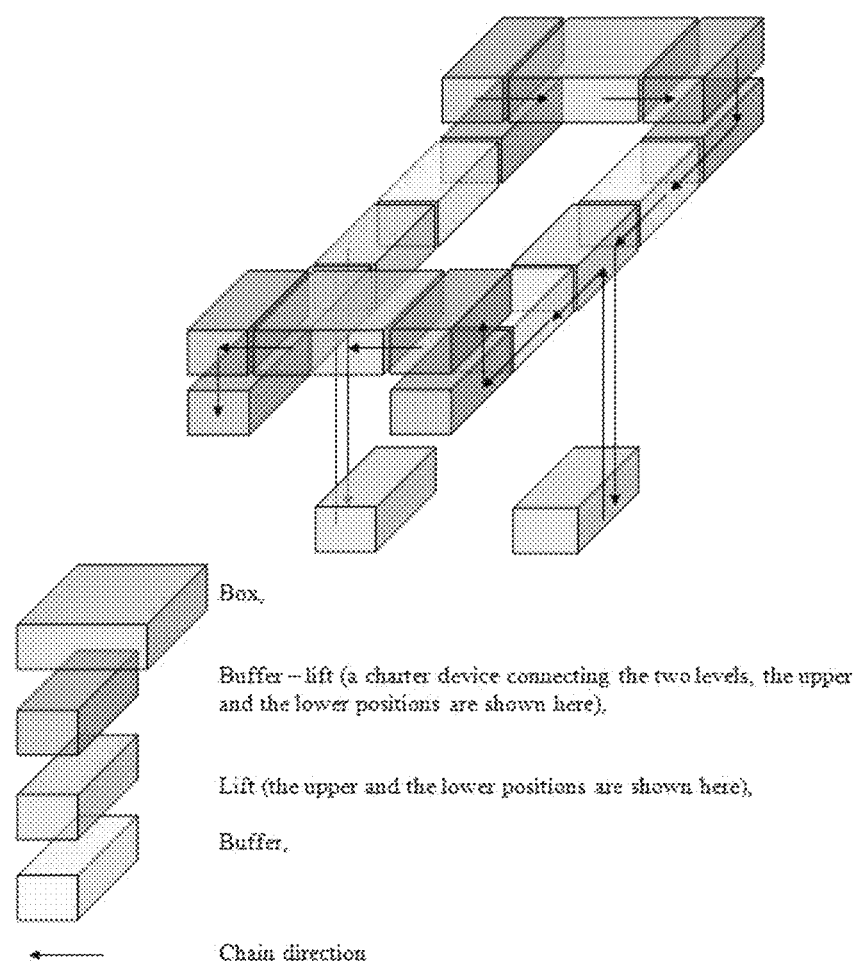
Figure 63A:
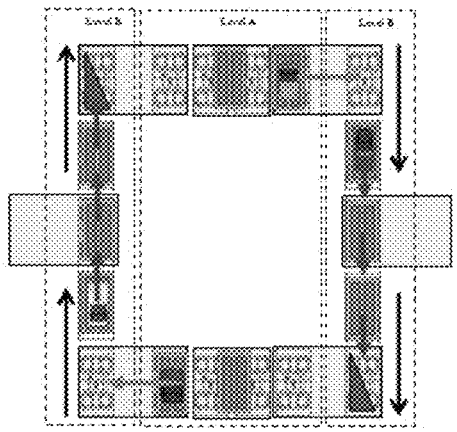
FIGS. 63A-63F illustrate examples of a combined (3D matrix) service area chain structure and its utilization in a mass cargo reception mode.
Figure 63B:
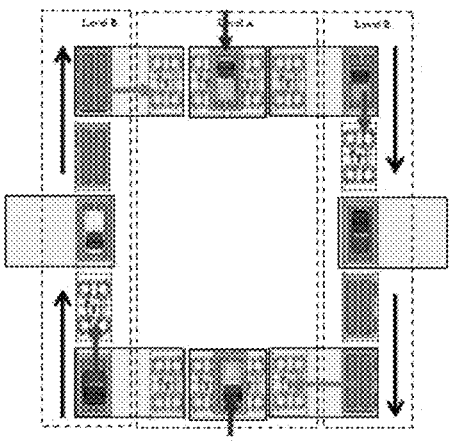
Figure 63C:
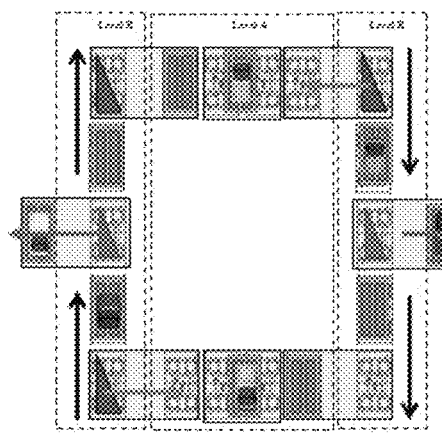
Figure 63D:
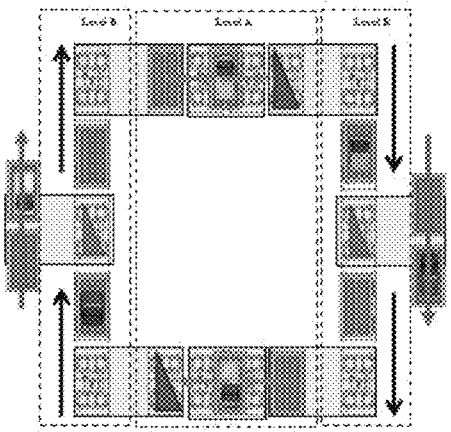
Figure 63E:
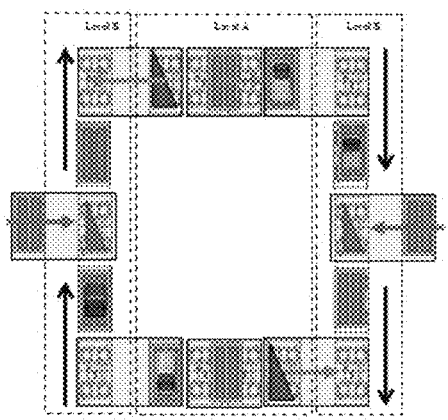
Figure 63F:
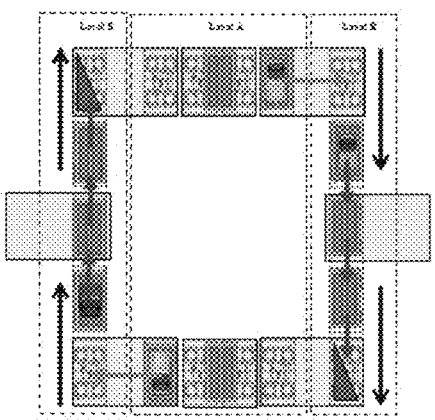
Figure 64A:
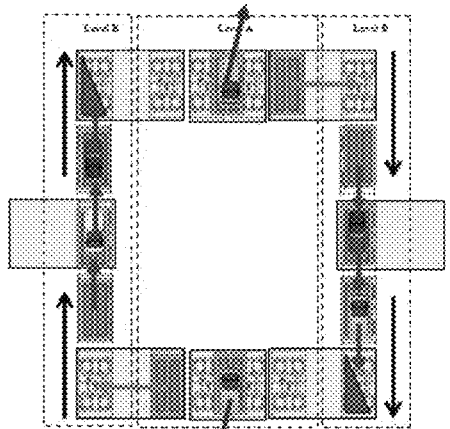
FIGS. 64A-64F illustrate examples of a combined (3D matrix) service area chain structure and its utilization in a mass cargo delivery mode.
Figure 64B:
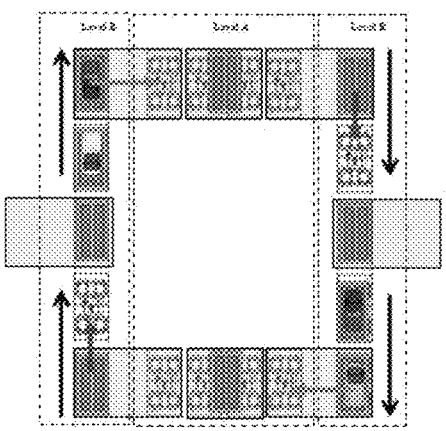
Figure 64C:
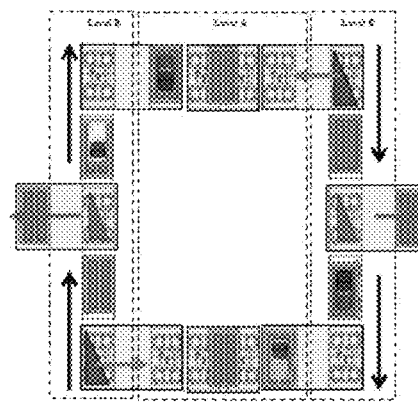
Figure 64D:
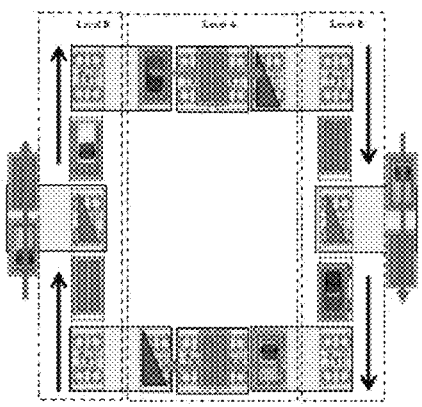
Figure 64E:
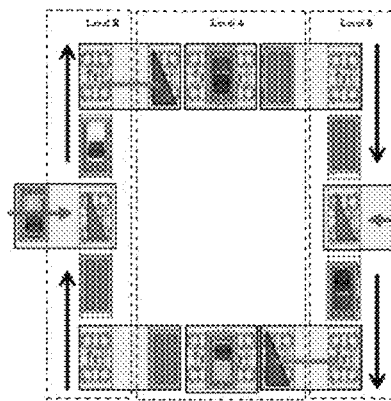
Figure 64F:
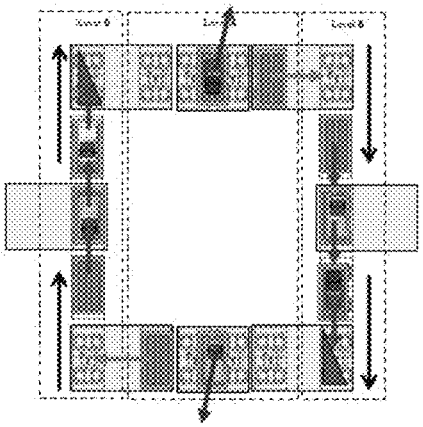
Figure 66A:
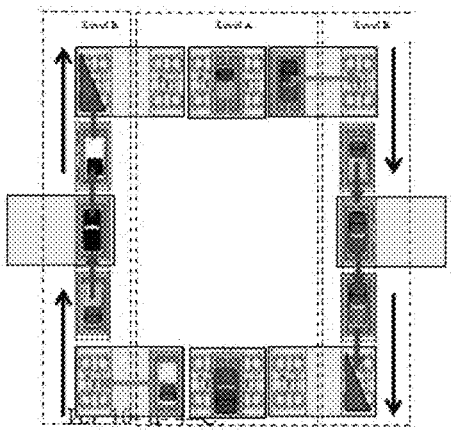
FIGS. 66A-66F illustrate an example of a combined (3D matrix) service area chain structure and its utilization in a mass cargo-handling in rotation mode.
Figure 66B:
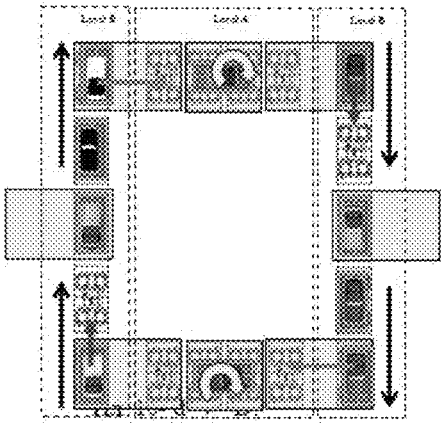
Figure 66C:
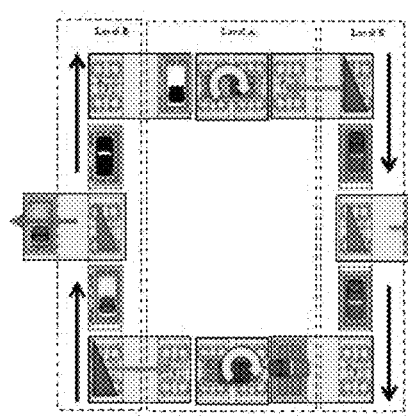
Figure 66D:
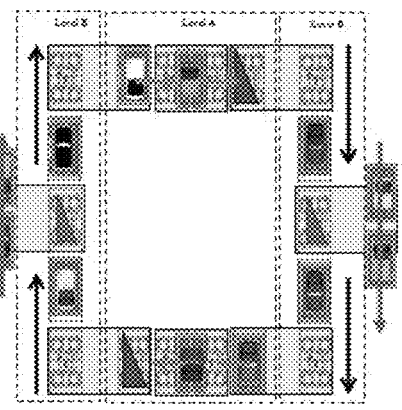
Figure 66E:
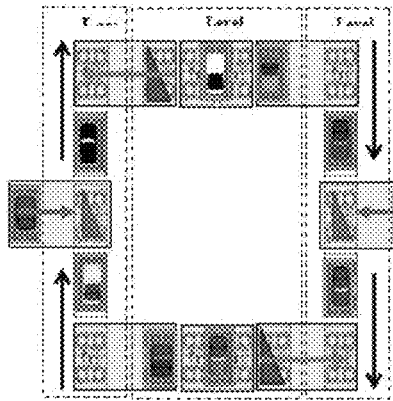
Figure 66F:
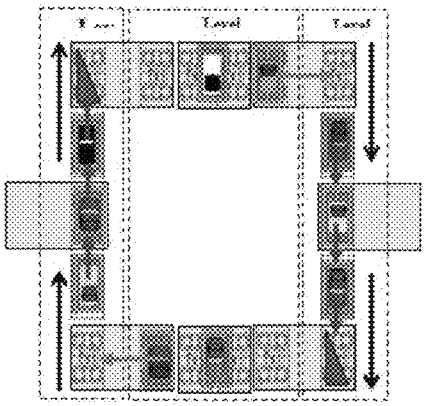
Figure 67:
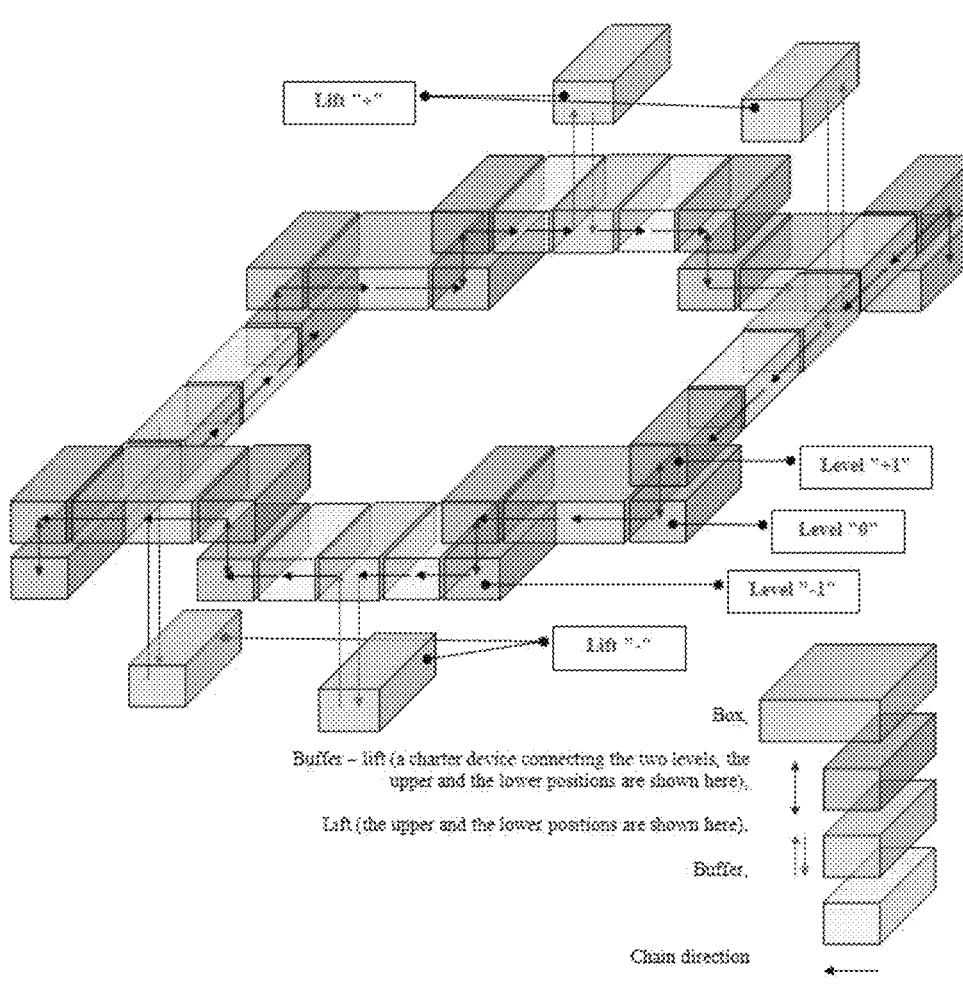

Reference is now made to FIG. 50-67, illustrating organizing principles for service areas in a way that they are able to perform mass operations of reception, delivery, exchange and treatment of cargo within the standard chain without the necessity of changing direction or its operating principles. These figures will use service area models of different types which were developed by the author of this patent for Robotic Parking Systems (RPS) of Matrix type, developed by him within the Israeli company Olimpus-P ltd. Application of the present patent is not limited to RPS of matrix type only, as it can be utilized in various types of storage and parking systems. These figures are not to be regarded as a complete list of all the organizing possibilities of chains within the service areas of storage and parking systems, rather as illustrations of the statements declared by the applicator of the present invention. In all the examples, the lift cell is indicated by a red triangle, reception/delivery box—pink transparent square and the moving direction of the chain—black arrows, car rotation—yellow circular arrow. FIG. 50 is an example of MRPS utilization in a mass Cargo receiving mode. FIG. 51 is an example of MRPS utilization in a mass Cargo delivery mode. FIG. 52 is an example of MRPS utilization in a Cargo exchange mode. FIG. 53—is an example of MRPS utilization in a Cargo handling mode—pallet rotation with a car on at 180 degrees. FIG. 54—is an example of FRPS utilization in a mass Cargo reception mode. FIG. 55—is an example of FRPS utilization in a mass Cargo delivery mode. FIG. 56—is an example of FRPS utilization in a Cargo exchange mode. FIG. 57—is an example of FRPS utilization in a Cargo handling mode—pallet rotation with a car on at 180 degrees (specific case). FIG. 58—is an example of a vertical chain utilization in a mass Cargo delivery mode. FIG. 59—is an example of a vertical chain utilization in a mass Cargo delivery mode. FIG. 60—is an example of a vertical chain utilization in a mass Cargo reception mode. FIG. 61—is an example of a vertical chain utilization in a Cargo handling mode—pallet rotation with a car on at 180 degrees (specific case). FIG. 62—is an example of a combined (3D matrix) service area chain structure. FIG. 63—is an example of a combined (3D matrix) service area chain structure and its utilization in a mass cargo reception mode. FIG. 64—is an example of a combined (3D matrix) service area chain structure and its utilization in a mass cargo delivery mode. FIG. 65—is an example of a combined (3D matrix) service area chain structure and its utilization in a mass cargo exchange mode. FIG. 66—is an example of a combined (3D matrix) service area chain structure and its utilization in a mass cargo-handling mode—specific case—rotation. FIG. 67—is an example of a combined (3D matrix) service area chain structure serving two storage areas simultaneously.

Figure 68A:
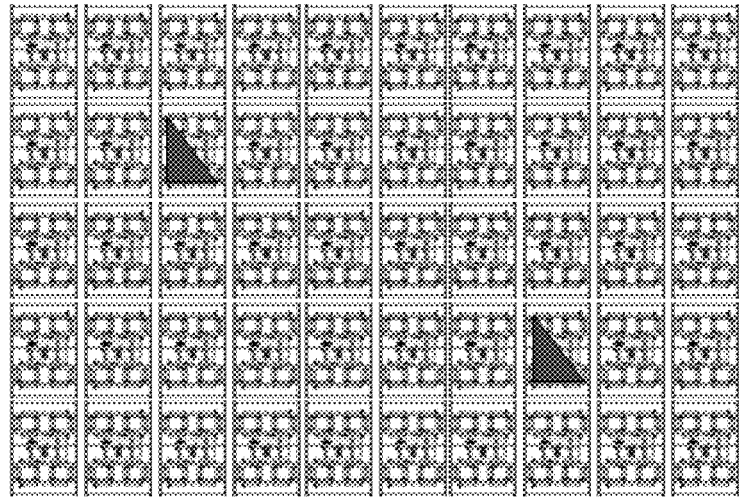
FIGS. 68A-68B illustrate possible constructions of one storage level.
Figure 68B:
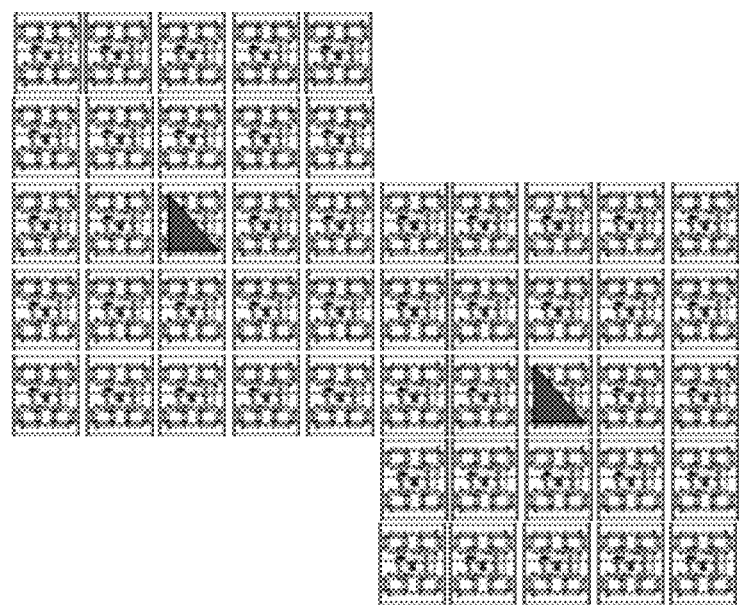

Reference is now made to FIG. 68 illustrating possible construction of one storage level. FIGS. 68a and b illustrate two such possible constructions.

Figure 69:
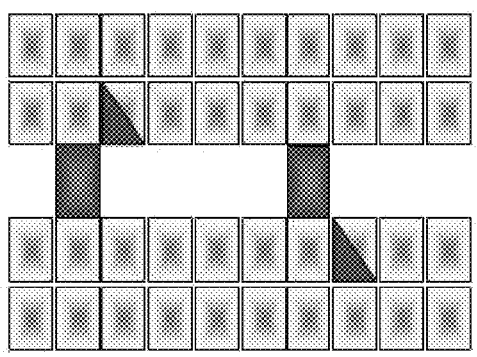
FIG. 69 illustrates possible construction of one storage level, using a corridor-complex type based on "shuttles"

Reference is now made to FIG. 69 illustrating a third possible construction of one storage level, using a corridor-complex type based on "shuttles".

Figure 70:
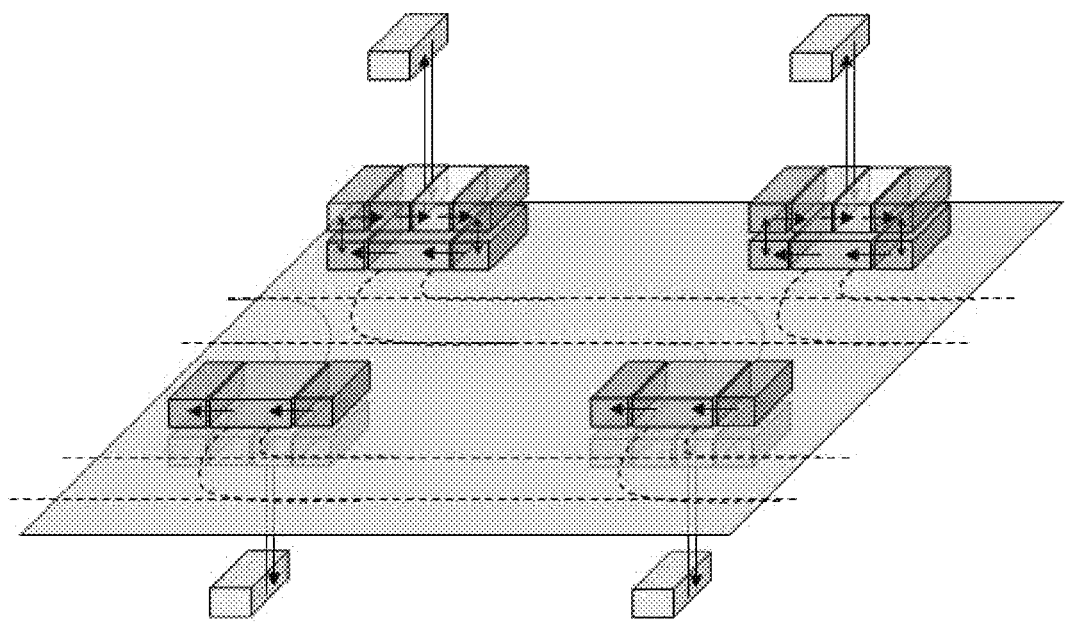
FIG. 70 illustrates universal two level service area chains for underground and above the ground service.
Figure 71A:
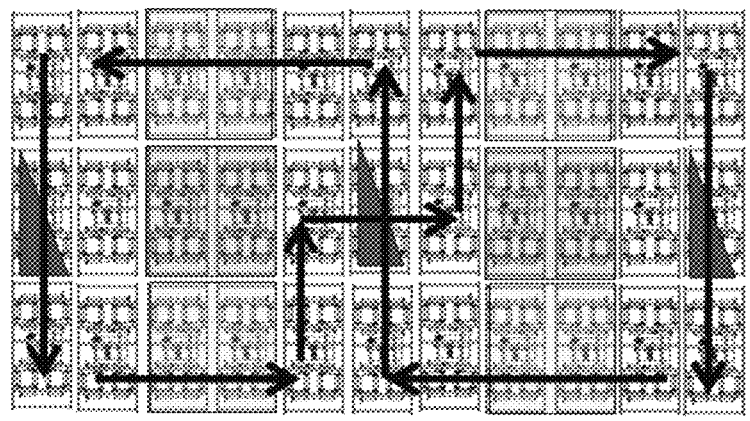
FIGS. 71A-71I illustrate some of the types of chain shifting organization of RPS matrix type, FRPS model in case of a malfunction of various cells.
Figure 71B:
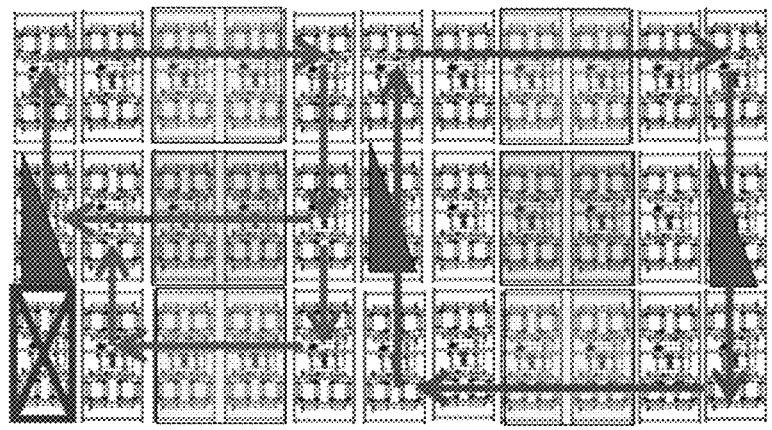
Figure 71C:
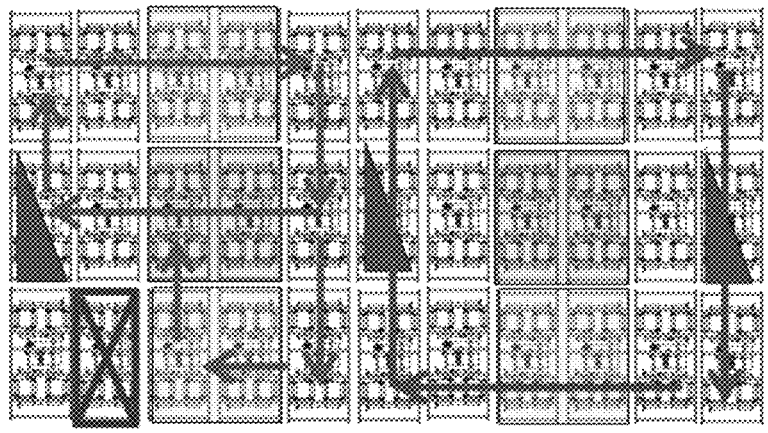
Figure 71D:
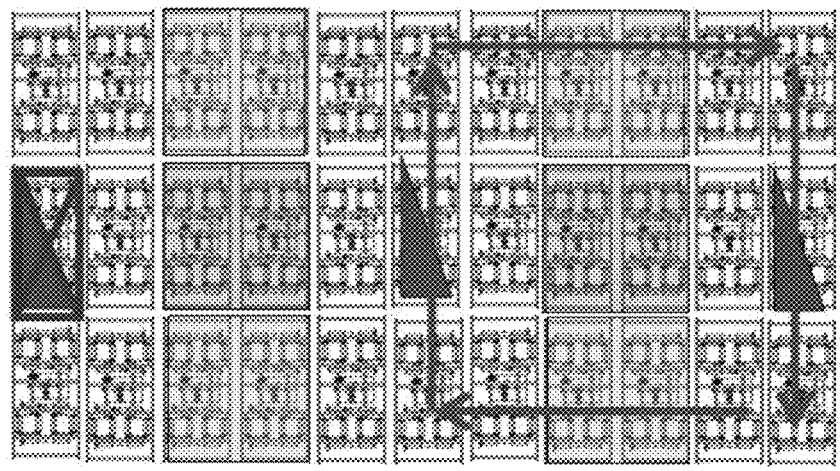
Figure 71E:
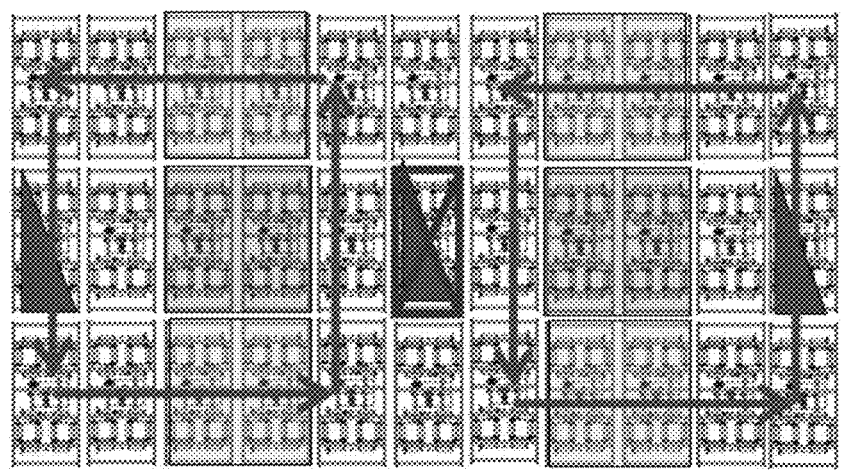
Figure 71F:
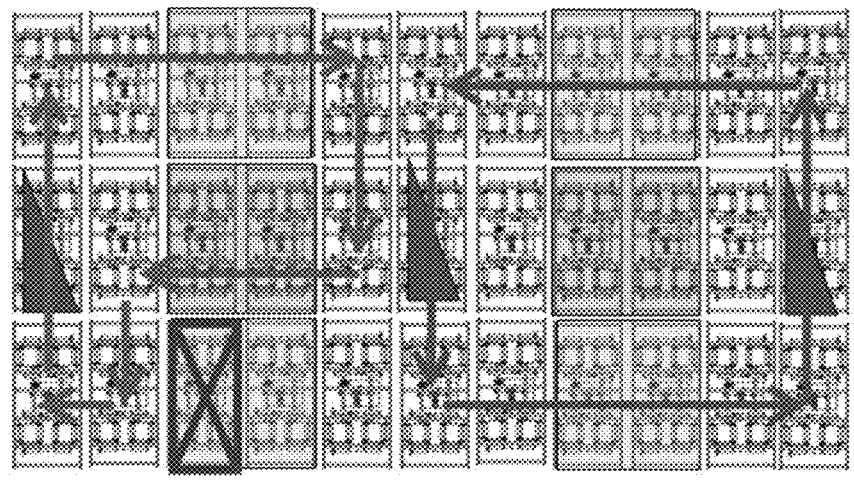
Figure 71G:
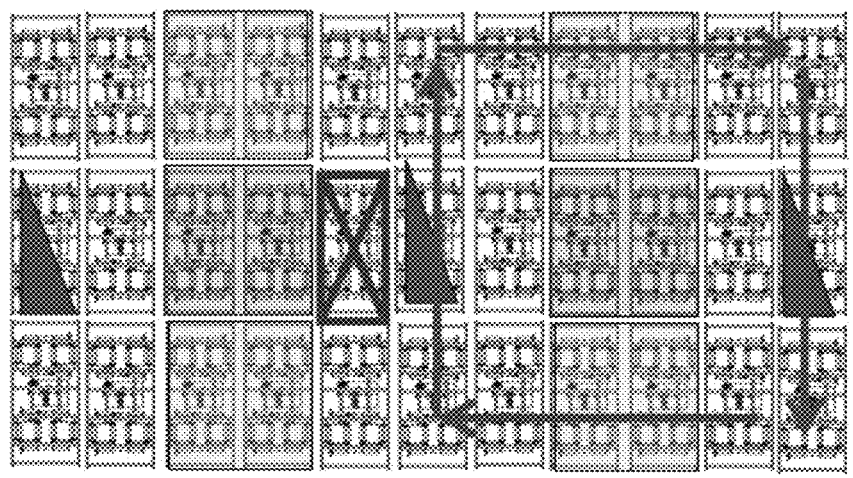
Figure 71H:
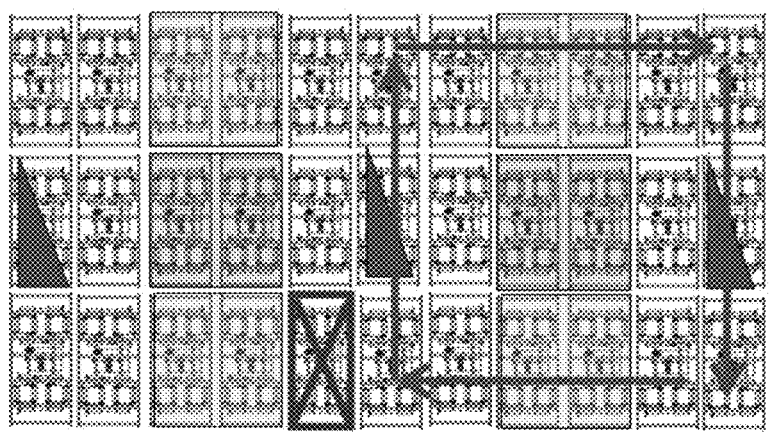
Figure 71I:
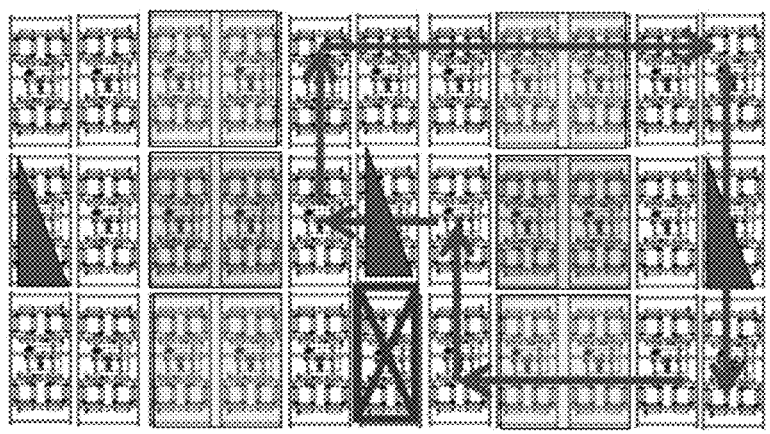
Figure 72A:
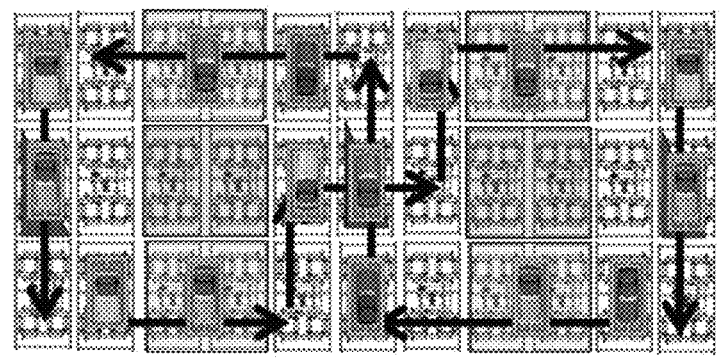
FIGS. 72A-72D illustrate some of the types of chain shifting organization of RPS matrix type, FRPS model in case of a transition from a normal (high-speed) mode into a (step-by-step) full load mode (Capacity Move).
Figure 72B:
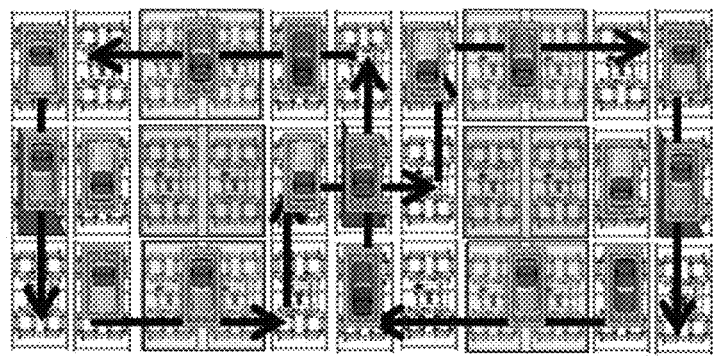
Figure 72C:
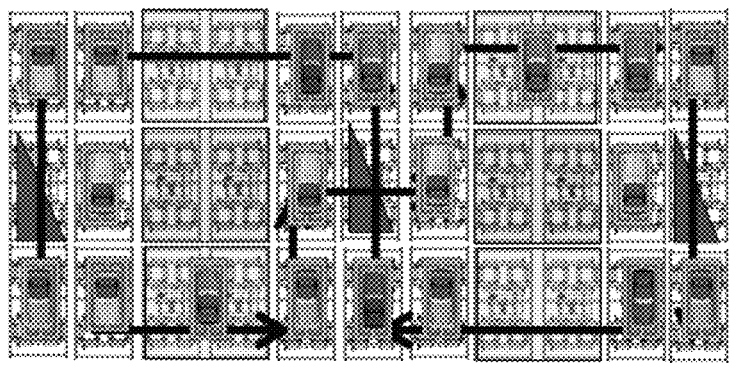
Figure 72D:
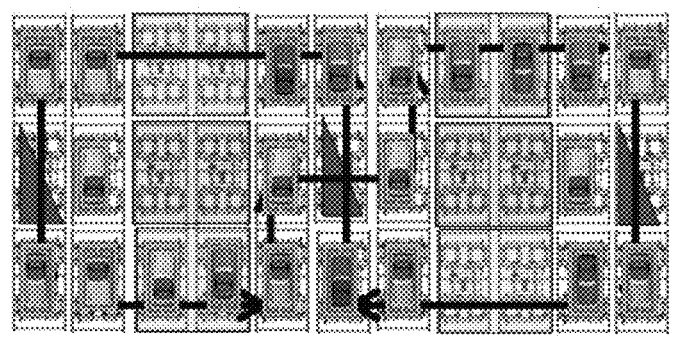

Reference is now made to FIG. 70 illustrating universal two level service area chains for underground and above the ground service.

Reference is now made to FIG. 71 illustrating one of the types of chain shifting organization of RPS matrix type, FRPS model in case of a malfunction of various cells. FIG. 71a—initial version, No broken cells. FIG. 71b—Buffer malfunction within the lift trio. FIG. 71c—Buffer malfunction within the box trio. FIG. 71d—Side lift malfunction. FIG. 71e—Central lift malfunction. FIG. 71f—Box cell malfunction. FIG. 71g—Central cell malfunction. FIG. 71h—Central cell malfunction. FIG. 71i—Central cell malfunction.

Reference is now made to FIG. 72 illustrating one of the types of chain shifting organization of RPS matrix type, FRPS model in case of a transition from a normal (high-speed) mode into a (step-by-step) full load mode (Capacity Move). Given the present configuration and optimal speed mode in each of the eight trios (4 lift trios and 4 box trios) of a given chain, one of the cells will be free for movement/shifting. Furthermore, given the present configuration, two additional buffers are located next to the lifts on its left and right sides. Furthermore, in transition from Capacity Move, two of the four boxes will temporarily stop operating as boxes and will turn into double storage cells. On the final stage of the expectancy mode, four lifts and two boxes will be ready for maneuvering within the Capacity Move. Hence, during the transition into the Capacity Move mode, 8 GId will be added incrementally within the service area: four at the expense of two (given the duplication)—within the box trio (1) at the expense of double central lift trios, (2) at the expense of additional buffers on the right and left sides of the lifts. FIG. 72a—An example of a complex operating at a high-speed mode. 15 GId=15 Id operate simultaneously with splints and without. FIG. 72b—An example of a complex in transition from a high-speed mode into Capacity Move—first stage. Two reserve buffers next to side lifts are occupied. Two GId are added into the service area from GId accumulators (Pallet Storage). FIG. 72c—An example of a complex in transition from a high-speed mode into Capacity Move—second stage. Two boxes are occupied in the absence of overload. Five GId are added into the service area from GId accumulators (Pallet Storage). FIG. 72d—An example of a complex in transition from a high-speed mode into Capacity Move—third stage. Two boxes are occupied with an overload (temporally transferred into a regular cell mode: (Seven GId are added into the service area from GId accumulators (Pallet Storage).

The invention claimed is:

1. A modular system for storage of cargo units in a designated space and for effective exploitation of said designated space, said system comprising:
   at least one storage area with one or more storage spaces adapted to store stocks of cargo being inserted into said system until said stocks of cargo are being extracted from said system;
   at least one service area, said at least one service area adapted to receive stocks of cargo being inserted into said system, transfer said blocks of cargo to said storage area, and to retrieve said stocks of cargo being extracted out of said system, said service area comprising:
   a plurality of pallets, each is adapted to carry at least one cargo unit;
   a plurality of at least partially interconnected active cell units forming a multi-dimensional structure with at least one row and at least one column of storing locations for at least one of said cargo units; said at least one row of said multi-dimensional structure is parallel to an axis selected from axis X or axis Y, and said at least one column of said multi-dimensional structure is parallel to an axis selected from axis X and axis Y, differently from the axis of said at least one row; each cell unit having a lengthwise axis X, and a widthwise axis Y, parallel to said axis X and said axis Y of said multi-dimensional structure; each cell unit comprising a cell transporting mechanism adapted to transport at least one pallet to and from said cell unit in direction selected from said axis X or said axis Y; each cell unit further adapted to contain at least one pallet on the same;

at least one active shuttle unit movable between said plurality of cell units of said multi-dimensional structure; said active shuttle unit has a lengthwise X axis, and a widthwise axis Y, parallel to said axis X and said axis Y of said multi-dimensional structure; each shuttle unit comprising a shuttle transporting mechanism adapted to transport at least one pallet of said plurality of pallets to and from one of said plurality of cell units in direction selected from said axis X, and said axis Y; said shuttle unit is adapted to enable transportation of at least one pallet of said plurality of pallets from at least one of said cell units to another one of said cell units; each shuttle unit further adapted to contain at least one pallet of said plurality of pallets on the same; and, a central controller adapted to control the operation of said cell transporting mechanism and said shuttle transporting mechanism of each one of said cell units and each of said at least one shuttle unit in an independent manner for transporting said plurality of pallets from one predetermined location to another predetermined location within said system;

wherein the operation of each of said cell transporting mechanism of each of said plurality of cell units and each of said shuttle transporting mechanism of each of said at least one shuttle unit is independently performed in said independent manner via said central controller such that a construction of any arrangement of said cell units forming said multi-dimensional structure is performed to effectively exploit said storage area by means of the number of cargo units capable of being inserted and stored within said system, and wherein said cell transporting mechanism and said shuttle transporting mechanism are adapted to transport at least one pallet of said plurality of pallets from one cell unit to its adjacent cell unit in a time interval of between about 7 to about 13 seconds;

further wherein said plurality of pallets, said at least one active shuttle unit, and said plurality of active cell units are adapted to perform said storage, receiving and retrieval of said cargo in a sequence such that said cargo can be received into said system and other cargoes can be extracted from said system simultaneously;

further wherein each of said active cell units comprises a matrix of at least three blocks, said blocks being of predetermined shape upon which said cargo and said pallets are located; said matrix of blocks comprises at least one box block and at least two buffer blocks; said buffer blocks comprising said cell transporting mechanism; further wherein said matrix of at least three blocks is arranged in a buffer-box-buffer organization.

2. The modular system of claim 1, wherein at least one of said plurality of active cell units further comprises (a) at least one input block adapted to receive cargo from a first adjacent active cell unit; and (b) at least one output block adapted to transfer cargo to a second adjacent active cell unit.

3. The modular system of claim 2, wherein said input block is the buffer block of said first adjacent cell unit, or said output block is the buffer block of second adjacent cell unit, or both.

4. The modular system of claim 1, wherein at least two of said plurality of active cell units are configured to share a buffer block.

5. The modular system of claim 1, wherein at least one of said plurality of active cell units comprises a block adapted to perform a task selected from the group consisting of drying cargo, washing cargo, repairing cargo and any combination thereof.

6. The modular system of claim 1, wherein said controller is adapted for controlling the movements of cargo in said blocks.

7. The modular system of claim 1, wherein said shuttle unit comprising a lifting mechanism adapted to lift said at least one pallet of said plurality of pallets in the direction of axis Z of said multi-dimensional structure when said multi-dimensional structure of said cell units comprises more that more than one layer of cell units.

8. The modular system of claim 1, wherein said central controller is adapted to insert and extract at least one of said cargo units to and from a specific cell unit within said system by an arrangement and movement of said plurality of pallets selected from a group consisting of: cyclic movement, linear movement, or any combination thereof; said arrangement and movement of said plurality of pallets is in a direction selected from a group consisting of: said axis X, axis Y, axis Z, or any combination thereof.

9. The modular system of claim 1, wherein said system is a parking system, said cargo units are vehicles, and each cell unit of said plurality of cell units is adapted to contain one vehicle of said vehicles.

10. The modular system of claim 1, wherein the dimensions of said multi-dimensional structure are selected from a group consisting of: 2D, 3D, or any combination thereof.

11. The modular system of claim 1, wherein said system further comprises at least two substantially parallel rails on which said at least one shuttle unit is movable between said plurality of cell units.

12. The modular system of claim 1, wherein said central controller comprises a set of predetermined algorithms for any possible structure of said multi-dimensional structures; said algorithms are responsible for transporting said plurality of pallets from one predetermined location to another predetermined location along a shortest possible route within said multi-dimensional structure.

13. The modular system of claim 12, wherein said predetermined location is selected from one cell unit of said plurality of cell units or one shuttle unit of said at least one shuttle unit.

14. The modular system of claim 1, wherein said system further comprises at least one entry and at least one exit points; said at least one entry and at least one exit points are selected from one cell unit of said plurality of cell units or one shuttle unit of said at least one shuttle unit.

15. The modular system of claim 1, at least one of said plurality of active cell units comprises a block further comprising a rotating mechanism adapted to rotate a pallet located on it in a rotation angle between about 1° to about 360°, clockwise and counter-clockwise.

16. The modular system of claim 1, wherein said at least one shuttle unit comprises a rotating mechanism adapted to rotate a pallet located on it in a rotation angle between about 1° to about 360°, clockwise and counter-clockwise.

17. The modular system of claim 1, wherein said plurality of cell units are at least partially interconnected by mechanically connected means selected from a group consisting of: shafts, rods, axles, bars, balks, staffs, levers, pales, or any combination thereof.

18. The modular system of claim 1, wherein said system is characterized by a characteristic selected from a group consisting of: kit-like, LEGO-like, easy for construction, easy for assembly, easy for disassembly, or any combination thereof.

19. The modular system of claim 1, wherein said cell transporting mechanism and said shuttle transporting mechanism comprise rotating wheels adapted to move said at least one pallet by their rotation, such that said at least one pallet of said plurality of pallets is transported to and from one of said plurality of cell units and to and from said at least one shuttle unit; further wherein the operation of said rotating wheels is controlled by said central controller, such that the direction of the rotation of said rotating wheels and the rotation time interval are set.

20. The system of claim 1, wherein said service area is adapted to continue operation even in the case of failure of fewer than all of said active shuttle units, fewer than all of said box blocks, fewer than all of said buffer blocks, or any combination thereof.

21. The system of claim 1, wherein said active shuttle unit comprises exit and entrance openings in more than one direction to enlarge the possibilities of transporting said pallets, such that additional transporting paths are provided.

22. The system of claim 1, wherein said controller is adapted for controlling the movements of said plurality of pallets within said system.

23. The system of claim 22, wherein said controller is adapted to cause said plurality of pallets to move in said matrix of active cell units.

24. The system of claim 22, wherein said controller is adapted to prioritize pending extraction requests for extracting said cargo from the storage spaces and/or to assign pending insertion requests to the storage spaces in accordance with predetermined criteria; said predetermined criteria is selected from a group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

25. A method for constructing and operating a modular system for storage of cargo units in a designated space and for effective exploitation of said designated space, said method comprising:
    providing a modular system for storage of cargo units in a designated space and for effective exploitation of said designated space, said system comprising:
        at least one storage area with one or more storage spaces adapted to store stocks of cargo being inserted into said system until said stocks of cargo are being extracted from said system; and
        at least one service area, said at least one service area adapted to receive stocks of cargo being inserted into said system, transfer said blocks of cargo to said storage area, and to retrieve said stocks of cargo being extracted out of said system, said service area comprising:
            a plurality of pallets, each is adapted to carry at least one cargo unit;
            a plurality of active cell units adapted to form a multi-dimensional structure with at least one row and at least one column of storing locations for at least one of said cargo units; said at least one row of said multi-dimensional structure is parallel to said to an axis selected from axis X or axis Y, and said at least one column of said multi-dimensional structure is parallel to axis selected from axis X and axis Y, differently from the axis of said at least one row; each cell unit having a lengthwise axis X, and a widthwise axis Y, parallel to said axis X and said axis Y of said multi-dimensional structure; each cell unit comprising an cell transporting mechanism adapted to transport at least one pallet to and from said cell unit in direction selected from said axis X or said axis Y; each cell unit further adapted to contain at least one pallet on the same;
            (iii) at least one active shuttle unit movable between said plurality of cell units of said multi-dimensional structure; said active shuttle unit has a lengthwise X axis, and a widthwise axis Y, parallel to said axis X and said axis Y of said multi-dimensional structure; each shuttle unit comprising a shuttle transporting mechanism adapted to transport at least one pallet of said plurality of pallets to and from one of said plurality of cell units in direction selected from said axis X, and said axis Y; said shuttle unit is adapted to enable transportation of at least one pallet of said plurality of pallets from at least one of said cell units to another one of said cell units; each shuttle unit further adapted to contain at least one pallet of said plurality of pallets on the same;
        said system further comprises a central controller adapted to control the operation of said cell transporting mechanism and said shuttle transporting mechanism of each one of said cell units and each of said at least one shuttle unit in an independent manner for transporting said plurality of pallets from one predetermined location to another predetermined location within said system;
    at least partially interconnecting said active cell units, and thereby forming said multi-dimensional structure;
    installing said at least one active shuttle unit between said plurality of cell units of said multi-dimensional structure;
    providing at least one cargo unit;
    placing said at least one cargo unit one pallet of said plurality of pallets at one predetermined location within said system;
    controlling the operation of said cell transporting mechanism and said shuttle transporting mechanism of each one of said cell units and each of said at least one shuttle unit via said central controller in an independent manner;
    transporting said at least one pallet of said plurality of pallets to and from at least one of said plurality of cell units and said at least one active shuttle unit via said cell transporting mechanism and said shuttle transporting mechanism of the same;
    transporting said at least one cargo unit from said one predetermined location to another predetermined location within said system; and, storing said at least one cargo unit within said system;

wherein said step of controlling the operation of said cell transporting mechanism and said shuttle transporting mechanism of each one of said cell units and each of said at least one shuttle unit is performed in said independent manner via said central controller, and thereby said system is efficiently exploiting said designated space by means of the number of cargo units capable of being inserted and stored within said system by allowing a construction of any arrangement of said cell units forming said multi-dimensional structure, and wherein said cell transporting mechanism and said shuttle transporting mechanism are adapted to transport at least one pallet of said plurality of pallets in a time interval of between about 7 to about 13 seconds;

further wherein said step of transporting said at least one pallet further comprises steps of storing, receiving and retrieving said cargo in a sequence such that said cargo can be received into said system and other cargoes can be extracted from said system simultaneously;

further wherein said step of providing a modular system further comprises steps of providing each of said active cell units with a matrix of at least three blocks, predetermining the shape of said blocks enabling locating said cargo and said pallets upon said blocks, and further providing said matrix of blocks with at least one box block and at least two buffer blocks, said buffer blocks comprising said cell transporting mechanism; further wherein said step of providing said matrix further comprises a step of arranging said at least three blocks in a buffer-box-buffer organization.

26. The method for constructing and operating a modular system for storage of cargo units of claim 25, further comprising a step of providing said at least one of said plurality of active cell units with (a) at least one input block adapted to receive cargo from a first adjacent active cell unit; and (b) at least one output block adapted to transfer cargo to a second adjacent active cell unit.

27. The method for constructing and operating a modular system for storage of cargo units of claim 26, further comprising the step of configuring said input block to be the buffer block of said first adjacent cell unit, or configuring said output block to be the buffer block of second adjacent cell unit, or both.

28. The method for constructing and operating a modular system for storage of cargo units of claim 25, further comprising the step of configuring at least two of said plurality of active cell units to share a buffer block.

29. The method for constructing and operating a modular system for storage of cargo units of claim 25, further comprising the step of adapting a block of at least one of said plurality of active cell units to perform a task selected from the group consisting of drying cargo, washing cargo, repairing cargo and any combination thereof.

30. The method for constructing and operating a modular system for storage of cargo units of claim 25, further comprising the step of adapting said controller to control the movement of cargo in said blocks.

31. The method for constructing and operating a modular system for storage of cargo units of claim 25, further comprising the step of lifting said at least one pallet of said plurality of pallets via a lifting mechanism in the direction of axis Z of said multi-dimensional structure when said multi-dimensional structure of said cell units comprising more that more than one layer of cell units.

32. The method for constructing and operating a modular system for storage of cargo units of claim 25, further comprising steps of inserting and extracting at least one of said cargo units to and from a specific cell unit within said system via said central controller by arranging and moving said plurality of pallets by an arrangement and movement selected from a group consisting of: cyclic movement, linear movement, or any combination thereof; said arrangement and movement of said plurality of pallets is in a direction selected from a group consisting of: said axis X, axis Y, axis Z, or any combination thereof.

33. The method for constructing and operating a modular system for storage of cargo units of claim 25, wherein the dimensions of said multi-dimensional structure are selected from a group consisting of: 2D, 3D, or any combination thereof.

34. The method for constructing and operating a modular system for storage of cargo units of claim 25, wherein said system further comprises at least two substantially parallel rails on which said at least one shuttle unit is movable between said plurality of cell units.

35. The method for constructing and operating a modular system for storage of cargo units of claim 25, further comprising step of providing said central controller with a set of predetermined algorithms for any possible structure of said multi-dimensional structures; said algorithms are responsible for transporting said plurality of pallets from one predetermined location to another predetermined location along a shortest possible route within said multi-dimensional structure.

36. The method for constructing and operating a modular system for storage of cargo units of claim 25, further comprising step of providing said system with at least one entry and at least one exit points; said at least one entry and at least one exit points are selected from one cell unit of said plurality of cell units or one shuttle unit of said at least one shuttle unit.

37. The method for constructing and operating a modular system for storage of cargo units of claim 25, wherein said one cell unit of said plurality of cell units comprises a rotating mechanism adapted to rotate a pallet located on it in a rotation angle between about 1° to about 360°, clockwise and counter-clockwise.

38. The method for constructing and operating a modular system for storage of cargo units of claim 25, wherein said plurality of cell units are at least partially interconnected by mechanically connected means selected from a group consisting of: shafts, rods, axles, bars, balks, staffs, levers, pales, or any combination thereof.

39. The method for constructing and operating a modular system for storage of cargo units of claim 25, wherein said system is characterized by a characteristic selected from a group consisting of: kit-like, LEGO-like, easy for construction, easy for assembly, easy for disassembly, or any combination thereof.

40. The method for constructing and operating a modular system for storage of cargo units of claim 25, wherein said cell transporting mechanism and said shuttle transporting mechanism comprise rotating wheels adapted to move said at least one pallet by their rotation, such that said at least one pallet of said plurality of pallets is transported to and from one of said plurality of cell units and to and from said at least one shuttle unit; further wherein the operation of said rotating wheels is controlled by said central controller, such that the direction of the rotation of said rotating wheels and the rotation time interval are set.

41. The method of claim 25, additionally comprising step of providing said elevator with exit and entrance openings in more than one direction to enlarge the possibilities of transporting said pallets, thereby transporting said plurality of pallets by using additional paths.

42. The method of claim 25, additionally comprising step of controlling the movements of said plurality of pallets within said system.

43. The method of claim 25, additionally comprising step of independently moving said plurality of pallets within said system.

44. The method of claim 25, additionally comprising step of prioritizing pending extraction requests for extracting said cargo from the storage spaces and/or to assigning pending insertion requests to the storage spaces in accordance with predetermined criteria.

45. The method of claim 44, additionally comprising step of selecting said predetermined criteria from a group consisting of: block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

* * * * *